US010003219B1

(12) United States Patent
Hidaka et al.

(10) Patent No.: US 10,003,219 B1
(45) Date of Patent: Jun. 19, 2018

(54) ELECTRONIC DEVICE INCLUDING NON-CONTACT CHARGING MODULE

(71) Applicant: Panasonic Corporation, Osaka (JP)

(72) Inventors: Akio Hidaka, Fukuoka (JP); Takumi Naruse, Miyazaki (JP); Munenori Fujimura, Fukuoka (JP); Kenichiro Tabata, Fukuoka (JP); Tokuji Nishino, Fukuoka (JP)

(73) Assignee: Panasonic Corporation, Osaka (JP)

( * ) Notice: Subject to any disclaimer, the term of this patent is extended or adjusted under 35 U.S.C. 154(b) by 0 days. days.

(21) Appl. No.: 15/883,840

(22) Filed: Jan. 30, 2018

Related U.S. Application Data

(63) Continuation of application No. 15/051,408, filed on Feb. 23, 2016, which is a continuation of application
(Continued)

(30) Foreign Application Priority Data

Jun. 14, 2011 (JP) .................................. 2011-131948
Jun. 14, 2011 (JP) .................................. 2011-131950
(Continued)

(51) Int. Cl.
 *H02J 7/00* (2006.01)
 *H02J 50/10* (2016.01)
(Continued)

(52) U.S. Cl.
 CPC .............. *H02J 50/10* (2016.02); *H01F 38/14* (2013.01); *H02J 7/025* (2013.01); *H02J 50/70* (2016.02);
(Continued)

(58) Field of Classification Search
 CPC ........ H02J 7/025; H01F 38/14; Y02T 90/122; B60L 11/182; Y02E 60/12
(Continued)

(56) References Cited

U.S. PATENT DOCUMENTS 5,198,647 A 3/1993 Mizuta
5,313,444 A 5/1994 Ishii et al.
(Continued)

FOREIGN PATENT DOCUMENTS

CN 101681719 A 3/2010
CN 101771283 A 7/2010
(Continued)

OTHER PUBLICATIONS

Brooke Crothers, Getting a look inside the iPhone 4, Nanotech—The Circuits Blog—CNET News, Jun. 22, 2010, 5 pages.
(Continued)

*Primary Examiner* — Arun Williams
(74) *Attorney, Agent, or Firm* — Seed IP Law Group LLP

(57) ABSTRACT

This communication apparatus makes it possible to have a non-contact charging module and a sheet antenna coexist, even in the case where there the non-contact charging module and the sheet antenna in the communication apparatus. The apparatus is provided with: a housing; a secondary-side non-contact charging module, which is housed in the housing, receives power by means of electromagnetic induction, and has a first coil having a conducting wire wound thereon, and a first magnetic sheet facing the first coil; and an NFC antenna, which is housed in the housing, and has a second coil having a conducting wire wound thereon, and a second magnetic sheet facing the second coil. The secondary-side non-contact charging module and the NFC antenna are not laminated to each other.

17 Claims, 29 Drawing Sheets

Related U.S. Application Data

No. 14/125,294, filed as application No. PCT/JP2012/003914 on Jun. 14, 2012, now Pat. No. 9,306,411.

(30) Foreign Application Priority Data

| | | | |
|---|---|---|---|
| Jul. 13, 2011 | (JP) | ................................ | 2011-154550 |
| Jul. 13, 2011 | (JP) | ................................ | 2011-154554 |
| Jul. 13, 2011 | (JP) | ................................ | 2011-154555 |
| Jul. 14, 2011 | (JP) | ................................ | 2011-155334 |
| Aug. 31, 2011 | (JP) | ................................ | 2011-188413 |

(51) Int. Cl.

| | |
|---|---|
| H02J 50/90 | (2016.01) |
| H02J 50/70 | (2016.01) |
| H02J 50/80 | (2016.01) |
| H04B 5/00 | (2006.01) |
| H02J 7/02 | (2016.01) |
| H01F 38/14 | (2006.01) |
| H01F 27/36 | (2006.01) |
| H01F 27/28 | (2006.01) |

(52) U.S. Cl.
CPC .............. *H02J 50/80* (2016.02); *H02J 50/90* (2016.02); *H04B 5/0037* (2013.01); *H04B 5/0093* (2013.01); *H01F 27/2871* (2013.01); *H01F 27/365* (2013.01); *H04B 5/0062* (2013.01)

(58) Field of Classification Search
USPC ......................................................... 320/108
See application file for complete search history.

(56) References Cited

U.S. PATENT DOCUMENTS

| | | | |
|---|---|---|---|
| 6,175,212 B1 | 1/2001 | Oguri | |
| 6,396,241 B1 | 5/2002 | Ramos et al. | |
| 6,625,481 B2 | 9/2003 | Bennett et al. | |
| 6,803,744 B1 | 10/2004 | Sabo | |
| 7,042,196 B2 | 5/2006 | Ka-Lai et al. | |
| 7,271,596 B2 | 9/2007 | Furse et al. | |
| 7,948,208 B2 | 5/2011 | Partovi et al. | |
| 8,009,007 B2 | 8/2011 | Utsuno et al. | |
| 8,055,310 B2 | 11/2011 | Beart et al. | |
| 8,089,245 B2 | 1/2012 | Kato et al. | |
| 8,188,826 B2 | 5/2012 | Okada et al. | |
| 8,193,767 B2 | 6/2012 | Inoue et al. | |
| 8,232,764 B2 | 7/2012 | Inoue et al. | |
| 8,237,401 B2 | 8/2012 | Sip et al. | |
| 8,260,199 B2 | 9/2012 | Kowalski | |
| 8,269,375 B2 | 9/2012 | Sogabe et al. | |
| 8,280,453 B2 | 10/2012 | Beart et al. | |
| 8,283,888 B2 | 10/2012 | Inoue et al. | |
| 8,362,868 B2 | 1/2013 | Tamura et al. | |
| 8,421,574 B2 | 4/2013 | Suzuki et al. | |
| 8,457,550 B2 | 6/2013 | Goto et al. | |
| 8,541,977 B2 | 9/2013 | Hasegawa et al. | |
| 8,542,018 B2 | 9/2013 | Yoshikawa | |
| 8,547,058 B2 | 10/2013 | Tabata et al. | |
| 8,552,684 B2 | 10/2013 | Tabata et al. | |
| 8,560,024 B2 | 10/2013 | Beart et al. | |
| 8,643,219 B2 | 2/2014 | Yabe et al. | |
| 8,643,473 B2 | 2/2014 | Suzuki | |
| 8,664,801 B2 | 3/2014 | Abe | |
| 8,680,811 B2 | 3/2014 | Mochida et al. | |
| 8,766,484 B2 | 7/2014 | Baarman et al. | |
| 8,811,894 B2 | 8/2014 | Cordier | |
| 8,829,731 B2 | 9/2014 | Baarman et al. | |
| 8,847,831 B2 | 9/2014 | Kato et al. | |
| 8,905,317 B1 | 12/2014 | Hsu et al. | |
| 8,909,139 B2 | 12/2014 | Aldana et al. | |
| 8,922,162 B2 | 12/2014 | Park et al. | |
| 8,995,910 B2 | 3/2015 | Chong et al. | |
| 9,048,959 B2 | 6/2015 | Voutilainen et al. | |
| 9,126,514 B2 | 9/2015 | Soar | |
| 9,143,041 B2 | 9/2015 | Itabashi et al. | |
| 9,153,885 B2 | 10/2015 | Yamaguchi et al. | |
| 9,240,702 B2 | 1/2016 | Soar | |
| 9,265,957 B2 | 2/2016 | Chen et al. | |
| 9,362,985 B2 | 6/2016 | Uchida et al. | |
| 2005/0116683 A1 | 6/2005 | Cheng et al. | |
| 2005/0151696 A1 | 7/2005 | Govari et al. | |
| 2006/0076922 A1 | 4/2006 | Cheng et al. | |
| 2006/0082659 A1 | 4/2006 | Koo | |
| 2006/0205381 A1 | 9/2006 | Beart et al. | |
| 2007/0176829 A1 | 8/2007 | Liu | |
| 2007/0182367 A1 | 8/2007 | Partovi | |
| 2007/0206116 A1 | 9/2007 | Chou | |
| 2007/0279022 A1 | 12/2007 | Chen et al. | |
| 2007/0297204 A1 | 12/2007 | Lu et al. | |
| 2008/0031606 A1 | 2/2008 | Zax et al. | |
| 2008/0070003 A1 | 3/2008 | Nakatani et al. | |
| 2008/0111518 A1 | 5/2008 | Toya | |
| 2008/0122570 A1 | 5/2008 | Takaishi | |
| 2008/0164839 A1 | 7/2008 | Kato et al. | |
| 2008/0164840 A1 | 7/2008 | Kato et al. | |
| 2008/0164844 A1 | 7/2008 | Kato et al. | |
| 2008/0165063 A1 | 7/2008 | Schlub et al. | |
| 2008/0297107 A1 | 12/2008 | Kato et al. | |
| 2008/0303735 A1 | 12/2008 | Fujimoto et al. | |
| 2009/0001932 A1 | 1/2009 | Kamijo et al. | |
| 2009/0015362 A1 | 1/2009 | Okada et al. | |
| 2009/0021212 A1 | 1/2009 | Hasegawa et al. | |
| 2009/0033280 A1 | 2/2009 | Choi et al. | |
| 2009/0050624 A1 | 2/2009 | Ventura | |
| 2009/0058358 A1 | 3/2009 | Inoue et al. | |
| 2009/0096413 A1 | 4/2009 | Partovi et al. | |
| 2009/0102419 A1 | 4/2009 | Gwon et al. | |
| 2009/0121677 A1 | 5/2009 | Inoue et al. | |
| 2009/0143104 A1 | 6/2009 | Loh et al. | |
| 2009/0212637 A1 | 8/2009 | Baarman et al. | |
| 2009/0230777 A1 | 9/2009 | Baarman et al. | |
| 2009/0284341 A1 | 11/2009 | Okada et al. | |
| 2010/0001823 A1 | 1/2010 | Kawarai | |
| 2010/0007215 A1 | 1/2010 | Sakuma | |
| 2010/0127813 A1 | 5/2010 | Utsuno et al. | |
| 2010/0156344 A1 | 6/2010 | Inoue et al. | |
| 2010/0156345 A1 | 6/2010 | Phelps, III | |
| 2010/0156735 A1 | 6/2010 | Nakamura et al. | |
| 2010/0164431 A1 | 7/2010 | Sip et al. | |
| 2010/0181842 A1 | 7/2010 | Suzuki et al. | |
| 2010/0207575 A1 | 8/2010 | Pijnenburg et al. | |
| 2010/0210207 A1 | 8/2010 | Goto et al. | |
| 2010/0244579 A1 | 9/2010 | Sogabe et al. | |
| 2010/0244839 A1 | 9/2010 | Yoshikawa | |
| 2010/0264746 A1 | 10/2010 | Kazama et al. | |
| 2010/0270867 A1 | 10/2010 | Abe | |
| 2010/0311327 A1* | 12/2010 | Hamada | H02J 7/025 455/41.1 |
| 2010/0320843 A1 | 12/2010 | Kitamura et al. | |
| 2011/0025264 A1 | 2/2011 | Mochida et al. | |
| 2011/0043050 A1 | 2/2011 | Yabe et al. | |
| 2011/0050164 A1 | 3/2011 | Partovi et al. | |
| 2011/0050535 A1 | 3/2011 | Yamaguchi et al. | |
| 2011/0102125 A1 | 5/2011 | Tamura et al. | |
| 2011/0210619 A1 | 9/2011 | Beart et al. | |
| 2011/0210696 A1 | 9/2011 | Inoue | |
| 2011/0227799 A1 | 9/2011 | Hashimoto | |
| 2011/0241837 A1 | 10/2011 | Suzuki | |
| 2011/0267238 A1 | 11/2011 | Nekozuka | |
| 2011/0309792 A1 | 12/2011 | Mochida et al. | |
| 2011/0316475 A1 | 12/2011 | Jung et al. | |
| 2012/0057322 A1 | 3/2012 | Waffenschmidt | |
| 2012/0098352 A1 | 4/2012 | Takaishi | |
| 2012/0146580 A1 | 6/2012 | Kitamura | |
| 2012/0153731 A9 | 6/2012 | Kirby et al. | |
| 2012/0181876 A1 | 7/2012 | Baarman et al. | |
| 2012/0206307 A1 | 8/2012 | Orihara et al. | |
| 2012/0235636 A1 | 9/2012 | Partovi | |
| 2012/0289153 A1 | 11/2012 | Dobyns | |
| 2012/0309307 A1 | 12/2012 | D'Amico | |

(56) References Cited

U.S. PATENT DOCUMENTS

| | | |
|---|---|---|
| 2012/0319500 A1 | 12/2012 | Beart et al. |
| 2012/0319647 A1 | 12/2012 | Itabashi et al. |
| 2013/0005251 A1 | 1/2013 | Soar |
| 2013/0033118 A1 | 2/2013 | Karalis et al. |
| 2013/0038278 A1* | 2/2013 | Park .................... H02J 7/00 320/108 |
| 2013/0221910 A1 | 8/2013 | Kim et al. |
| 2013/0229252 A1 | 9/2013 | Nogi et al. |
| 2013/0249312 A1 | 9/2013 | Uchida et al. |
| 2013/0249661 A1 | 9/2013 | Motomiya et al. |
| 2013/0267170 A1 | 10/2013 | Chong et al. |
| 2013/0342162 A1 | 12/2013 | Tabata et al. |
| 2014/0232335 A1 | 8/2014 | Tabata et al. |
| 2014/0306656 A1 | 10/2014 | Tabata et al. |
| 2014/0349573 A1 | 11/2014 | Moes et al. |
| 2014/0375262 A1 | 12/2014 | Yamaguchi et al. |
| 2015/0091524 A1 | 4/2015 | Park et al. |
| 2015/0116178 A1 | 4/2015 | Kim et al. |
| 2015/0222143 A1 | 8/2015 | Osada et al. |

FOREIGN PATENT DOCUMENTS

| | | |
|---|---|---|
| CN | 101971452 A | 2/2011 |
| CN | 102017353 A | 4/2011 |
| CN | 102084440 A | 6/2011 |
| CN | 102208926 A | 10/2011 |
| EP | 1 928 003 A2 | 6/2008 |
| EP | 1 944 851 A2 | 7/2008 |
| EP | 2 017 860 A2 | 1/2009 |
| EP | 2 081 199 A1 | 7/2009 |
| EP | 2 172 952 A1 | 4/2010 |
| EP | 2 244 351 A2 | 10/2010 |
| EP | 2 246 864 A1 | 11/2010 |
| EP | 2 258 032 A2 | 12/2010 |
| EP | 1 928 003 B1 | 1/2011 |
| EP | 2 284 849 A1 | 2/2011 |
| EP | 2 296 228 A1 | 3/2011 |
| EP | 2 348 517 A1 | 7/2011 |
| EP | 2 367 262 A2 | 9/2011 |
| EP | 2 456 044 A1 | 5/2012 |
| EP | 2 546 844 A1 | 1/2013 |
| EP | 2 620 961 A1 | 7/2013 |
| EP | 2 712 053 A1 | 3/2014 |
| EP | 2 244 351 B1 | 9/2015 |
| JP | 56-170187 U | 12/1981 |
| JP | 05-144108 A | 6/1993 |
| JP | 07-231586 A | 8/1995 |
| JP | 07-299150 A | 11/1995 |
| JP | 11-122146 A | 4/1999 |
| JP | 11-265814 A | 9/1999 |
| JP | 2002-354713 A | 12/2002 |
| JP | 2003-045731 A | 2/2003 |
| JP | 2003-068531 A | 3/2003 |
| JP | 2003-255288 A | 9/2003 |
| JP | 2004-047701 A | 2/2004 |
| JP | 2004-110854 A | 4/2004 |
| JP | 2005-070855 A | 3/2005 |
| JP | 2005-224603 A | 8/2005 |
| JP | 2006-032589 A | 2/2006 |
| JP | 2006-042519 A | 2/2006 |
| JP | 2006-126901 A | 5/2006 |
| JP | 2006-315368 A | 11/2006 |
| JP | 2007-214754 A | 8/2007 |
| JP | 2008-027015 A | 2/2008 |
| JP | 2008-087733 A | 4/2008 |
| JP | 2008-125115 A | 5/2008 |
| JP | 2008-135589 A | 6/2008 |
| JP | 2008-172572 A | 7/2008 |
| JP | 2008-172874 A | 7/2008 |
| JP | 2008-205557 A | 9/2008 |
| JP | 2008-206297 A | 9/2008 |
| JP | 2008-210861 A | 9/2008 |
| JP | 2008-235860 A | 10/2008 |
| JP | 2008-289241 A | 11/2008 |
| JP | 2008-294385 A | 12/2008 |
| JP | 2009-005475 A | 1/2009 |
| JP | 2009-027025 A | 2/2009 |
| JP | 2009-159660 A | 7/2009 |
| JP | 2009-182902 A | 8/2009 |
| JP | 2009-200174 A | 9/2009 |
| JP | 2009-247125 A | 10/2009 |
| JP | 2009-253649 A | 10/2009 |
| JP | 2009-259273 A | 11/2009 |
| JP | 2009-277820 A | 11/2009 |
| JP | 2009-284657 A | 12/2009 |
| JP | 2010-016235 A | 1/2010 |
| JP | 4400509 B2 | 1/2010 |
| JP | 2010-041906 A | 2/2010 |
| JP | 2010-050515 A | 3/2010 |
| JP | 2010-128219 A | 6/2010 |
| JP | 2010-129692 A | 6/2010 |
| JP | 2010-207017 A | 9/2010 |
| JP | 2010-213570 A | 9/2010 |
| JP | 2010-219652 A | 9/2010 |
| JP | 2010-226929 A | 10/2010 |
| JP | 2010-239781 A | 10/2010 |
| JP | 2010-239838 A | 10/2010 |
| JP | 2010-252624 A | 11/2010 |
| JP | 2010-258913 A | 11/2010 |
| JP | 2010-259172 A | 11/2010 |
| JP | 2010-283263 A | 12/2010 |
| JP | 2010-284059 A | 12/2010 |
| JP | 2011-024360 A | 2/2011 |
| JP | 2011-049936 A | 3/2011 |
| JP | 2011-072074 A | 4/2011 |
| JP | 2011-072097 A | 4/2011 |
| JP | 2011-072116 A | 4/2011 |
| JP | 4669560 B1 | 4/2011 |
| JP | 2011-101524 A | 5/2011 |
| JP | 2011-103533 A | 5/2011 |
| JP | 2011-103694 A | 5/2011 |
| JP | 2011-514796 A | 5/2011 |
| JP | 2012-010533 A | 1/2012 |
| JP | 2012-084893 A | 4/2012 |
| JP | 2012-119662 A | 6/2012 |
| JP | 4962634 B1 | 6/2012 |
| JP | 2012-156279 A | 8/2012 |
| JP | 2012-157147 A | 8/2012 |
| JP | 5013019 B1 | 8/2012 |
| JP | 2013-021902 A | 1/2013 |
| WO | 2007/080820 A1 | 7/2007 |
| WO | 2007/122788 A1 | 11/2007 |
| WO | 2008/156025 A1 | 12/2008 |
| WO | 2009/053801 A1 | 4/2009 |
| WO | 2009/105615 A2 | 8/2009 |
| WO | 2009/114671 A1 | 9/2009 |
| WO | 2011/007661 A1 | 1/2011 |
| WO | 2011/016737 A1 | 2/2011 |
| WO | 2011/096569 A1 | 8/2011 |
| WO | 2012/073305 A1 | 6/2012 |
| WO | 2013/084480 A1 | 6/2013 |

OTHER PUBLICATIONS

English Translation of Chinese Search Report dated May 29, 2015, for corresponding CN Application No. 201280039867.7, 3 pages.

English Translation of Notification of Reasons for Refusal, dated Aug. 1, 2017, corresponding to Japanese Application No. 2016-147734, 8 pages.

Extended European Search Report, dated Oct. 8, 2014, for corresponding European Application No. 12801388.5-1556/2712053, 8 pages.

Extended European Search Report, dated Jun. 2, 2015, for corresponding EP Application No. 12846180.3-1812 / 2775632, 5 pages.

Final Office Action dated Nov. 28, 2016, for corresponding U.S. Appl. No. 14/376,574, 27 pages.

International Search Report, dated Apr. 2, 2013, for corresponding International Application No. PCT/JP2013/000553, 4 pages. (With English Translation).

International Search Report dated Apr. 3, 2012, for corresponding International Application No. PCT/JP2011/007345, 2 pages.

(56) References Cited

OTHER PUBLICATIONS

International Search Report, dated Dec. 4, 2012, for PCT/JP2012/006644, 4 pages. (With English Translation).
International Search Report dated Dec. 27, 2011, for corresponding International Application No. PCT/JP2011/006025, 4 pages.
International Search Report dated Sep. 4, 2012, for corresponding International Application No. PCT/JP2012/003914, 8 pages.
International Search Report dated Jun. 18, 2013, for corresponding International Application No. PCT/JP2013/003317, 2 pages.
International Search Report dated Aug. 20, 2013, for related International Application No. PCT/JP2013/003316, 4 pages.
International Search Report dated Aug. 20, 2013, for related International Application No. PCT/JP2013/003315, 6 pages.
Korean Office Action, dated Mar. 6, 2015, for corresponding KR Application No. 10-2014-709494, 12 pages. (With English Translation).
Non-Final Office Action, dated Oct. 20, 2017, for corresponding U.S. Appl. No. 15/051,408, 22 pages.
Non-Final Office Action, dated Jul. 5, 2017, for corresponding U.S. Appl. No. 15/235,885, 32 pages.
Non-Final Office Action, dated Jun. 12, 2017, for corresponding U.S. Appl. No. 13/876,509, 14 pages.
Notice of Reasons for Refusal, dated Oct. 25, 2016, for corresponding JP Application No. 2012-145962, 6 pages.
Notification of First Chinese Office Action, dated Mar. 30, 2015, for corresponding CN Application No. 201280053655.4, 13 pages. (With English Translation).
Notification of Reasons for Refusal, dated Apr. 12, 2016, for corresponding JP Application No. 2012-154861, 7 pages. (With English Translation).
Notification of Reasons for Refusal, dated Jun. 27, 2017, corresponding to Japanese Application No. 2016-252053, 6 pages.
Partial English Translation of Japanese Office Action dated May 10, 2011, for corresponding JP Application No. 2011/013619, 6 pages.
Partial English Translation of Japanese Office Action dated Sep. 6, 2011, for corresponding JP Application No. 2011-135946, 6 pages.
Wireless Power Consortium, "System Description Wireless Power Transfer," vol. 1: Low Power, Part 1: Interface Definition, V 1.0.1, Oct. 2010, 86 pages.
Notice of Allowance, dated Apr. 19, 2017, for corresponding U.S. Appl. No. 14/410,555, 13 pages.
Communication pursuant to Article 94(3) EPC, dated Jan. 3, 2018, for corresponding European Patent Application No. 12 801 388.5-1556, 10 pages.

\* cited by examiner

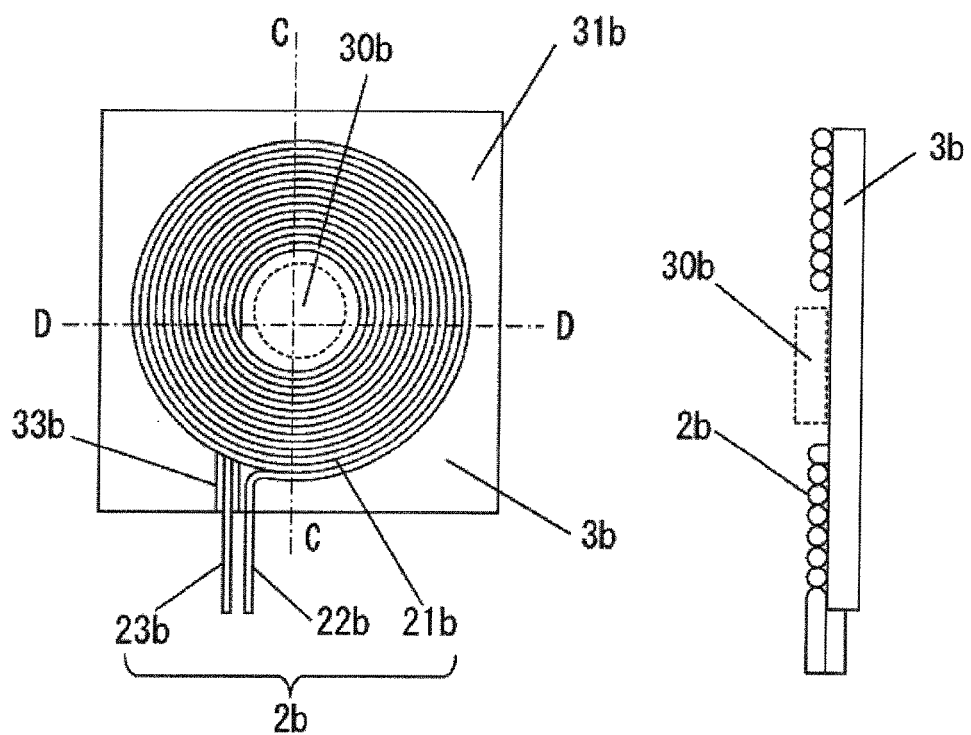
FIG. 7A
FIG. 7B
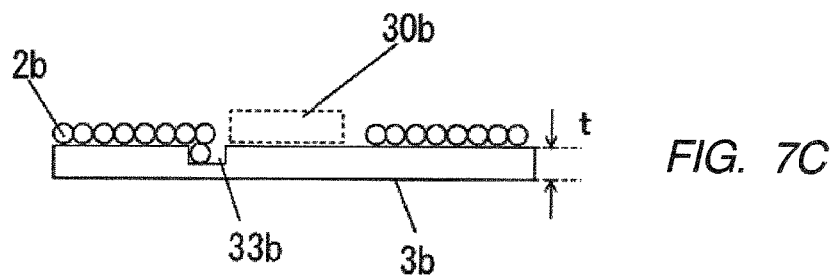
FIG. 7C
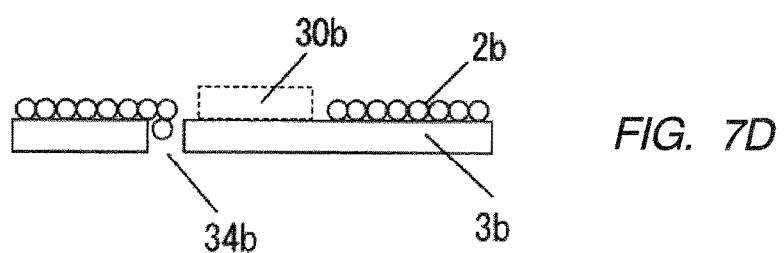
FIG. 7D

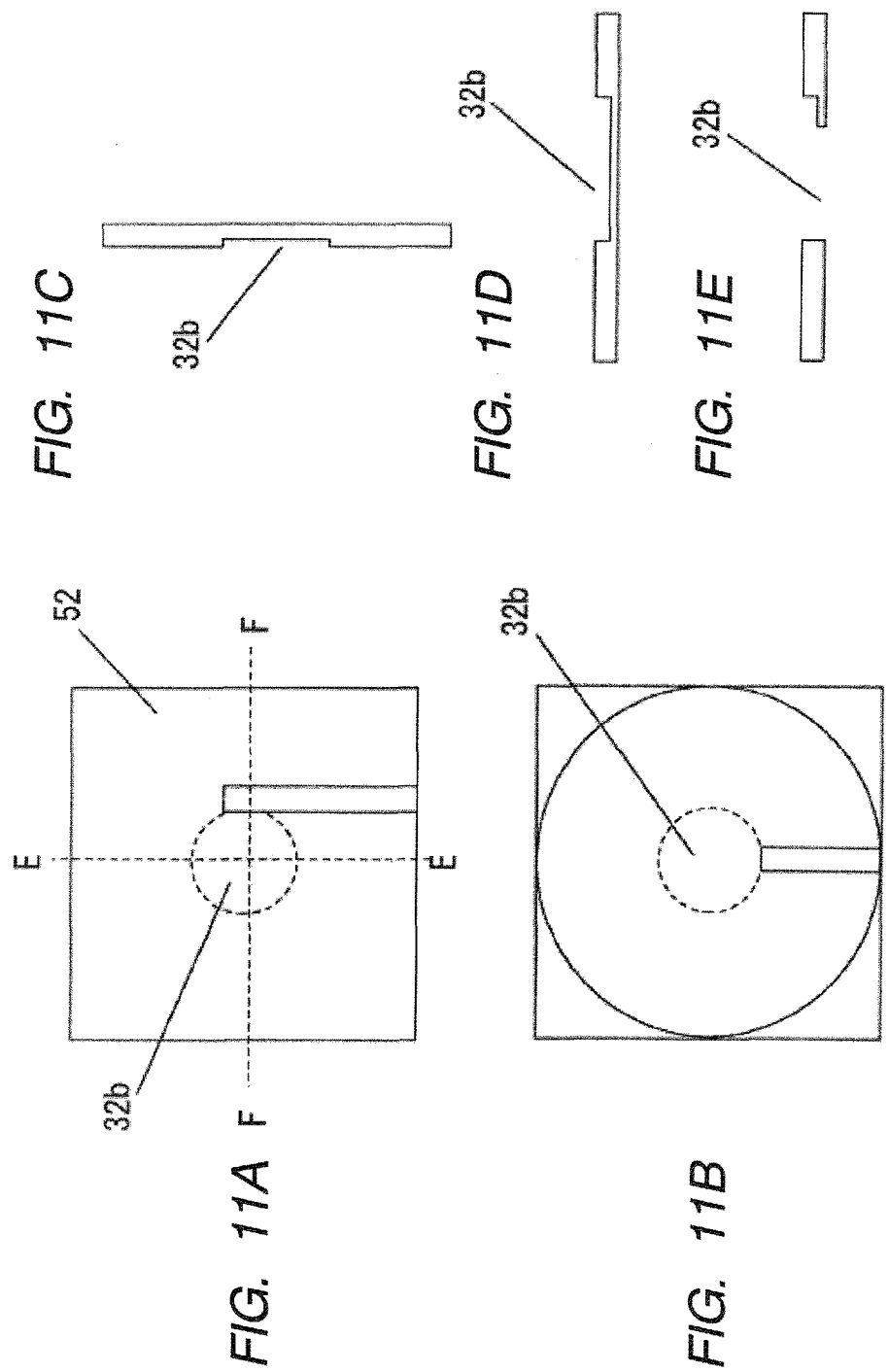

SUBSTRATE AND BATTERY PACK MAY BE STACKED

ELECTRONIC DEVICE INCLUDING NON-CONTACT CHARGING MODULE

TECHNICAL FIELD

The present invention relates to a communication apparatus including a plurality of plane coils and, more particularly, to a communication apparatus including non-contact charging modules and an antenna for near field communication.

BACKGROUND ART

In recent years, communication apparatuses such as portable terminal apparatuses have been provided with a sheet antenna for near field communication. As the sheet antenna, an NFC (Near Field Communication) antenna or the like is known, for example, which employs an RFID (Radio Frequency IDentification) technique and uses a radio wave in a 13.56 MHz band (see, for example, Patent Literature 1).

Recently, a communication apparatus has also been proposed, which includes a non-contact charging module mounted thereon and is configured to be charged in a non-contact manner. In this charging system, a coil for power transmission and a coil for power reception are provided on a charger side and on a communication apparatus side, respectively, and electric power is transmitted from the charger side to the communication apparatus side using electromagnetic induction between both the coils (see, for example, Patent Literature 2).

As described above, in the communication apparatus, near field communication is enabled by the sheet antenna and non-contact charging is also enabled by the non-contact charging module.

CITATION LIST

Patent Literature

PTL 1
Japanese Patent Application Laid-Open Publication No. 2007-214754
PLT 2
Japanese Patent Application Laid-Open Publication No. 2006-42519

SUMMARY OF INVENTION

Technical Problem

In general, a reception-side non-contact charging module and a sheet antenna include coils and magnetic sheets. When non-contact charging is performed, aligning of a transmission-side non-contact charging module (a primary-side) and the reception-side non-contact charging module (a secondary-side) is performed. In general, the aligning of the modules is performed using the magnetic sheets or the coils. For this reason, when the aligning is not successful and the transmission-side non-contact charging module is misaligned with the sheet antenna, the problem is that transmission efficiency of the non-contact charging is deteriorated.

It is an object of the present invention to provide a communication apparatus that can suppress deterioration in transmission efficiency of non-contact charging even when a non-contact charging module and an NFC antenna are present in the communication apparatus.

Solution to Problem

A communication apparatus according to the present invention includes: a housing; a non-contact module housed in the housing and configured to receive electric power through electromagnetic induction, the non-contact module including a first coil composed of a wound electrical line and a first magnetic sheet facing the first coil; and a sheet antenna housed in the housing and including a second coil composed of a wound electrical line and a second magnetic sheet facing the second coil. The non-contact charging module and the sheet antenna are not stacked.

Advantageous Effects of Invention

According to embodiments of the claimed communication apparatus, since hollow portions of the first and second coils face each other, it is possible to suppress an error in aligning for non-contact charging and the first coil tends to receive a magnetic flux. Therefore, it is possible to suppress deterioration in efficiency of power transmission of the non-contact charging.

BRIEF DESCRIPTION OF DRAWINGS

FIGS. 7A to 7D are detailed diagrams showing the secondary-side non-contact charging module in the embodiment of the present invention;

FIGS. 11A to 11E are conceptual diagrams of a magnetic sheet of the non-contact charging module in the embodiment of the present invention;

DESCRIPTION OF EMBODIMENTS

A communication apparatus according to the present invention includes: a housing; a non-contact charging module housed in the housing and configured to receive electric power through electromagnetic induction, the non-contact charging module including a first coil composed of a wound electrical line and a first magnetic sheet facing the first coil; and a sheet antenna housed in the housing and including a second coil composed of a wound electrical line and a second magnetic sheet facing the second coil. The non-contact charging module and the sheet antenna are not stacked.

Embodiment 1

[Description of a Communication Apparatus]

Figure 1A:
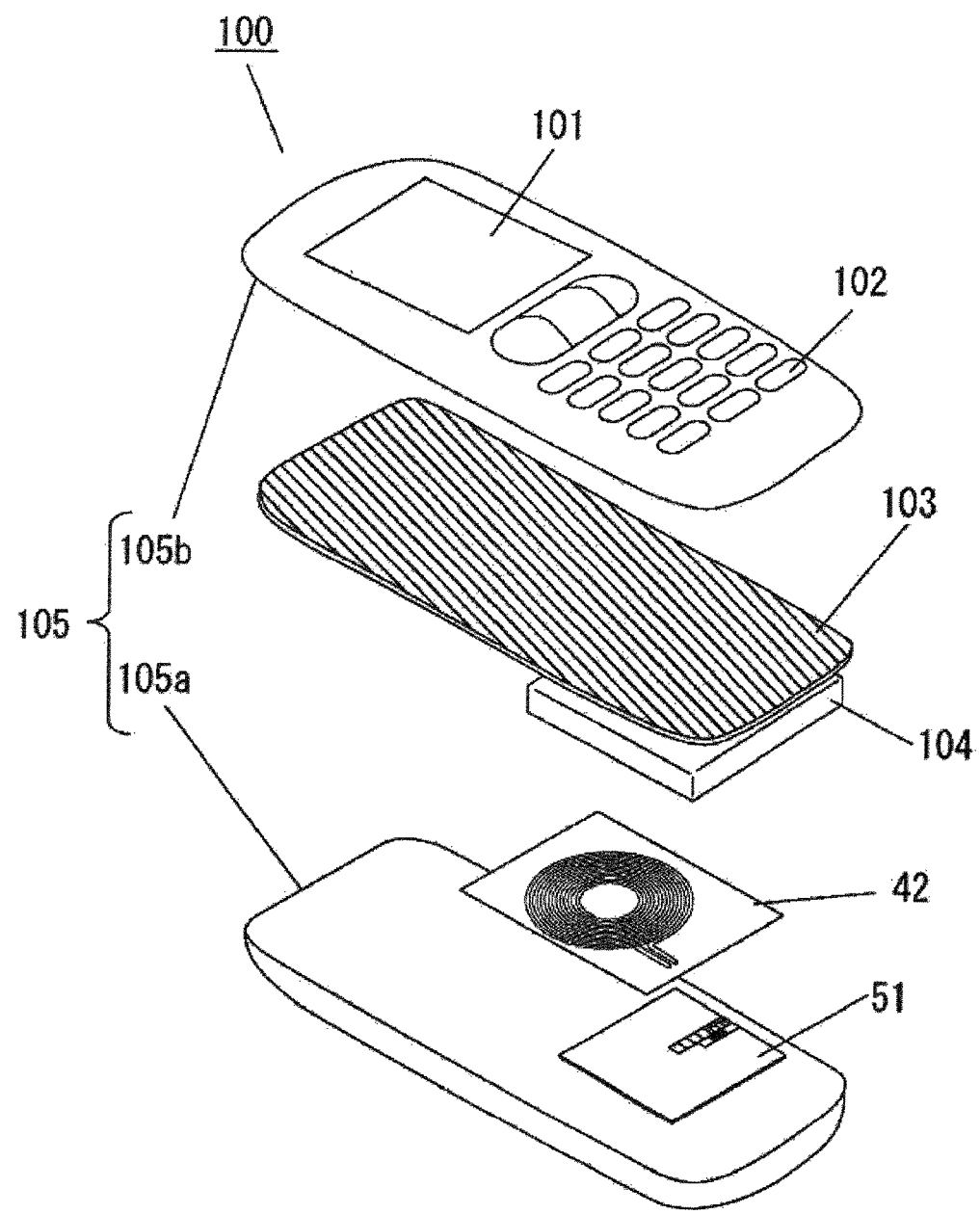
FIG. 1A is an assembled perspective view of a portable terminal apparatus in an embodiment of the present invention in the case where a secondary-side non-contact charging module is disposed between an NFC antenna and a battery pack.
Figure 1B:
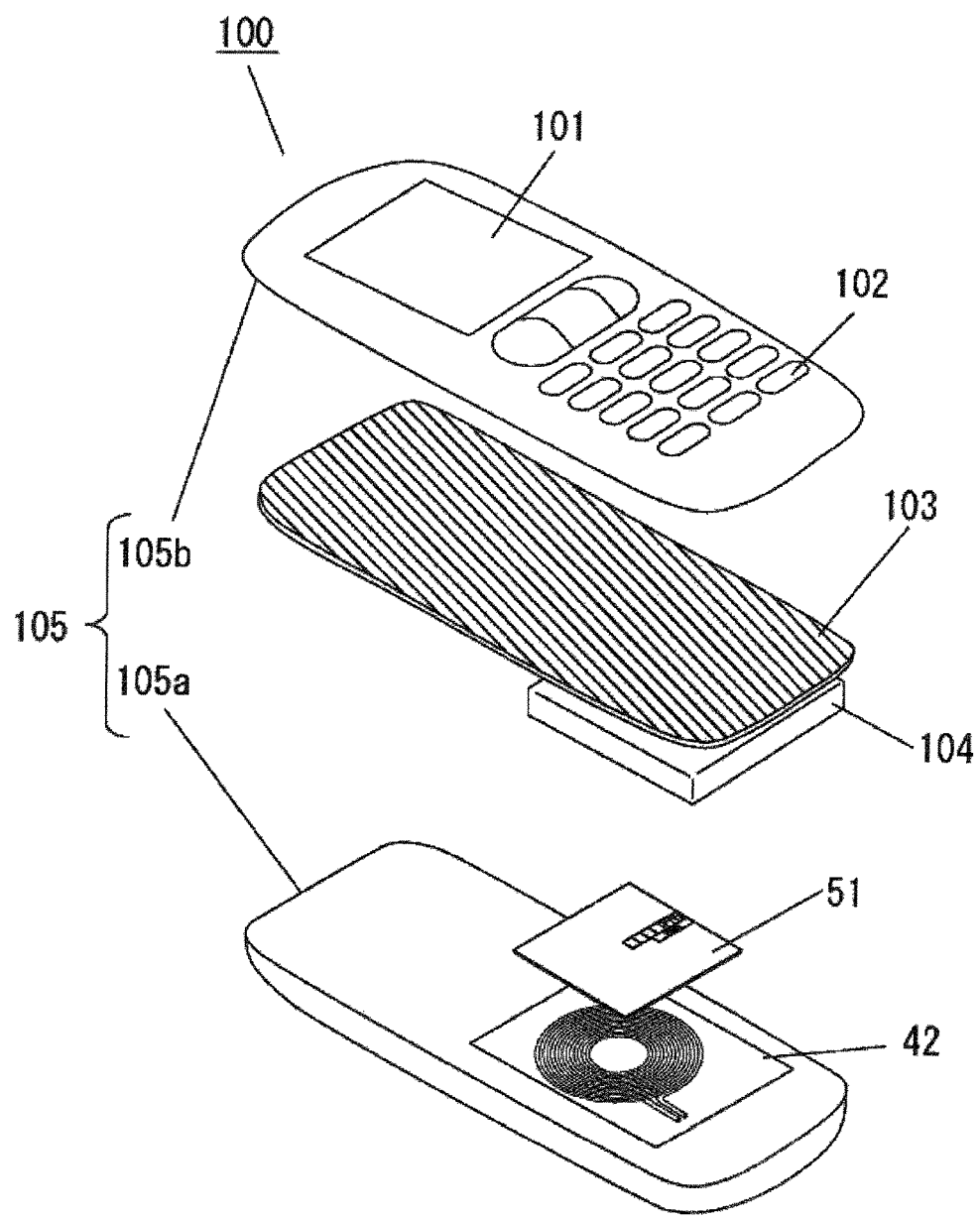
FIG. 1B is an assembled perspective view of the portable terminal apparatus in the embodiment of the present invention in the case where the NFC antenna is disposed between the secondary-side non-contact charging module and the battery pack.
Figure 1C:
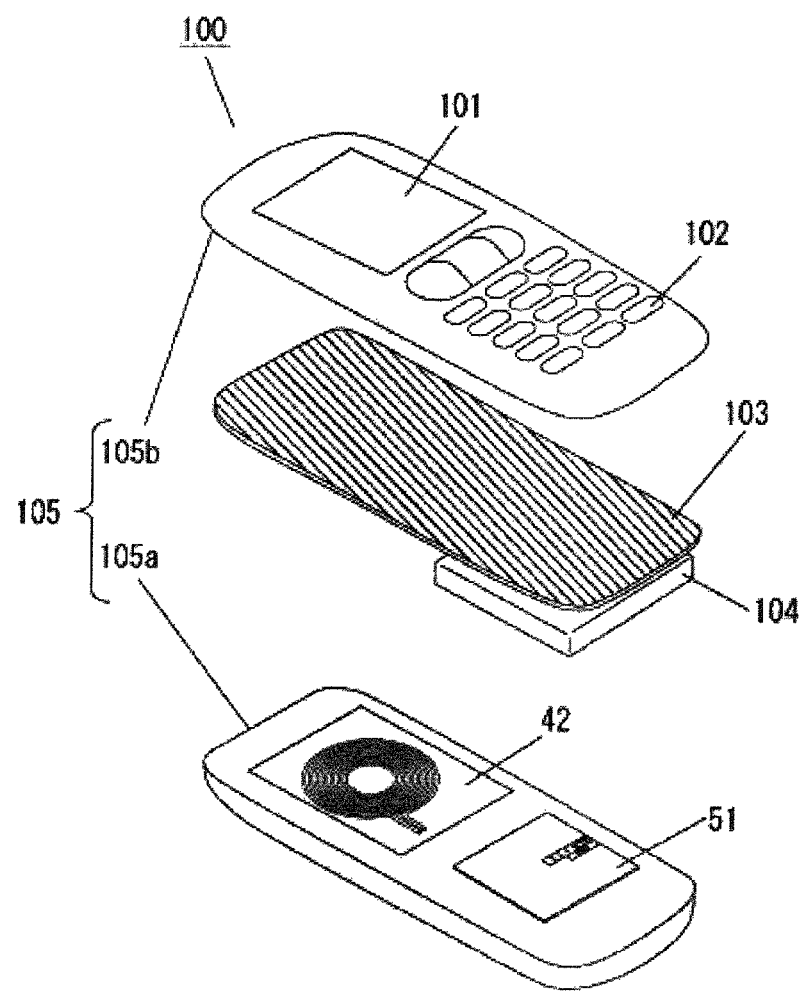
FIG. 1C is an assembled perspective view of the portable terminal apparatus in the embodiment of the present invention in the case where the secondary-side non-contact charging module is not stacked on the NFC antenna.
Figure 1D:
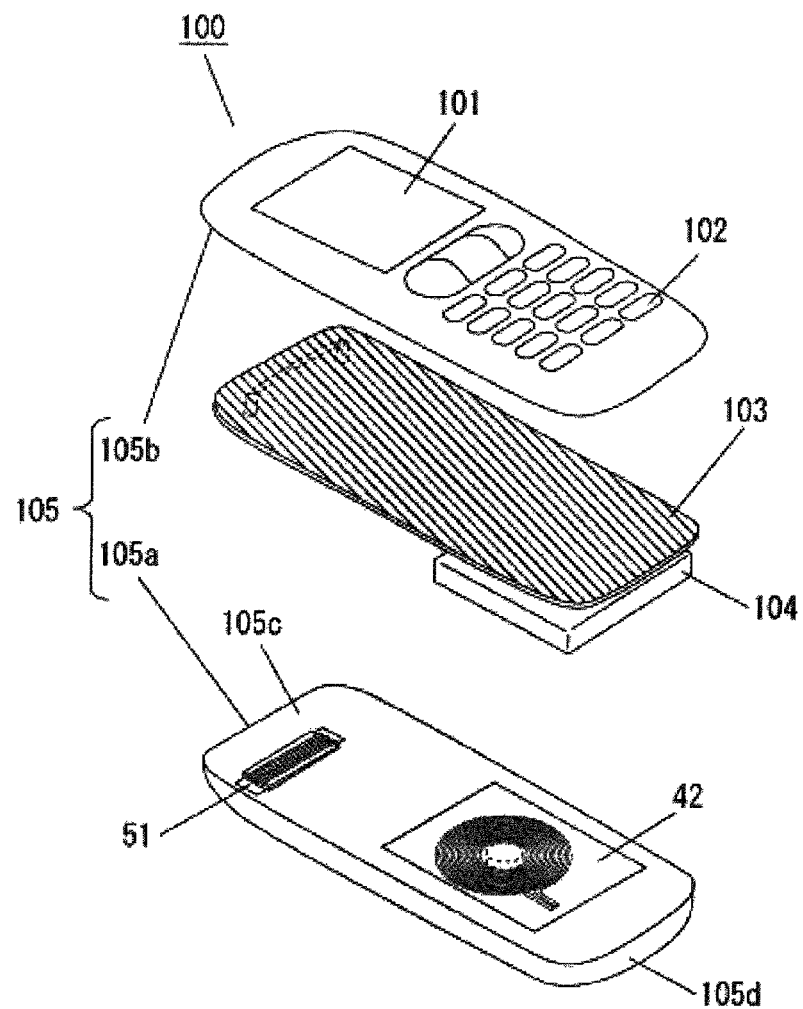
FIG. 1D is an assembled perspective view of the portable terminal apparatus in the embodiment of the present invention in the case where the NFC antenna is a stick type.

An overview of a communication apparatus in an embodiment of the present invention will be described below with reference to FIGS. 1A to 1D. FIG. 1A is an assembled perspective view of a portable terminal apparatus in an embodiment of the present invention in the case where a secondary-side non-contact charging module is disposed between an NFC antenna and a battery pack. FIG. 1B is an assembled perspective view of a portable terminal apparatus in the embodiment of the present invention in the case where the NFC antenna is disposed between the secondary-side non-contact charging module and the battery pack. FIG. 1C is an assembled perspective view of the portable terminal apparatus in the embodiment of the present invention in the case where the secondary-side non-contact charging module is not stacked on the NFC antenna. FIG. 1D is an assembled perspective view of the portable terminal apparatus in the embodiment of the present invention in the case where the NFC antenna is a stick type. In FIGS. 1A to 1D, to facilitate understanding, the fronts and the backs of the secondary-side non-contact charging module and the NFC antenna are set in the opposite directions. That is, in the secondary-side non-contact charging module and the NFC antenna, coils rather than magnetic sheets would essentially be disposed on lower housing 105a side.

Portable terminal apparatus 100, which is an example of a communication apparatus, includes liquid crystal panel (display) 101, operation button (an input unit) 102, substrate 103, battery pack 104, and housing 105 (lower housing 105a and upper housing 105b) and further includes secondary-side non-contact charging module 42 and NFC antenna 51. Portable terminal apparatus 100 can perform near field communication using NFC antenna 51 and can be charged in a non-contact manner by secondary-side non-contact charging module 42. Of course, a function of performing call, electronic mail, or the like other than the near field communication may be added to portable terminal apparatus 100. The display is not limited to liquid crystal panel 101 and may employ a system different from the liquid crystal panel, such as an organic EL display. In present embodiment, a largest control substrate (a main substrate) is referred to as substrate 103

Liquid crystal panel 101 is provided in upper housing 105b. Liquid crystal panel 101 is a display unit that displays an image, a moving image, or the like. Liquid crystal panel 101 is provided on the same surface as operation button 102 in upper housing 105b.

Operation button 102 is a button for operating portable terminal apparatus 100. A user can operate portable terminal apparatus 100 by pressing operation button 102. For example, the user can use operation button 102 to perform input of a telephone number of a counterpart, creation of a text of an electronic mail, or the like. Operation button 102 need not be an operation button of a mechanical structure as in the present embodiment. Liquid crystal panel 101 may be a touch panel and may employ a soft key with which the user can operate portable terminal apparatus 100 by touching liquid crystal panel 101.

Substrate 103 is provided on the rear surface of upper housing 105b in which liquid crystal panel 101 (or operation button 102) is provided. On substrate 103, circuit components for performing control of portable terminal apparatus 100, for example, receives information input from operation button 102 and displays necessary information on the liquid crystal panel. Substrate 103 has a shape such as a substantial square shape, a substantial rectangular shape, or a substantial L shape. However, substrate 103 is not limited to such shapes and may have any other polygonal shape.

Battery pack 104, which is an example of an electricity storing unit, can store electricity and supply electric power to portable terminal apparatus 100 (e.g., liquid crystal panel 101 or substrate 103). That is, portable terminal apparatus 100 is driven by electric power stored in battery pack 104.

Secondary-side non-contact charging module (reception-side non-contact charging module) 42 is supplied with electric power from a primary-side non-contact charging module (a transmission-side non-contact charging module) described below using electromagnetic induction and transmits the received electric power to battery pack 104. Consequently, battery pack 104 can be charged without being directly connected to a non-contact charger (details are described below) mounted with the primary-side non-contact charging module.

NFC antenna 51, which is an example of a sheet antenna, is used as an antenna for near field communication. NFC antenna 51 can also perform communication by performing transmission and reception using electromagnetic induction. The sheet antenna is not limited to NFC antenna 51 and only has to be an antenna of a magnetic field type that includes a plane coil and performs communication using a magnetic field. Driving power of NFC antenna 51 is obtained from a communication counterpart by electromagnetic induction in some case and is obtained from battery pack 104 in portable terminal apparatus 100 in other cases.

In housing 105, substrate 103, battery pack 104, secondary-side non-contact charging module 42, and NFC antenna 51 are housed.

A camera unit is sometimes housed in housing 105. Photographing direction of the camera unit is substantially the same as a power transmitting direction (a charging direction) of secondary-side non-contact charging module 42 or a communication direction of NFC antenna 51 and is a direction apart from housing 105 on the rear surface (lower housing 105a that is the surface opposite to liquid crystal panel 101) side of housing 105. Therefore, photographing is difficult if a component is interposed between the camera unit and lower housing 105a. It is possible to maintain high power transmission efficiency by bringing secondary-side non-contact charging module 42 as close as possible to primary-side non-contact charging module 41 (see FIG. 3). That is, it is necessary to place secondary-side non-contact charging module 42 as close as possible to lower housing 105a. Further, it is also necessary to place NFC antenna 51 close to lower housing 105a in order to secure a large communication distance of NFC communication.

In portable terminal apparatus 100 described above, in FIGS. 1A and 1B, secondary-side non-contact charging module 42 and NFC antenna 51 are disposed to be placed one on top of the other. Consequently, it is possible to suppress an alignment error for non-contact charging. That is, it is possible to suppress deterioration in power transmission efficiency of the non-contact charging.

In FIG. 1C, in portable terminal apparatus 100, secondary-side non-contact charging module 42 is not disposed in the communication direction of NFC antenna 51. NFC antenna 51 is not disposed in the charging direction of secondary-side non-contact charging module 42. Consequently, in portable terminal apparatus 100, secondary-side non-contact charging module 42 and NFC antenna 51 are allowed to coexist with each other.

In FIG. 1D, portable terminal apparatus 100, which is an example of a communication apparatus, includes liquid crystal panel (display) 101, operation button (input unit) 102, substrate 103, which is, for example, a metal body, battery pack 104, and housing 105 (lower housing 105a and upper housing 105b) and further includes secondary-side non-contact charging module 42 and NFC antenna 151. The control substrate and metal body 103 may be separate. That is, a communication range of NFC antenna 151 of the present invention depends on an arrangement relation between the metal body and NFC antenna 151. Therefore, when only substrate 103, which is not a metal body, is provided, it is difficult to expand the communication range of NFC antenna 151. In the present embodiment, metal body 103 will be described as a control substrate. However, the communication range of NFC antenna 151 may be expanded using an alternative metal body of portable terminal apparatus 100, other than metal body 103.

In portable terminal apparatus 100, housing 105 is a hexahedron, the bottom surface of which is substantially rectangular. Housing 105 is formed thin in a stack direction of lower housing 105a and upper housing 105b. In the present embodiment, NFC antenna 151 is disposed on one end portion 105c side on the short side of the rectangular bottom surface. Secondary-side non-contact charging module 42 is disposed on the other end portion 105d side on the short side of the bottom surface. Battery pack 104 is disposed on the other end portion 105d side.

NFC antenna 151 is placed on lower housing 105a. A terminal extends from metal body 103 to NFC antenna 151. Therefore, NFC antenna 151 is connected to metal body 103 by fitting lower housing 105a and upper housing 105b together. Of course, NFC antenna 151 may be placed on metal body 103. NFC antenna 151 may be disposed on upper housing 105b side of metal body 103. This is because NFC antenna 151 of the present invention can generate a magnetic flux on the opposite side around metal body 103. This will be described in detail below.

With the structure described above, portable terminal apparatus 100 can be mounted with both of secondary-side non-contact charging module 42 and NFC antenna 151.

Before describing a reason why secondary-side non-contact charging module 42 and NFC antenna 151 can be allowed to coexist with each other, the non-contact power transmitting apparatus (including secondary-side non-contact charging module 42), NFC antenna 51 (the sheet antenna), and NFC antenna 151 (the stick type) are described. In the following description, the non-contact power transmitting apparatus will be described with reference to FIGS. 2 to 9, NFC antenna 51 will be described with reference to FIGS. 13 and 14, and NFC antenna 151 will be described with reference to FIGS. 15 and 16.

[Description of System of Non-Contact Charging Module]

Figure 2:
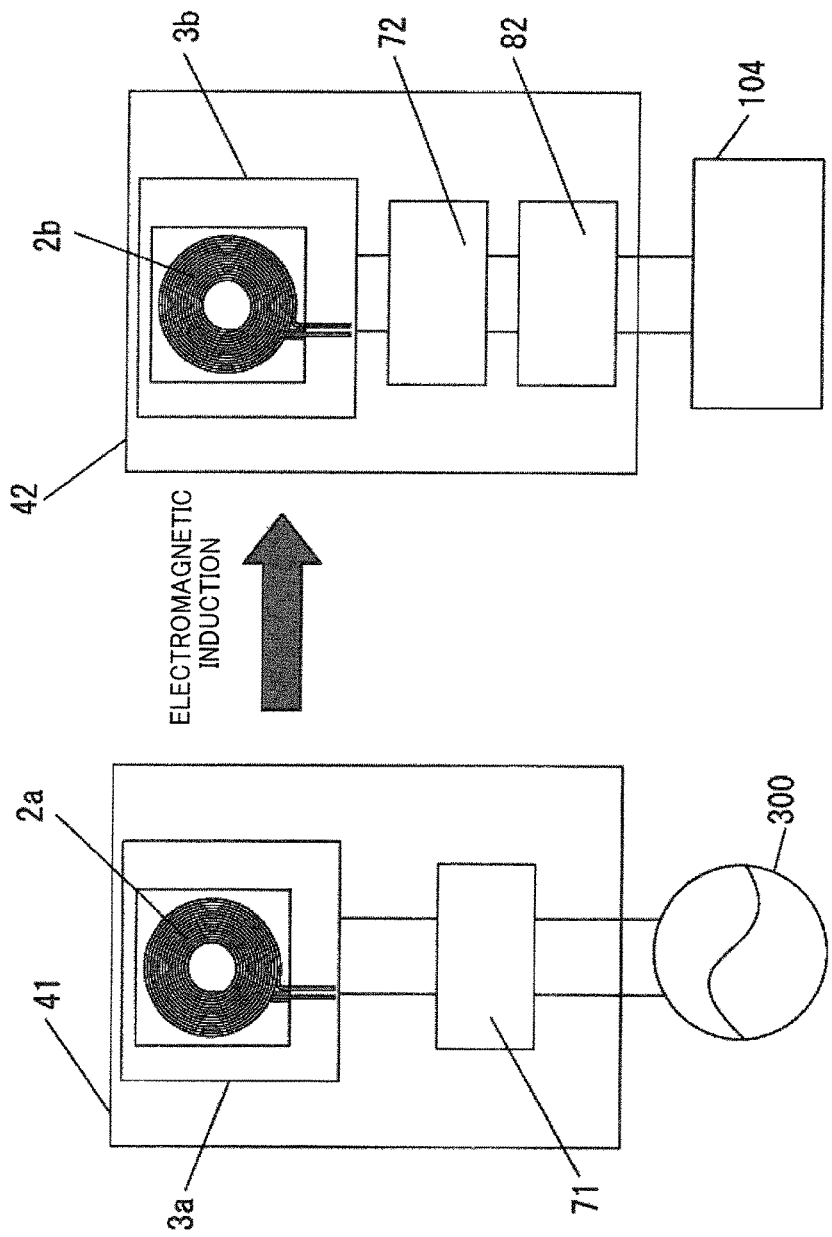
FIG. 2 is a block diagram showing a non-contact power transmitting apparatus in the embodiment of the present invention.

FIG. 2 is a block diagram illustrating a non-contact power transmitting apparatus according to an embodiment of the present invention.

The non-contact power transmitting apparatus includes primary-side non-contact charging module 41 (transmission-side non-contact charging module) and secondary-side non-contact charging module 42 (reception-side non-contact charging module). The non-contact power transmitting apparatus transmits power from primary-side non-contact charging module 41 to secondary-side non-contact charging module 42 using an electromagnetic induction action. The non-contact power transmitting apparatus is used in transmitting power of about 1 W to about 5 W or less. The frequency of power transmission is about 110 to 205 kHz. Primary-side non-contact charging module 41 is mounted to a charger and secondary-side non-contact charging module 42 is mounted to, for example, a mobile phone, a digital camera, or a personal computer (PC).

Primary-side non-contact charging module 41 is constituted by including primary-side coil 2a, primary-side magnetic sheet 3a, resonance capacitor (not illustrated), and power input section 71. Power input section 71 is connected to commercial power supply 300 functioning as an external power supply, receives power of about 100 to 240 V, converts the power into a first predetermined current (direct current 12 V, 1 A), and supplies the current to primary-side coil 2a. Primary-side coil 2a generates a magnetic field according to the shape thereof, the winding number thereof, and the supplied current. The resonance capacitor is connected to primary-side coil 2a. The resonance frequency of the magnetic field generated from primary-side coil 2a is determined according to the resonance capacitor with primary-side coil 2a. The electromagnetic induction action from primary-side non-contact charging module 41 to secondary-side non-contact charging module 42 is performed by the resonance frequency.

Meanwhile, secondary-side non-contact charging module 42 includes secondary-side coil 2b, secondary-side magnetic sheet 3b, resonance capacitor (not illustrated), rectifying circuit 72, and power output section 82. Secondary-side coil 2b converts the magnetic field generated from primary-side coil 2a into a second predetermined current by the electromagnetic induction action, and outputs the current to the outside of secondary-side non-contact charging module 42 through rectifying circuit 72 and power output section 82. Rectifying circuit 72 rectifies the second predetermined current which is an alternating current and converts the current into a third predetermined current which is a direct current (direct current 5 V, 1.5 A). Power output section 82 is an external output section of secondary-side non-contact charging module 42. Secondary-side coil 2b supplies power to battery pack 104 connected to secondary-side non-contact charging module 42 through power output section 82. Consequently, battery pack 104 is charged (electricity is stored in battery pack 104). The resonance capacitor of secondary-side non-contact charging module 42 may be provided on secondary-side non-contact module 42 or may be mounted to substrate 103 in portable terminal apparatus 100. When the resonance capacitor is mounted to substrate 103, secondary-side non-contact charging module 42 and the resonance capacitor are preferably disposed at a short distance. That is, substrate 103 and secondary-side non-contact charging module 42 are preferably disposed at a short distance, for example, stacked one on top of the other.

Next, the case where primary-side non-contact charging module 41 is mounted to a non-contact charger will be described.

[Description of Non-Contact Charger]

Figure 3:
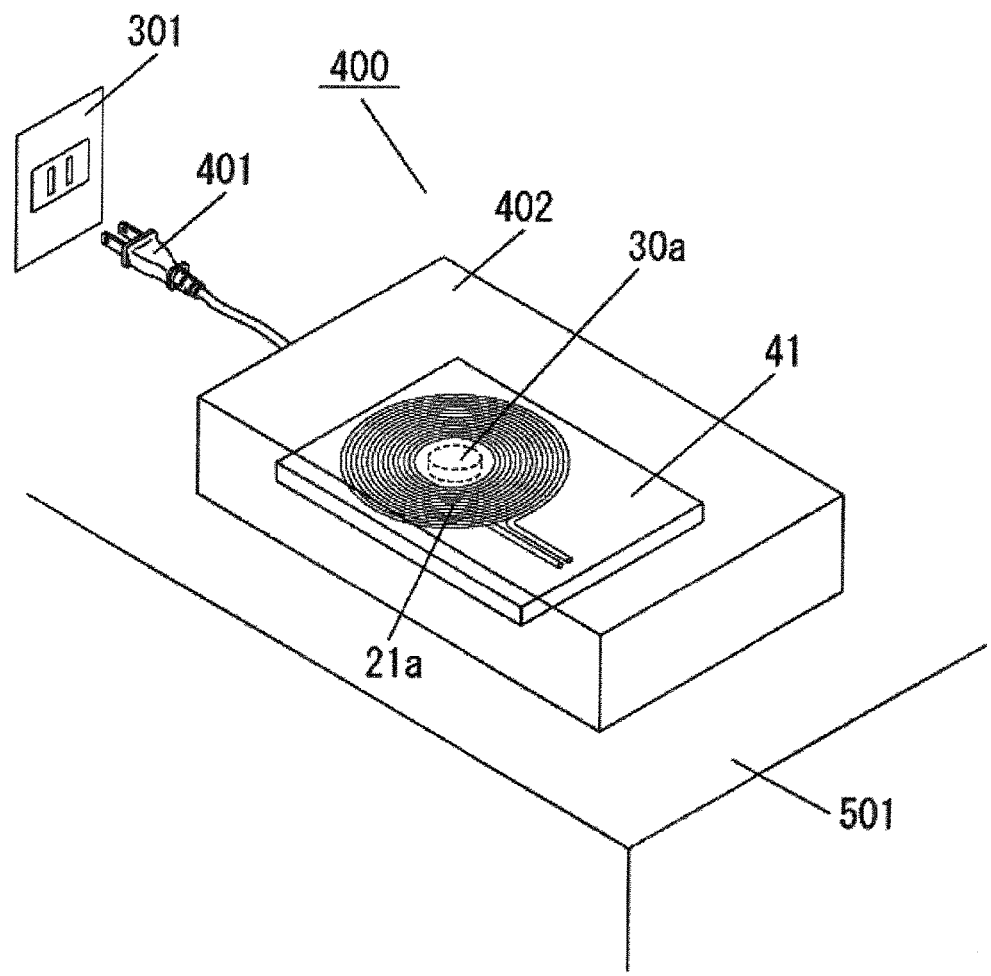
FIG. 3 is a perspective view showing the configuration of a non-contact charger in the embodiment of the present invention.

FIG. 3 is a perspective diagram illustrating the configuration of a non-contact charger according to the embodiment of the present invention.

Non-contact charger 400 has primary-side non-contact charging module 41 in a case constituting an exterior package.

Non-contact charger 400 has plug 401 that can be plugged into outlet 301 of commercial power supply 300 disposed indoors or outdoors. By plugging plug 401 into outlet 301, non-contact charger 400 can receive power from commercial power supply (not shown).

Non-contact charger 400 is disposed on desk 501 and primary-side non-contact charging module 41 is disposed in the vicinity of charging surface 402 of the side opposite to the side of a desk surface of non-contact charger 400. A principal surface of coil 21a in primary-side non-contact charging module 41 is disposed in parallel to charging surface 402 of the side opposite to the side of the desk surface of non-contact charger 400. In this way, a power reception work area of the electronic apparatus mounted with secondary-side non-contact charging module 42 can be secured. Non-contact charger 400 may be disposed on a wall surface. In this case, non-contact charger 400 is disposed in the vicinity of a surface of the side opposite to the side of the wall surface.

Primary-side non-contact charging module 41 may have magnet 30a that is used in aligning with secondary-side non-contact charging module 42. In this case, magnet 30a is disposed in a hollow portion that is positioned at a center area of coil 21a.

[Description of Non-Contact Charging Module]

Next, primary-side non-contact charging module 41 will be described.

Figure 4:
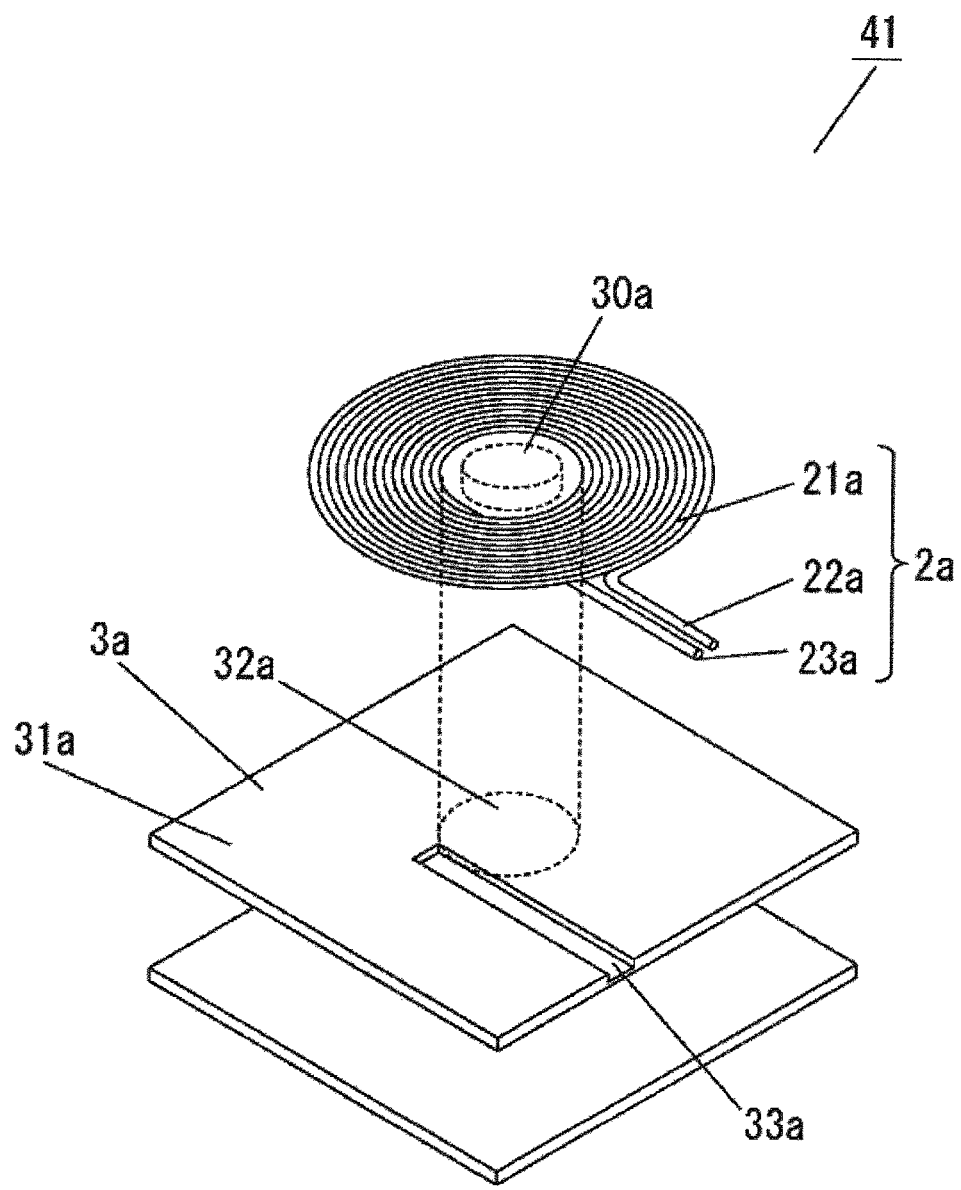
FIG. 4 is a diagram showing a primary-side non-contact charging module in the embodiment of the present invention.

FIG. 4 is a diagram illustrating the primary-side non-contact charging module according to the embodiment of the present invention and illustrating the case where the primary-side coil is circular. Though FIG. 4 illustrates the primary-side coil as a circular coil, the primary-side coil may be a rectangular coil. The primary-side non-contact charging module described in detail hereinafter is basically applied to the secondary-side non-contact charging module. The difference of the primary-side non-contact charging module and the secondary-side non-contact charging module will be described below.

Primary-side non-contact charging module 41 includes primary-side coil 2a where electrical lines are wound in a spiral shape and primary-side magnetic sheet 3a that is provided to face a surface of coil 21a of primary-side coil 2a.

As illustrated in FIG. 4, primary-side coil 2a includes coil 21a that is wound in a spiral shape on a single surface and terminals 22a and 23a that function as current supplying sections provided on both ends of coil 21a. The current from commercial power supply 300 which is the external power is supplied to primary-side coil 2a through these terminals 22a and 23a. A surface that is formed by the electrical lines in coil 21a is called a coil surface. The thickness direction is a stack direction of primary-side coil 2a and primary-side magnetic sheet 3a.

Primary-side magnetic sheet 3a includes flat portion 31a that places primary-side coil 2a, center portion 32a that is a center portion of flat portion 31a and corresponds to a hollow area of coil 21a, and linear concave portion 33a that inserts a part of a leading line of coil 21a. Center portion 32a may be formed in a convex shape, a flat shape, a concave shape, or a through-hole with respect to flat portion 31a. When center portion 32a is formed in the convex shape, the magnetic flux of coil 21a can be intensified. When center portion 32a is formed in the flat shape, primary-side magnetic sheet 3a is easily manufactured, coil 21a is easily placed on primary-side magnetic sheet 3a, and the influence of a magnet for aligning described below and an L value of coil 21a can be balanced. Center portion 32a formed in the concave shape and the through-hole will be described below.

In primary-side non-contact charging module 41 according to the present embodiment, coil 21a is wound in a doughnut shape from an inner diameter where a diameter is 20 mm to the outside and an outer diameter of the primary-side coil becomes 30 mm. Coil 21a may be wound in a circular shape and may be wound in a polygonal shape.

By winding the electrical lines to leave a space, the floating capacity between the electrical line of an upper stage and the electrical line of a lower stage decreases and alternating-current resistance of coil 21a can be suppressed to a minimum. In addition, the thickness of coil 21a can be suppressed by winding the electrical lines densely.

Primary-side non-contact charging module 41 may have magnet 30a that is used in aligning with secondary-side non-contact charging module 42. A shape of magnet 30a is defined to a circular shape and a diameter thereof is defined to 15.5 mm or less by the standard (WPC: Wireless Power Consortium). Magnet 30a has a coin shape and needs to be disposed such that a center thereof is matched with a winding center axis of primary-side coil 2a. This is to decrease an influence of magnet 30a with respect to primary-side coil 2a.

As a method of aligning of primary-side non-contact charging module 41 and secondary-side non-contact charging module 42, for example, the following methods are used. As an example, a method in which a convex portion is formed in a charging surface of a charger, a concave portion is formed in an electronic apparatus of the secondary-side, the convex portion is fitted into the concave portion, and thereby compulsory aligning is physically (geometrically) performed, is used. A method in which a magnet is mounted to at least one of an electronic apparatus of the primary-side and an electronic apparatus of the secondary-side, and thereby the magnets of both sides, or one magnet and the other magnetic sheet attract each other to perform aligning, is used. A method in which an electronic apparatus of the primary-side detects a position of a coil of an electronic apparatus of the secondary-side to automatically move a coil of the electronic apparatus of the primary-side to the position of the coil of the electronic apparatus of the secondary-side, is used. A method in which a plurality of coils are provided in a charger such that an electronic apparatus is chargeable in any place of a charging surface of the charger, is used.

As such, the various methods that are used in aligning of the coils of the primary-side non-contact charging module 41 and the secondary-side non-contact charging module 42 are described. However, the methods are divided into methods performed with the magnet and methods performed without the magnet. In addition, by configuring the primary-side non-contact charging module 41 to be adapted to both of the secondary-side non-contact charging module 42 with the magnet and the secondary-side non-contact charging module 42 without the magnet, charging can be performed regardless of a type of the secondary-side non-contact charging module 42. Therefore, convenience is improved. Likewise, by configuring the secondary-side non-contact charging module 42 to be adapted to both of the primary-side non-contact charging module 41 with the magnet and the primary-side non-contact charging module 41 without the magnet, charging can be performed regardless of a type of the primary-side non-contact charging module 41. Therefore, convenience is improved. That is, as a method of aligning of non-contact charging module that performs power transmission by the electromagnetic induction action and the other non-contact charging module which is a counterpart performing the power transmission, a method of aligning using the magnet included in the other non-contact charging module and a method of aligning without using the magnet are used.

In the case where primary-side non-contact charging module 41 has magnet 30a, magnet 30a can be disposed on a top surface of center portion 32a of primary-side magnetic sheet 3a. Magnet 30a can also be disposed instead of center portion 32a of primary-side magnetic sheet 3a. In the case, since magnet 30a is disposed in the hollow area of the coil 21a, a size of primary-side non-contact charging module 41 can be decreased.

When the magnet is not used in aligning of primary-side non-contact charging module 41 and secondary-side non-contact charging module 42, magnet 30a illustrated in FIG. 4 is not needed.

An influence of the magnet with respect to power transmission efficiency of the non-contact charging module will be described here. In general, the magnet is provided in a through-hole formed in the center of the coil incorporated in at least one of primary-side non-contact charging module 41 and secondary-side non-contact charging module 42. Thereby, the magnet of primary-side non-contact charging module 41 and the magnet of secondary-side non-contact charging module 42, or the magnet of secondary-side non-contact charging module 42 and primary-side magnetic sheet 3a can be placed closely to each other so as to be as close as possible, and, at the same time, the primary-side coil and the secondary-side coil can be placed closely each other. The magnet is circular. In this case, the diameter of the magnet becomes smaller than the inner width of coil 21a. In the present embodiment, the diameter of the magnet is about 15.5 mm (about 10 to 20 mm) and the thickness of the magnet is about 1.5 to 2 mm. A neodymium magnet may be used for the magnet. In this case, the strength of the neodymium magnet may be about 75 to 150 mT. In the present embodiment, since an interval of the coil of the primary-side non-contact charging module 41 and the coil of the secondary-side non-contact charging module 42 is about 2 to 5 mm, sufficient aligning can be performed by the corresponding magnet.

When the magnetic flux is generated between the primary-side coil and the secondary-side coil to transmit power, if the magnet exists between the primary-side coil and the secondary-side coil or around the primary-side coil or around the secondary-side coil, the magnetic flux extends to avoid the magnet. In this case, the magnetic flux that passes through the magnet becomes an eddy current or generates heat in the magnet and is lost. If the magnet is disposed in the vicinity of the magnetic sheet, the permeability of the magnetic sheet in the vicinity of the magnet may be decreased. Therefore, magnet 30a that is included in primary-side non-contact charging module 41 may decrease the L values of both primary-side coil 2a and secondary-side coil 2b. As a result, transmission efficiency between the non-contact charging modules may be decreased.

Figures 5A, 5B:
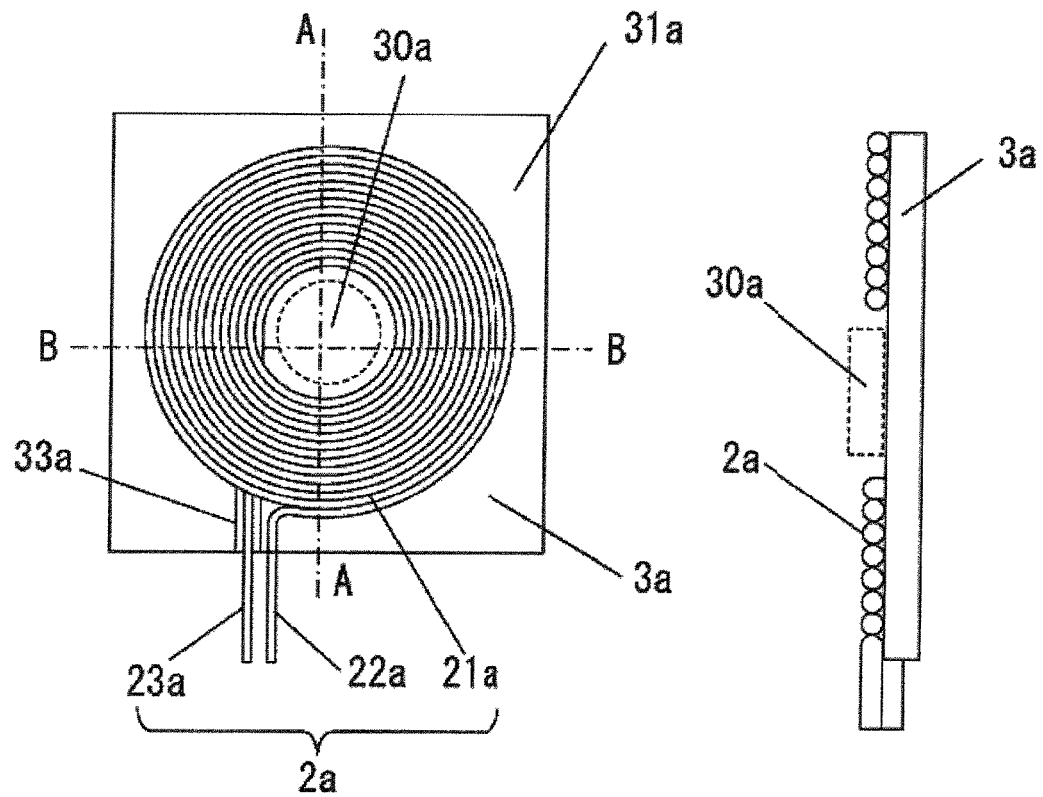
FIGS. 5A to 5D are detailed diagrams showing the primary-side non-contact charging module in the embodiment of the present invention.
Figure 5C:
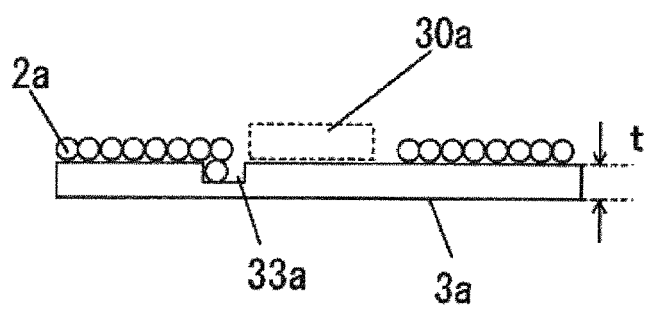
Figure 5D:
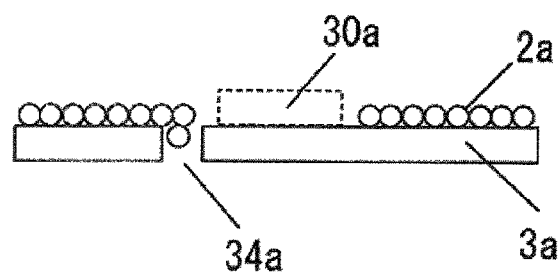

FIGS. 5A to 5D are detailed diagrams illustrating the primary-side non-contact charging module according to the embodiment of the present invention. FIG. 5A is a top view of the primary-side non-contact charging module and FIG. 5B is a cross-sectional view taken along the line A-A of the primary-side non-contact charging module in FIG. 5A. FIG. 5C is a cross-sectional view taken along the line B-B of the primary-side non-contact charging module in FIG. 5A in the case where a linear concave portion is provided. FIG. 5D is a cross-sectional view taken along the line B-B of the primary-side non-contact charging module in FIG. 5A in the case where a slit is provided. FIGS. 5A and 5B illustrate the case where magnet 30a is not included. In FIGS. 5A and 5B, When magnet 30a is included, magnet 30a is illustrated by a dotted line.

Coil 21a achieves decreasing the thickness of non-contact charger 400 mounted with primary-side non-contact charging module 41. For this reason, an area from a winding starting portion positioned in a center area of coil 21a to terminal 23a is configured as two stages in the thickness direction and the remaining area is configured as one stage. At this time, in coil 21a, by winding the electrical line of the upper stage and the electrical line of the lower stage to leave a space, the floating capacity between the electrical line of the upper stage and the electrical line of the lower stage decreases, and the alternating-current resistance of coil 21a can be suppressed to a minimum.

When the electrical lines are stacked and coil 21a is extended in the thickness direction of primary-side non-contact charging module 41, the amount of current that flows to primary-side coil 2a can be increased by increasing the winding number of coil 21a. In coil 21a, when the electrical lines are stacked, by densely winding the electrical line of the upper stage and the electrical line of the lower stage, the thickness of coil 21a is suppressed, and the amount of current flowing to primary-side coil 2a can be increased.

In the present embodiment, coil 21a is formed using the electrical lines having a circular cross-sectional shape. However, the electrical lines that have a rectangular cross-sectional shape may be used. When the electrical lines having the circular cross-sectional shape are used, gaps are generated between the electrical lines adjacent to each other. For this reason, the floating capacity between the electrical lines decreases and the alternating-current resistance of coil 21a can be suppressed to a minimum.

Winding coil 21a in one stage in the thickness direction, instead of winding coil 21a in two stages in the thickness direction results in decrease of the alternating-current resistance of coil 21a and transmission efficiency can be increased. This is because the floating capacity is generated between the electrical line of the upper stage and the electrical line of the lower stage, if the electrical lines are wound in the two stages. Therefore, it is preferable to wind most of the parts of coil 21a in one stage, instead of winding all of the parts of coil 21a in two stages. By winding coil 21a in one stage, primary-side non-contact charging module 41 can be formed to have the small thickness. When primary-side coil 2a is configured by the two electrical lines, the two electrical lines are electrically connected by solder and the like in portions of terminals 22a and 23a. For this reason, the two electrical lines may be configured as one thick electrical line. The two electrical lines may be wound in parallel to the coil surface and may be wound vertically to the coil surface. That is, when the two electrical lines are parallel to the coil surface, the two electrical lines are wound around the same center in a planar shape and one electrical line is inserted into the other electrical line in the radial direction. As such, the two electrical lines are bonded in the portions of terminals 22a and 23a to function as one electrical line, and the thickness can be suppressed even though the electrical lines have the same cross-sectional area. That is, the cross-sectional area of the electrical line where the diameter is 0.25 mm can be obtained by preparing two electrical lines where the diameter is 0.18 mm. Therefore, if one electrical line where the diameter is 0.25 mm is prepared, the thickness of one turn of coil 21a is 0.25 mm and the width of coil 21a in the radial direction is 0.25 mm. However, if two electrical lines where the diameter is 0.18 mm are prepared, the thickness of one turn of coil 21a is 0.18 mm and the width of coil 21a in the radial direction is 0.36 mm. The thickness direction is a stack direction of primary-side coil 2a and primary-side magnetic sheet 3a. Only parts of the center side of coil 21a may overlap in two stages in the thickness direction and the remaining part of the outside may be configured as one stage. In the case where the electrical lines are wound vertically to the coil surface, the thickness of the non-contact charging module increases. However, the cross-sectional area of the electrical line increase substantially, the amount of current that flows to primary-side coil 2a can be increased, and the sufficient winding number can be easily secured. In the present embodiment, primary-side coil 2a is configured by the electrical lines having the diameter of about 0.18 to 0.35 mm. In primary-side coil 2a of primary-side non-contact charging module 41, the electrical lines having the diameter of 0.25 to 0.35 mm are preferable.

The loss in coil 21a can be prevented by decreasing the alternating-current resistance of coil 21a and power transmission efficiency of primary-side non-contact charging module 41 that depends on the L value can be improved by improving the L value.

In the present embodiment, coil 21a is formed in an annular shape (circular shape). A shape of coil 21a is not limited to the annular shape (circular shape) and may be an elliptical shape, a rectangular shape, and a polygonal shape. If aligning of primary-side non-contact charging module 41 and secondary-side non-contact charging module 42 is considered, the shape of coil 21a is preferably the annular shape (circular shape). This reason is as follows. When the shape of coil 21a is the annular shape (circular shape), because transmission/reception of power can be performed over a wider range, aligning of coil 21a of primary-side non-contact charging module 41 and coil 21b of secondary-side non-contact charging module 42 can be easily performed. That is, since transmission/reception of the power can be performed over a wider range, it is difficult that secondary-side non-contact charging module 42 receives an influence of an angle with respect to primary-side non-contact charging module 41.

Terminals 22a and 23a may be placed closely each other and may be apart from each other. When terminals 22a and 23a are apart from each other, primary-side non-contact charging module 41 may be easily mounted.

Primary-side magnetic sheet 3a is provided to improve power transmission efficiency of non-contact charging using the electromagnetic induction action, and includes flat portion 31a, center portion 32a that is a center and corresponds to an inner diameter of coil 21a, and linear concave portion 33a. When magnet 30a is provided to perform aligning of primary-side non-contact charging module 41 and secondary-side non-contact charging module 42, magnet 30a may be disposed above center portion 32a and may be disposed at the position instead of center portion 32a.

As primary-side magnetic sheet 3a, a ferrite sheet of the Ni—Zn system, a ferrite sheet of the Mn—Zn system, and a ferrite sheet of the Mg—Zn system and the like may be used. Primary-side magnetic sheet 3a may be configured as a single layer, may be configured by stacking a plurality of sheets made of the same material in the thickness direction, and may be configured by stacking a plurality of different magnetic sheets in the thickness direction. Primary-side magnetic sheet 3a is preferably configured such that the permeability is 250 or more and the saturation magnetic flux density is 350 mT or more.

An amorphous metal may be used as primary-side magnetic sheet 3a. When the ferrite sheet is used as primary-side magnetic sheet 3a, it is advantageous that the alternating-current resistance of coil 21a can be decreased, and when the amorphous metal is used as magnetic sheet, the thickness of coil 21a can be decreased.

Primary-side magnetic sheet 3a used in primary-side non-contact charging module 41 has a size fit in the size within about 50×50 mm and has thickness equal to or smaller than about 3 mm. In the present embodiment, primary-side magnetic sheet 3a has a substantial square shape and a size of about 33 mm×33 mm. Primary-side magnetic sheet 3a is desirably formed in the same size as coil 21a or larger than coil 21a. The shape of primary-side magnetic sheet 3a may be a circular shape, a rectangular shape, a polygonal shape, or substantially a rectangular shape or a polygonal shape including thick curves at four corners.

Linear concave portion 33a or slit 34a house the electrical lines from the innermost portion of coil 21a to terminal 23a. Consequently, it is possible to prevent the electrical lines from the innermost portion of coil 21a to terminal 23a from overlapping in the thickness direction of coil 21a and suppress the thickness of primary-side non-contact charging module 41. It is possible to suppress occurrence of a leak magnetic flux by setting the size of linear concave portion 33a or slit 34a to minimum size for housing the electrical lines from the innermost portion of coil 21a to terminal 23a. The sectional shape of linear concave portion 33a is not limited to a rectangular shape and may be an arcuate shape or a rounded shape.

Linear concave portion 33a or slit 34a is substantially perpendicular to the end of primary-side magnetic sheet 3a that one end of linear concave portion 33a or slit 34a crosses and is formed to overlap the external shape of center portion 32a (on a tangent in a circular coil or on a side in a rectangular coil). By forming linear concave portion 33a or slit 34a as described above, it is possible to form terminals 22a and 23a without bending the innermost portion of electrical lines. The length of linear concave portion 33a or slit 34a depends on the inner diameter of coil 21a. In the case of the present embodiment, the length is about 15 mm to 20 mm.

Linear concave portion 33a or slit 34a may be formed in a portion where the end of primary-side magnetic sheet 3a and the outer circumference of center portion 32a are closest to each other. Consequently, it is possible to minimize a forming area of linear concave portion 33a or slit 34a and improve the transmission efficiency of the non-contact power transmission apparatus. In this case, the length of linear concave portion 33a or slit 34a is about 5 mm to 10 mm. In both the arrangements described above, the inner side end of linear concave portion 33a or slit 34a is connected to center portion 32a.

Linear concave portion 33a or slit 34a may be disposed in other ways. That is, coil 21a is desirably formed in a one-stage structure as much as possible. In that case, in linear concave portion 33a or slit 34a, it is conceivable to form all turns in the radial direction of coil 21a in the one-stage structure or form a part in the one-stage structure and form the other portions in a two-stage structure. Therefore, one of terminals 22a and 23a can be drawn out from the outer circumference of coil 21a. However, the other has to be drawn out from the inner side. When a wound portion of coil 21a and a portion from a winding end of coil 21a to terminal 22a or 23a always overlap in the thickness direction, linear concave portion 33a or slit 34a only has to be provided in the overlapping portion.

When linear concave portion 33a is used, a through-hole or a slit is not provided in primary-side magnetic sheet 3a. Therefore, it is possible to prevent a magnetic flux from leaking and improve the power transmission efficiency of primary-side non-contact charging module 41. Meanwhile, when slit 34a is used, it is easy to form primary-side magnetic sheet 3a. When linear concave portion 33a is used, the sectional shape thereof is not limited to a square shape and may be an arcuate shape or a rounded shape.

Next, the influence of a magnet on primary-side non-contact charging module 41 and secondary-side non-contact charging module 42 will be described below. Secondary-side coil 2b in secondary-side non-contact charging module 42 receives a magnetic field generated by primary-side non-contact charging module 41 and performs power transmission. If a magnet is disposed around primary-side coil 2a and secondary-side coil 2b, a magnetic field may be generated to avoid the magnet or no magnetic field that passes through the magnet may be generated. The permeability of a portion of primary-side magnetic sheet 3a close to the magnet may be decreased. That is, the magnetic field may be weakened by the magnet. Therefore, in order to minimize the magnetic field weakened by the magnet, it is necessary to take a measure such as a measure for increasing the distance between primary-side coil 2a and secondary-side coil 2b and the magnet or including primary-side magnetic sheet 3a that is less easily affected by the magnet.

Primary-side non-contact charging module 41 is used for a fixed terminal as a transmission side of power supply. For this reason, there is room in an occupied space in the fixed terminal of primary-side non-contact charging module 41. An electric current flowing to primary-side coil 2a of primary-side non-contact charging module 41 is large. For this reason, the insulation properties of primary-side magnetic sheet 3a are important. This is because, if primary-side magnetic sheet 3a is conductive, it is likely that a large current flow through primary-side coil 2a is transmitted to the other components via primary-side magnetic sheet 3a.

In consideration of the abovementioned points, primary-side magnetic sheet 3a mounted to primary-side non-contact charging module 41 is preferably a Ni—Zn ferrite sheet (insulative) having the thickness equal to or larger than 400 µm (preferably 600 µm to 1 mm), having permeability equal to or higher than 250 as a magnetic characteristic, and magnetic flux saturated density equal to or higher than 350 mT. However, if sufficient insulation treatment is applied to primary-side magnetic sheet 3a, a Mn—Zn ferrite sheet (conductive) can be used instead of the Ni—Zn ferrite sheet.

In primary-side non-contact charging module 41, the L value of coil 21a greatly changes in the case where magnet 30a is used as aligning and the case where magnet 3a is not used as aligning. That is, if magnet 30a is present in primary-side non-contact charging module 41 or the same magnet is present in secondary-side non-contact charging module 42, a magnetic flux between the primary-side and secondary-side non-contact charging modules is prevented. When the magnet is present, the L value of coil 21a is greatly decreased. In order to suppress the influence by magnet 30a, primary-side magnetic sheet 3a is preferably a high saturated magnetic flux density material (having saturated magnetic flux density equal to or higher than 350 mT). In the high saturated magnetic flux density material, a magnetic flux is less easily saturated even if a magnetic field is intensified. Therefore, by forming primary-side magnetic sheet 3a with the high saturated magnetic flux density material, primary-side magnetic sheet 3a is less easily affected by magnet 30a. It is possible to improve the L value of coil 21a when magnet 30a is used. Therefore, it is possible to decrease the thickness of primary-side magnetic sheet 3a.

However, if the permeability of primary-side magnetic sheet 3a is too low, the L value of coil 21a markedly decreases. As a result, the efficiency of primary-side non-contact charging module 41 may be deteriorated. Therefore, the permeability of primary-side magnetic sheet 3a is at least equal to or higher than 250 and preferably equal to or higher than 1500. The L value depends on the thickness of primary-side magnetic sheet 3a as well. The thickness of ferrite sheet 3 only has to be equal to or larger than 400 μm. Ferrite sheet 3 can decrease the alternating-current resistance of coil 21a compared with a magnetic sheet of amorphous metal. However, ferrite sheet 3 may be amorphous metal. By using such primary-side magnetic sheet 3a, even if at least one of primary-side non-contact charging module 41 and secondary-side non-contact charging module 42 includes a magnet, it is possible to decrease the influence of the magnet in primary-side non-contact charging module 41.

Further, decrease in the thickness is possible by changing the ferrite sheet to a Mn—Zn sheet. Specifically, the frequency of electromagnetic induction is defined to about 10 kHz to 200 kHz (e.g., 120 kHz) by the standard (WPC). The Mn—Zn ferrite sheet has high efficiency in such a low-frequency band. A Ni—Zn ferrite sheet has high efficiency at a high frequency.

Next, secondary-side non-contact charging module 42 will be described.

Figure 6:
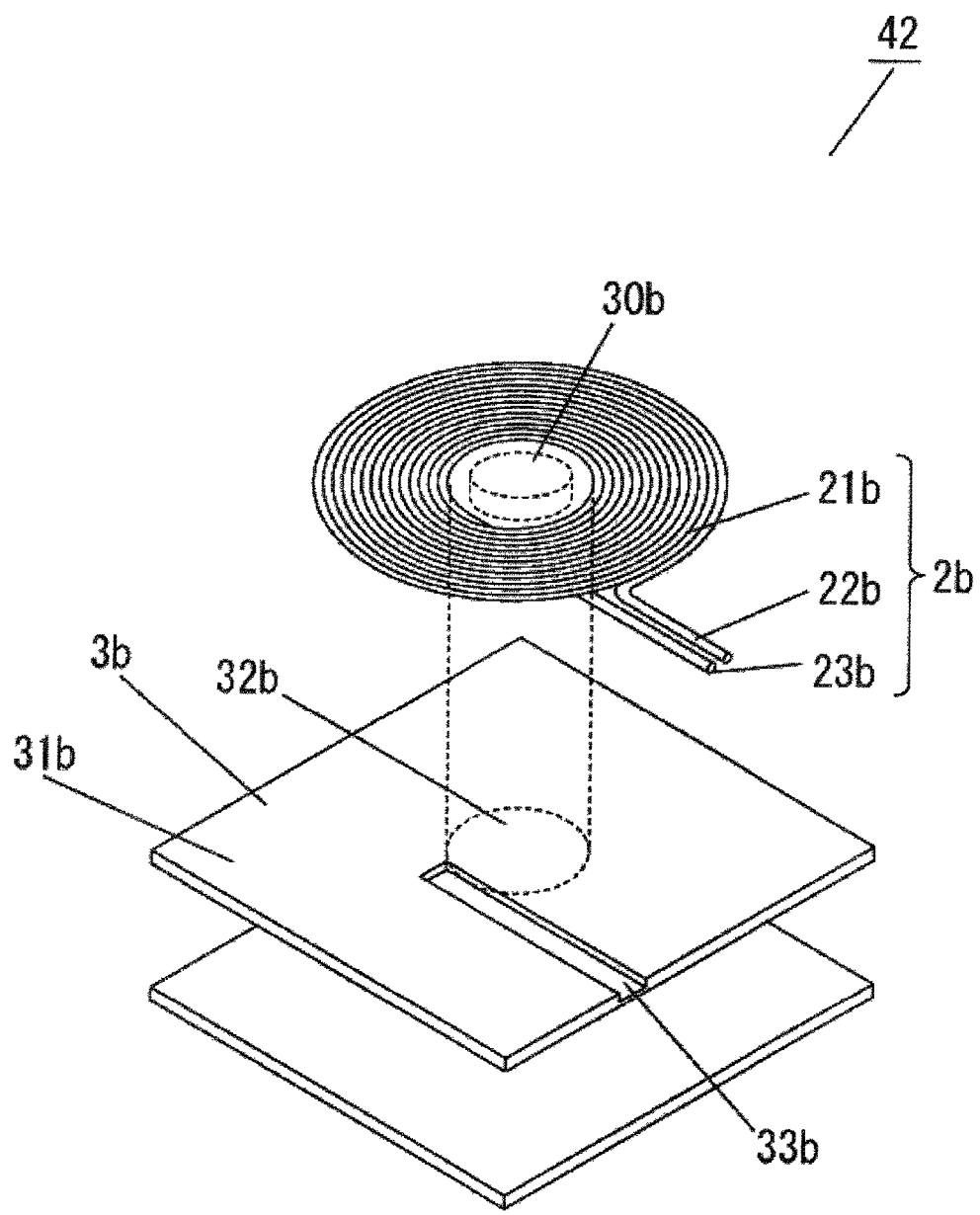
FIG. 6 is a diagram showing the secondary-side non-contact charging module in the embodiment of the present invention.

FIG. 6 is a diagram showing secondary-side non-contact charging module 42 in the embodiment of the present invention. In FIG. 6, a secondary-side coil is a circular coil.

FIGS. 7A to 7D are detailed diagrams showing secondary-side non-contact charging module 42 in the embodiment of the present invention. FIG. 7A is a top view of secondary-side non-contact charging module 42. FIG. 7B is a cross-sectional view taken along the line C-C of secondary-side non-contact charging module 42 in FIG. 7A. FIG. 7C is a cross-sectional view taken along the line D-D of secondary-side non-contact charging module 42 in FIG. 7A in the case where a linear concave portion is provided. FIG. 7D is a cross-sectional view taken along the line D-D of secondary-side non-contact charging module 42 in FIG. 7A in the case where a slit is provided. In FIGS. 7A and 7B, magnet 30b is indicated by a dotted line. However, magnet 30b does not have to be provided.

FIGS. 6 and 7A to 7D for describing secondary-side non-contact charging module 42 respectively correspond to FIGS. 4 and 5A to 5D for describing primary-side non-contact charging module 41. Therefore, detailed description of members and sections of secondary-side non-contact charging module 42 is omitted. The configuration of secondary-side non-contact charging module 42 is substantially the same as primary-side non-contact charging module 41.

Secondary-side non-contact charging module 42 is different from primary-side non-contact charging module 41 in the size and the material of secondary-side magnetic sheet 3b. Secondary-side magnetic sheet 3b has a size fit in the size within about 40×40 mm and has thickness equal to or smaller than about 2 mm.

According to this embodiment, the size of primary-side magnetic sheet 3a and the size of secondary-side magnetic sheet 3b are different. This is because, in general, secondary-side non-contact charging module 42 is mounted to a portable electronic apparatus that is required to be small. In the present embodiment, secondary-side magnetic sheet 3b has a substantial square shape and a size of about 33 mm×33 mm. Secondary-side magnetic sheet 3b is desirably formed in the same size as coil 21b or larger than coil 21b. The shape of secondary-side magnetic sheet 3b may be a circular shape, a rectangular shape, a polygonal shape, or substantially a rectangular shape or a polygonal shape including large curves at four corners.

There is no room in an occupied space in a portable terminal of secondary-side non-contact charging module 42 mounted to the portable terminal. For this reason, an electric current flowing to secondary-side coil 2b of secondary-side non-contact charging module 42 is small compared with an electric current flowing to primary-side coil 2a. Therefore, the insulation properties of secondary-side magnetic sheet 3b are not much requested compared with primary-side magnetic sheet 3a. In the present embodiment, secondary-side coil 2b is formed by an electric line having a size of about 0.18 to 0.35 mm. In particular, secondary-side coil 2b is preferably formed by an electric line having a size of about 0.18 to 0.30 mm.

When an electronic apparatus to which secondary-side non-contact charging module 42 is mounted is a cellular phone, secondary-side non-contact charging module 42 is often disposed between a case constituting an exterior package of the cellular phone and a battery pack located on the inside of the case. In general, since the battery pack is an aluminum housing, the battery pack adversely affects power transmission. This is because an eddy current is generated in a direction for weakening a magnetic flux generated from a coil. Therefore, it is necessary to provide secondary-side magnetic sheet 3b between the housing of the battery pack and secondary-side coil 2b disposed on the housing of the battery pack to reduce the influence of the battery pack.

According to the above description, a sheet having high permeability and saturated magnetic flux density is used as secondary-side magnetic sheet 3b. It is necessary to set the L value of secondary-side coil 2b as large as possible. Basically, similar to line primary-side magnetic sheet 3a, secondary-side magnetic sheet 3b only has to have permeability equal to or higher than 250 and saturated magnetic flux density equal to or higher than 350 mT. In the present embodiment, it is preferable that secondary-side magnetic sheet 3b is a sintered body of Mn—Zn ferrite and has permeability equal to or higher than 1500, saturated magnetic flux density equal to or higher than 400, and thickness equal to or larger than about 400 μm. However, if secondary-side magnetic sheet 3b is formed of Ni—Zn ferrite and has permeability equal to or higher than 250 and saturated magnetic flux density equal to or higher than 350, power transmission with primary-side non-contact charging module 41 can be performed. Like primary-side coil 2a, secondary-side coil 2b is wound in a circular shape or a rectangular shape. Aligning of primary-side coil 2a and secondary-side coil 2b may be performed using magnet 30a provided in primary-side non-contact charging module 41 or may be performed without providing magnet 30a in primary-side non-contact charging module 41.

Next, a relation between the size of magnet 30a and the size of the inner diameter of primary-side coil 2a will be described. In the following description, magnet 30a is disposed in primary-side non-contact charging module 41. However, the same relation holds when magnet 30b is disposed in secondary-side non-contact charging module 42.

Figure 8A:
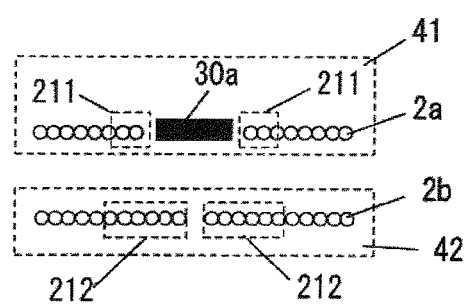
FIGS. 8A to 8D are diagrams showing a relation between the primary-side non-contact charging module including a magnet and the secondary-side non-contact charging module.
Figure 8B:
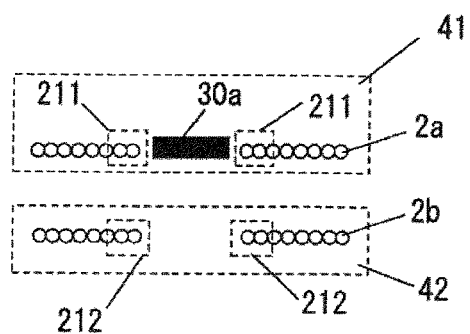
Figure 8C:
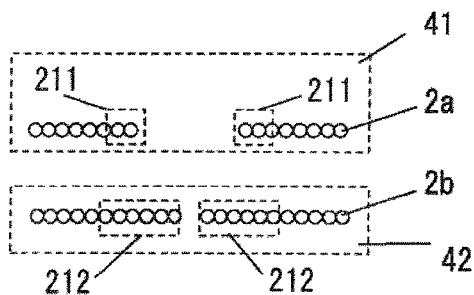
Figure 8D:
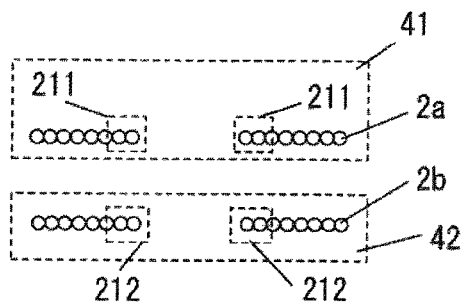
Figure 9:
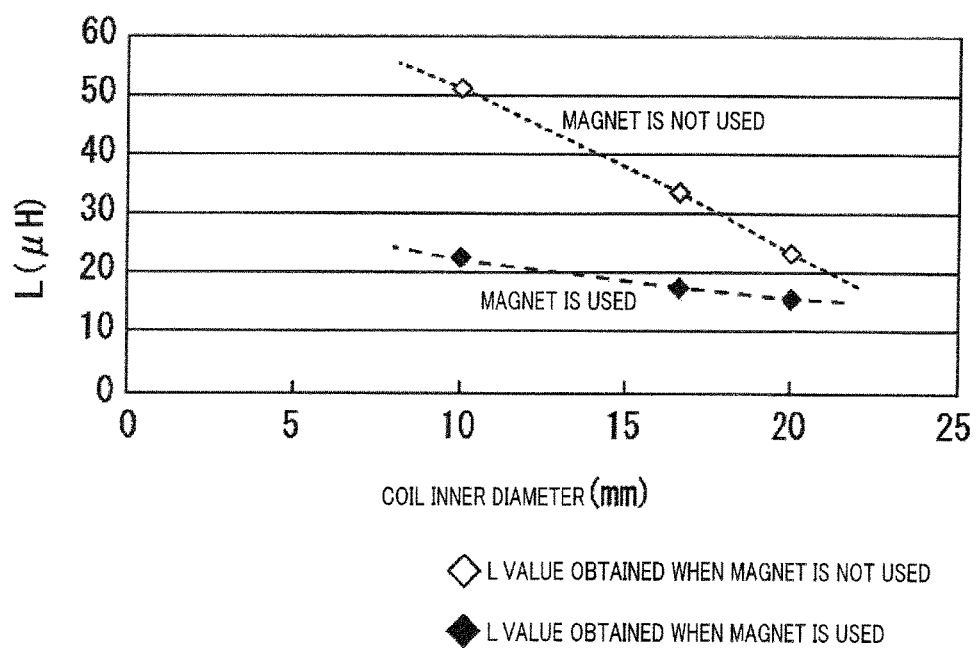
FIG. 9 is a diagram showing a relation between the inner diameter of a coil and an L value of the coil.

FIGS. 8A to 8D are diagrams showing a relation between primary-side non-contact charging module 41 including the magnet and secondary-side non-contact charging module 42. In FIG. 8A, a magnet for aligning is used when the inner width of a coil is small. In FIG. 8B, the magnet for aligning is used when the inner width of the coil is large. In FIG. 8C, the magnet for aligning is not used when the inner width of the coil is small. In FIG. 8D, the magnet for aligning is not used when the inner width of the coil is large. In FIG. 8, primary-side non-contact charging module 41 including magnet 30a and secondary-side coil 2b of secondary-side non-contact charging module 42 are described. However, the description of secondary-side coil 2b is also applied to secondary-side non-contact charging module 42 including magnet 30b and primary-side coil 2a of primary-side non-contact charging module 41. That is, a plane coil section of a non-contact charging module that can perform aligning and power transmission in both the case where the other non-contact charging module, which is a counterpart of power transmission, includes a magnet and the case where the other non-contact charging module does not include a magnet will be described. FIG. 9 is a diagram showing a relation between the inner diameter of the coil and an L value of the coil.

In FIGS. 8A and 8B, magnet 30a is housed in a through-hole of primary-side coil 2a. However, the same applies when magnet 30a is housed in a through-hole of secondary-side coil 2b.

Primary-side coil 2a and secondary-side coil 2b face each other. In coils 21a and 21b, magnetic fields are generated from inner side portions 211 and 212 as well. Inner side portions 211 and 212 face each other. Inner side portions 211 and 212 are close to magnet 30a and easily adversely affected by magnet 30a. That is, when a magnet is present between primary-side coil 2a and secondary-side coil 2b or around primary-side coil 2a or around secondary-side coil 2b, magnetic fluxes generated between primary-side coil 2a and secondary-side coil 2b extend to avoid the magnet. Alternatively, a magnetic flux that passes through the magnet among the magnetic fluxes generated between primary-side coil 2a and secondary-side coil 2b becomes an eddy current or generates heat in the magnet and is lost.

Further, if the magnet is disposed in the vicinity of the magnetic sheet, the permeability of the magnetic sheet in the vicinity of the magnet may be decreased. Therefore, magnet 30a included in primary-side non-contact charging module 41 may weaken the magnetic fluxes in, in particular, inner side portion 211 of primary-side coil 2a and inner side portion 212 of secondary-side coil 2b. As a result, transmission efficiency between primary-side non-contact charging module 41 and secondary-side non-contact charging module 42 may be decreased. Therefore, in the case of FIG. 8A, inner side portions 211 and 212 easily adversely affected by magnet 30a may be increased in size.

Meanwhile, in FIG. 8C in which a magnet is not used, since the winding number of secondary-side coil 2b is large, the L value is large. The L value in FIG. 8C and the L value in FIG. 8A are greatly different. Therefore, in a coil having a small inner diameter, the L value is greatly different in the case where magnet 30a is provided and the case where magnet 30a is not provided.

As shown in FIG. 8A, when the inner diameter of secondary-side coil 2b is smaller than the diameter of magnet 30a, a portion facing magnet 30a in secondary-side coil 2b may be adversely affected by magnet 30a. Therefore, the inner diameter of secondary-side coil 2b is desirably larger than the diameter of magnet 30a.

As shown in FIG. 8B, if the inner diameter of secondary-side coil 2b is large, inner side portion 212 easily adversely affected by magnet 30a is extremely small. In FIG. 8D in which a magnet is not used, since the winding number of secondary-side coil 2b is small, the L value is small compared with FIG. 8C. As a result, since a difference between the L value in FIG. 8D and the L value in FIG. 8B is small, in a coil having a large inner diameter, a decreasing rate of the L value can be suppressed. As the inner diameter of secondary-side coil 2b is larger, inner side portion 212 of secondary-side coil 2b is farther apart from magnet 30a. For this reason, the influence of magnet 30a can be suppressed.

However, since the non-contact charging module is mounted to a charger or an electronic apparatus, the non-contact charging module cannot be formed in size equal to or larger than a predetermined size. Therefore, if it is attempted to increase the inner diameter of primary-side coil 2a and the inner diameter of secondary-side coil 2b to decrease an adverse effect from magnet 30a, the winding number may decrease and the L value may decrease. When magnet 30a is circular, the following occurs. That is, when the outer diameter of magnet 30a and the inner diameter of primary-side coil 2a (or secondary-side coil 2b) are substantially the same (the outer diameter of magnet 30a is smaller than the inner diameter of primary-side coil 2a (or the secondary-side coil 2b) by about 0 to 2 mm), the size of magnet 30a can be maximized. As a result, it is possible to improve accuracy of aligning of primary-side non-contact charging module 41 and secondary-side non-contact charging module 42.

When the outer diameter of magnet 30a and the inner diameter of primary-side coil 2a (or secondary-side coil 2b) are substantially the same, the inner diameter of primary-side coil 2a (or secondary-side coil 2b) can be minimized. As a result, the winding number of primary-side coil 2a (or secondary-side coil 2b) increases and it is possible to improve the L value. When the outer diameter of magnet 30a is smaller than the inner diameter of primary-side coil 2a (or secondary-side coil 2b) (the outer diameter of magnet 30a is smaller than the inner width of primary-side coil 2a (or secondary-side coil 2b) by about 2 to 8 mm), even if the accuracy of aligning fluctuates, it is possible to prevent magnet 30a from being present between inner side portion 211 and inner side portion 212.

When the outer diameter of magnet 30a is 70% to 95% of primary-side coil 2a (or secondary-side coil 2b), it is possible to sufficiently cope with the fluctuation in the accuracy of aligning. Further, it is possible to improve the accuracy of aligning of primary-side non-contact charging module 41 and secondary-side non-contact charging module 42. It is possible to secure the winding number of primary-side coil 2a (or secondary-side coil 2b). In this case, in a surface parallel to primary-side coil 2a (or secondary-side coil 2b), the area of magnet 30a is 70% to 95% of the area of the through-hole in the center of primary-side coil 2a (or secondary-side coil 2b).

With such a configuration, the fluctuation in the L value decreases in the case where the other non-contact charging module, which is the counterpart of power transmission, includes a magnet and the case where the other non-contact charging module does not include a magnet. That is, secondary-side non-contact charging module 42 can efficiently perform aligning and power transmission with primary-side non-contact charging module 41 both in the case where primary-side non-contact charging module 41 includes magnet 30a and the case where secondary-side non-contact charging module 41 does not include magnet 30a. Primary-side non-contact charging module 41 can efficiently perform aligning and power transmission with secondary-side non-contact charging module 42 both in the case where secondary-side non-contact charging module 42 includes magnet 30b and the case where secondary-side non-contact charging module 42 does not include magnet 30b.

Primary-side coil 2a forms an LC resonance circuit with a resonance capacitor in primary-side non-contact charging module 41. When the LC resonance circuit is formed, if the L value greatly changes, the resonance frequency of the resonance capacitor may greatly change. This resonance frequency is used for power transmission between primary-side non-contact charging module 41 and secondary-side non-contact charging module 42. For this reason, if the resonance frequency greatly changes according to presence or absence of a magnet, the power transmission may not be correctly performed. Therefore, it is possible to improve the efficiency of the power transmission by adopting the configuration of the present embodiment described above.

Further, as shown in FIG. 9, when the size of magnet 30a and the outer diameter of secondary-side coil 2b are fixed, if the winding number of secondary-side coil 2b is decreased and the inner diameter of secondary-side coil 2b is increased, the influence of magnet 30a on secondary-side coil 2b decreases. That is, in the case of FIG. 9, a difference in the L value of secondary-side coil 2b decreases in the case where magnet 30a is used for aligning of primary-side non-contact charging module 41 and secondary-side non-contact charging module 42 and in the case where magnet 30a is not used for aligning of primary-side non-contact charging module 41 and secondary-side non-contact charging module 42. Therefore, in the case of FIG. 9, resonance frequencies in the case where magnet 30a is used and in the case where magnet 30a is not used are values extremely close to each other. The outer diameters of the coils are unified to 30 mm and the distance between the hollow portion end of primary-side coil 2a and the outer side end of magnet 30a is set larger than 0 mm and smaller than 6 mm, whereby it is possible to set the L value in the case where magnet 30a is used and the L value in the case where magnet 30a is not used close to each other while setting the L value to 15 μH or larger. The result shown in FIG. 9 also applies to the L value of primary-side coil 2a of primary-side non-contact charging module 41 in the case where magnet 30b is provided in secondary-side non-contact charging module 42.

Figure 10B:
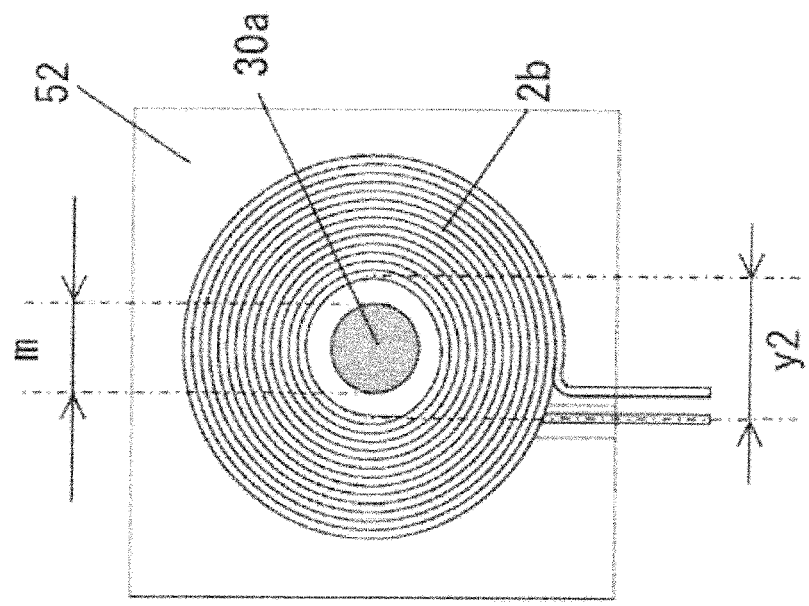
FIGS. 10A and 10B are schematic diagrams showing a positional relation of a magnet included in the other non-contact charging module that performs power transmission with a non-contact charging module in the embodiment of the present invention.
Figure 10A:
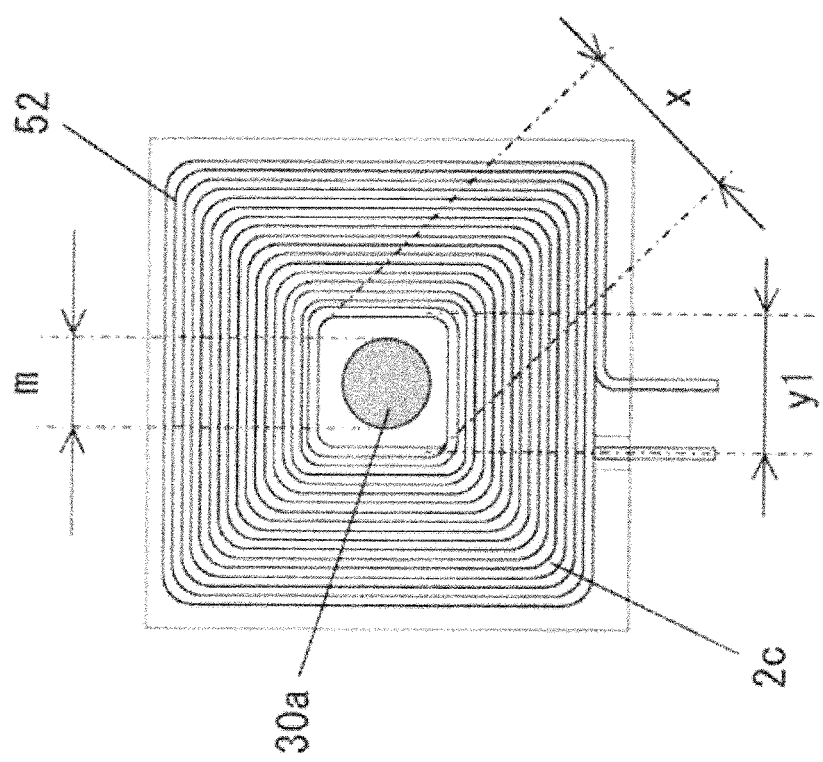

FIGS. 10A and 10B are schematic diagrams showing a positional relation of the magnet included in the other non-contact charging module that performs power transmission with the non-contact charging module in the embodiment of the present invention, and shows the case where a magnet used for aligning a primary-side non-contact charging module and a secondary-side non-contact charging module is provided in the primary-side non-contact charging module. FIG. 10A shows the case where the secondary-side coil is a rectangular coil and FIG. 10B shows the case where the secondary-side coil is a circular coil.

At this point, a relation between the magnet and the non-contact charging module is applied to both of a relation between primary-side non-contact charging module 41 and magnet 30b provided in secondary-side non-contact charging module 42 and a relation between secondary-side non-contact charging module 42 and magnet 30a provided in primary-side non-contact charging module 41. Therefore, the relation between secondary-side non-contact charging module 42 and magnet 30a provided in primary-side non-contact charging module 41 will be described as an example. However, the description is also applied to the relation between primary-side non-contact charging module 41 and magnet 30b provided in secondary-side non-contact charging module 42. That is, a non-contact charging module that can suppress the influence of the magnet included in the other non-contact charging module, which is the counterpart of power transmission, and perform aligning and power transmission even either in the case where a magnet is included in the other non-contact charging module or the case where a magnet is not included in the other non-contact charging module, will be described.

The center of secondary-side coil 2c shown in FIG. 10A and the center of secondary-side coil 2b shown in FIG. 10B are aligned to match the center of magnet 30a for aligning. Even when magnet 30a is not provided in primary-side non-contact charging module 41, secondary-side non-contact charging module 42 may include a magnet.

Magnet 30a for aligning has a circular shape having a diameter m and magnetic sheet 52 has a square shape. Magnetic sheet 52 may have a polygonal shape, a rectangular shape, or a shape having curves at corners other than a square shape. However, the square shape is preferable to decrease the size of primary-side non-contact charging module 41 while securing the performance of primary-side non-contact charging module 41.

Magnet 30a for aligning is standardized and proposed in using non-contact charging modules 41 and 42. Magnet 30a is used to ensure power transmission between non-contact charging module 41 and non-contact charging module 42 and to perform center aligning of transmission and reception coils.

When circular secondary-side coil 2c or circular secondary-side coil 2b having the same winding number is set on magnetic sheet 52 having the same size, both the coils fit in magnetic sheet 52 having the same area. That is, as shown in FIGS. 10A and 10B, when rectangular secondary-side coil 2c or circular secondary-side coil 2b having the same winding number is disposed on magnetic sheet 52 having the length of one side, shortest distance y1 between oppose inner sides of rectangular secondary-side coil 2c and inner diameter y2 of circular secondary-side coil 2b can be set to the same length.

Meanwhile, diagonal line length x on the inner side of rectangular secondary-side coil 2c is length x that is longer than shortest distance y1 between the opposed inner sides of rectangular secondary-side coil 2b, which is the same length as inner diameter y2 of circular secondary-side coil 2b. That is, in rectangular secondary-side coil 2c, an area where a large space between magnet 30a for aligning and secondary-side coil 2c can be secured increases compared with circular secondary-side coil 2b. That is, there is a relation x>y1 and y1=y2.

In order to suppress the influence of the magnet included in primary-side non-contact charging module 41 or secondary-side non-contact charging module 42, the rectangular coil needs to have a relation x>=m and preferably y1>=m.

When the space between secondary-side coil 2b or 2c and magnet 30a for aligning increases, because the influence of aligning magnet 30a decreases, a decreasing rate of the L value of secondary-side coil 2b or 2c can be reduced. If the secondary-side coil is rectangular, when diagonal line dimension x on the inner side of secondary-side coil 2c is a value same as inner diameter dimension y2 of circular secondary-side coil 2b, the decreasing rate of the L value of secondary-side coil 2c is a value substantially same as secondary-side coil 2b.

For this reason, when a space of non-contact charger 400 in which primary-side non-contact charging module 41 is housed has a square shape and the space is limited, it is preferable to form magnetic sheet 52 in a square shape and form secondary-side coil 2c in a rectangular shape. Consequently, compared with the circular coil, rectangular secondary-side coil 2c can be disposed further apart from magnet 30a. Rectangular secondary-side coil 2c is less easily affected by magnet 30a. In rectangular secondary-side coil 2c, magnetic fluxes concentrate at corner portions of secondary-side coil 2c. However, since the distance between the corner portions and magnet 30a can be secured large, it is possible to reduce the influence of magnet 30a.

That is, when secondary-side coil 2b is wound in a circular shape, entire secondary-side coil 2b shows substantially the same intensity of magnetic fields. However, when secondary-side coil 2c is wound in a substantially rectangular shape, magnetic fields concentrate at corner portions (corners) of secondary-side coil 2c. Therefore, if diagonal line dimension x on the inner side of secondary-side coil 2c is located further on the outer side than the outer diameter of aligning magnet 30a (x>=m), it is possible to suppress the influence of magnet 30a and perform power transmission. If shortest distance y1 between the opposed inner sides of secondary-side coil 2c is located further on the outer side than the outer diameter of aligning magnet 30a (y1>=m), entire secondary-side coil 2c is located further on the outer side than the outer diameter of aligning magnet 30a. Further, the corner portions (the corners) of secondary-side coil 2c are located at a fixed distance apart from magnet 30a. Therefore, it is possible to further reduce the influence of magnet 30a on secondary-side coil 2c.

In the present embodiment, diagonal line dimension (x) of rectangular secondary-side coil 2c is set to about 23 mm and diameter (m) of magnet 30a for aligning is set to 15.5 mm φ to satisfy the relation described above. In general, magnet 30a for aligning is configured smaller than a maximum diameter set to 15.5 mm. This is because, in view of a decrease in size and accuracy of aligning, it is possible to perform aligning in a well-balanced state by setting the diameter of magnet 30a to about 10 mm to 15.5 mm and setting the thickness of magnet 30a to about 1.5 to 2 mm. Magnet 30a is a neodymium magnet and the strength thereof may be about 75 to 150 mT. In the present embodiment, since an interval of the coil of the primary-side non-contact charging module and the coil of the secondary-side non-contact charging module is about 2 to 5 mm, sufficient aligning can be performed by the corresponding magnet. Therefore, if secondary-side coil is wound in a circular shape, the diameter of the hollow portion is set to 15.5 mm or more and, if secondary-side coil is wound in a rectangular shape, the diagonal line of the hollow portion is set to 15.5 mm or more and preferably the side width of the hollow portion is set to 15.5 mm or more. Consequently, basically, it is possible to decrease the influence of magnet 30a irrespective of the size of magnet 30a included on the counter part side.

As described above, the rectangular coil is less easily affected by the magnet than the circular coil. However, if both of secondary-side coil 2b and secondary-side coil 2b described later are rectangular coils, the corners of the coils have to be aligned in aligning during charging. Therefore, since the corner aligning in the aligning is difficult, it is desirable that one is a circular coil and the other is a rectangular coil. This is because angle adjustment is unnecessary and the rectangular coil can suppress the influence of the magnet. Whichever of primary-side non-contact charging module 41 and secondary-side non-contact charging module 42 may include the rectangular coil and whichever of the modules may include the circular coil. However, since the circular coil can perform efficient power transmission irrespective of the shape of a coil, which is a counterpart of power transmission, it is desirable to include the circular coil in primary-side non-contact charging module 41.

Compared with the circular coil, the rectangular coil refers to a coil in which R of the four corners of the hollow portion (a radius of the curves at the four corners) is 30% or less of the side width of the hollow portion (y1 in FIG. 10A). That is, in FIG. 10A, the four corners of the substantially rectangular hollow portion are formed in a curved shape. Since the four corners are curves more or less rather than right angles, it is possible to improve the strength of electrical lines at the four corners. However, if R is too large, the rectangular coil is hardly different from the circular coil and the effects peculiar to the rectangular coil cannot be obtained. As a result of the examination, it has been found that, when side width y1 of the hollow portion is, for example, 20 mm and if radius R of the curves at the four corners is equal to or smaller than 6 mm, it is possible to more effectively suppress the influence of the magnet. Further, as described above, when even the strength of the four corners is taken into account, when radius R of the curves at the four corners is 5 to 30% of the side width of the substantially rectangular hollow portion, it is possible to obtain the effects of the rectangular coil most.

Next, the thickness of the center portions of magnetic sheet 52 will be described.

FIGS. 11A to 11E are conceptual diagrams of a magnetic sheet of a non-contact charging module according to the embodiment of the present invention. For example, magnetic sheet 52 that is included in secondary-side non-contact charging module 42 is illustrated. FIG. 11A is a top view of the magnetic sheet of the non-contact charging module according to the embodiment of the present invention and FIG. 11B is a top view of the magnetic sheet in the case where the position of the linear concave portion of the magnetic sheet in FIG. 11A is changed. FIG. 11C is a cross-sectional view taken along the line E-E of FIG. 11A, and FIG. 11D is a cross-sectional view taken along the line F-F of FIG. 11A in the case where the center portion is configured as the concave portion, and FIG. 11E is a cross-sectional view taken along the line F-F of FIG. 11A in the case where the center portion is configured as the through-hole. Center portion 32b is the concave portion or the through-hole. For example, if center portion 32b has a convex shape, the magnetic flux density of secondary-side coil 2b is improved and the transmission efficiency of secondary-side non-contact charging module 42 is improved.

However, by providing the hole portion configured as the concave portion or the through-hole in center portion 32b, an influence of magnet 30a that is included in primary-side non-contact charging module 41 can be decreased. The reason will be described below.

For example, in FIGS. 11A to 11E, magnetic sheet 52 of secondary-side non-contact charging module 42 performing power transmission with primary-side non-contact charging module 41 including magnet 30a will be described. However, the description of magnetic sheet 52 of secondary-side non-contact charging module 42 as described below is applied to magnetic sheet 52 of primary-side non-contact charging module 41 performing power transmission with secondary-side non-contact charging module 42 including magnet 30b. That is, a center portion of the magnetic sheet of the non-contact charging module that can perform aligning and power transmission in both of the case where the other non-contact charging module which is the counterpart of the power transmission includes the magnet and the case where the other non-contact charging module which is the counterpart of the power transmission does not include the magnet will be described.

As described above, the non-contact power transmitting apparatus may use the magnet or may not use the magnet in aligning of primary-side non-contact charging module 41 and secondary-side non-contact charging module 42. The magnetic flux between the primary-side and the secondary-side non-contact charging modules may be disturbed when the magnet exists. For this reason, the L values of primary-side coil 2a of primary-side non-contact charging module 41 and secondary-side coil 2b of secondary-side non-contact charging module 42 greatly decrease when the magnet exists.

Primary-side coil 2a forms an LC resonance circuit with a resonance capacitor, in primary-side non-contact charging module 41. At this time, if the L values greatly change in the case where magnet 30a is used in aligning and the case where magnet 30a is not used in aligning, the resonance frequency with the resonance capacitor may greatly change. The resonance frequency is used in power transmission of primary-side non-contact charging module 41 and secondary-side non-contact charging module 42. For this reason, if the resonance frequency greatly changes according to presence or absence of magnet 30a, power transmission may not be correctly performed.

Therefore, in order to make the resonance frequency in the case where magnet 30a is used in aligning similar to the resonance frequency in the case where magnet 30a is not used, the L value of secondary-side coil 2b in the case where magnet 30a is used in aligning and the L value of secondary-side coil 2b in the case where magnet 30a is not used in aligning need to be set to similar values.

Next, a relation of the thickness of the center portion of magnetic sheet 52 and the L value of secondary-side coil 2b in the case where magnet 30a is included and in the case where magnet 30a is not included in the primary-side non-contact charging module will be described.

Figure 12:
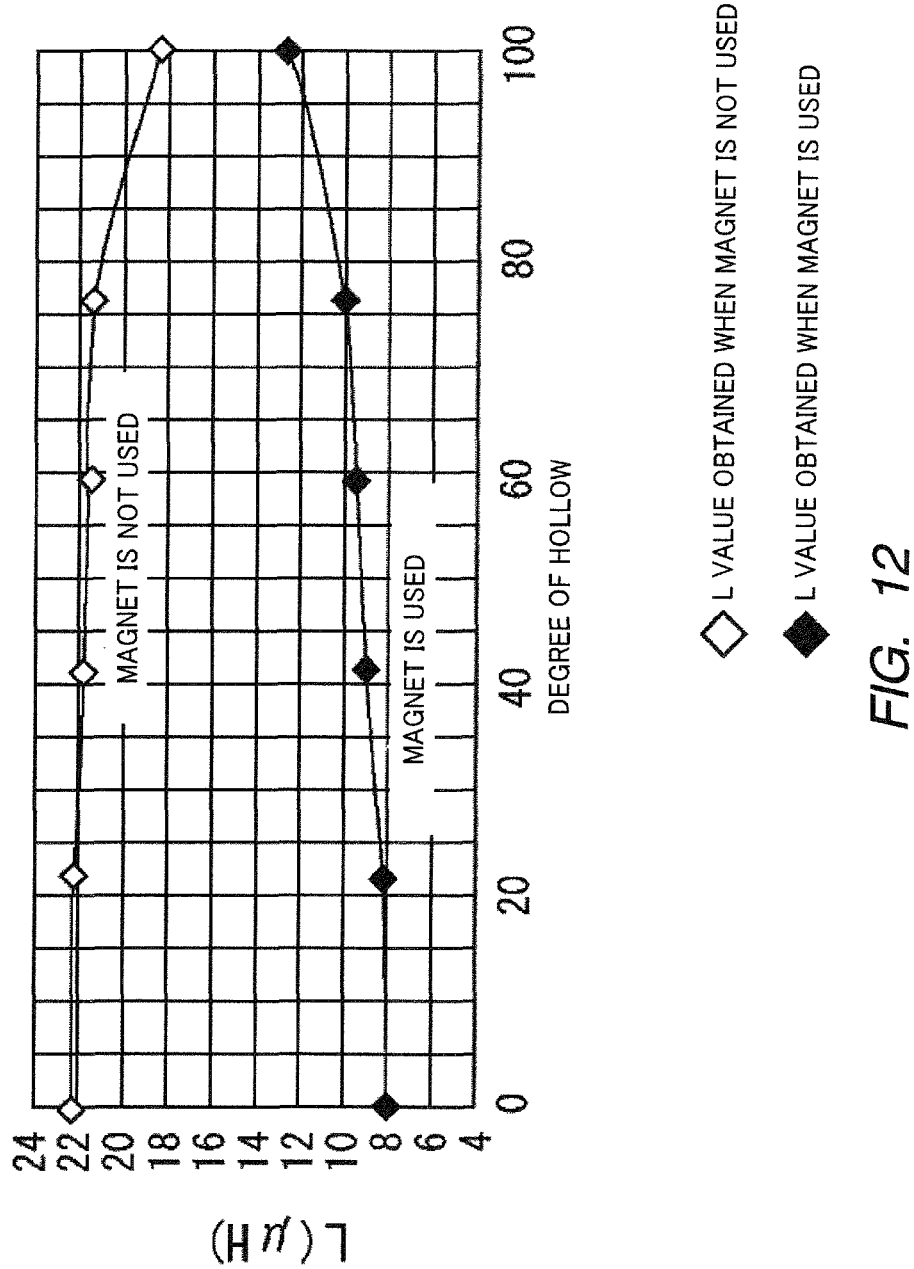
FIG. 12 is a diagram showing a relation between an L value and the thickness of a center portion of a coil of the non-contact charging module in the case where a magnet is used for aligning in the other non-contact charging module and the case where the magnet is not used in present embodiment.

FIG. 12 is a diagram illustrating a relation of an L value of a coil of the non-contact charging module and the thickness of a center portion in the case where a magnet is used and in the case where the magnet is not used in aligning in the other non-contact charging module according to the embodiment of the present invention. As the degree of a hollow, 0% shows a state in which center portion 32b is not configured as the concave portion and is flat, and 100% shows a state in which center portion 32b is configured as the through-hole.

In the case where magnet 30a is not used, as the thickness of center portion 32b of magnetic sheet 52 decreases, the magnetic field of secondary-side coil 2b decreases and the L value decreases. Meanwhile, in the case where magnet 30a is used, as the thickness of center portion 32b of magnetic sheet 52 decreases, the distance between magnetic sheet 52 and magnet 30a in a stack direction thereof increases. For this reason, an influence of magnet 30a decreases, the magnetic field of secondary-side coil 2b increases, and the L value increases. In the case where center portion 32b is configured as the through-hole, the L values are mostly similar. That is, by configuring center portion 32b as the through-hole, an influence of magnet 30a that is used in aligning can be suppressed to a minimum.

Since magnet 30a and magnetic sheet 52 attract each other and perform aligning, aligning precision is improved when center portion 32b has some thickness. In particular, aligning precision can be stabilized by setting the hollow degree to 60% or less.

Therefore, if the hollow degree is set to 40 to 60%, the L value of secondary-side coil 2b in the case where magnet 30a is used in aligning and the case where magnet 30a is not used in aligning can be set to be similar to each other and an aligning effect of magnet 30a can be sufficiently obtained. That is, magnet 30a and center portion 32b of magnetic sheet 52 attract each other and the centers thereof can be aligned.

In the present embodiment, the hollow degree is set to about 50% and the effects of both sides can be obtained in the most effective way. In order to maintain about half of the entire thickness, the through-hole may be filled with the magnetic material up to half the entire depth, after the through-hole is formed. The hole portion (concave portion or through-hole) that is provided in center portion 32b does not need to have the shape and the size equal to those of center portion 32a. Even though the shape of center portion 32b, that is, the hollow portion of the coil is a substantially rectangular shape or a substantially circular shape, the hole portion may have various shapes without depending on the shape thereof. That is, the hole portion may have a rectangular shape or a circular shape. The hole portion is preferably formed to be smaller than center portion 32b and may secure an area of 30% or more of an area of center portion 32b.

Since magnetic sheet 52 may be formed by stacking a material having the high saturation magnetic flux density and a material having the high permeability, for example, the center portion of the material having the high saturation magnetic flux density may be formed to be flat, the through-hole may be formed in the center portion of the material having the high permeability, and center portions 32a of magnetic sheet 52 may be formed in a concave shape. The material having the high saturation magnetic flux density means a magnetic sheet that has the saturation magnetic flux density higher than that of the material having the high permeability and has the permeability lower than that of the material having the high permeability, and may be a ferrite sheet in particular.

The diameter of the concave portion or the through-hole may be smaller than the inner diameter of secondary-side coil 2b. By setting the diameter of the concave portion or the through-hole to be substantially equal to the inner diameter of secondary-side coil 2b (smaller than the inner diameter of the coil by 0 to 2 mm), the magnetic field in an inner circumferential circle of secondary-side coil 2b can be increased.

By setting the diameter of the concave portion or the through-hole to be smaller to the inner diameter of the coil (smaller than the inner diameter of the coil by 2 to 8 mm) to become a stepped shape, the stepped outer side can be used in aligning and the inner side can be used to make the L values of primary-side coil 2a in the case where magnet 30a is used in aligning and the case where magnet 30a is not used in aligning similar to each other. The size of the concave portion or the through-hole may be larger than the size of magnet 30a. That is, the hole portion may be formed to have the diameter larger than that of magnet 30a and have the size smaller than that of the hollow portion of secondary-side coil 2b.

By setting the shape of the top surface of the concave portion or the through-hole to be equal to the shape of the hollow portion of secondary-side coil 2b, magnet 30a and center portion 32b of magnetic sheet 52 can attract with a good balance and the centers thereof can be precisely aligned.

By configuring all of the ends of the concave portion or the through-hole to have the same distance from the inner diameter of secondary-side coil 2b, magnet 30a and center portion 32b of magnetic sheet 52 can attract with a good balance and the centers thereof can be precisely aligned.

By matching the center of the shape of the top surface of the concave portion or the through-hole with the center of the hollow portion of secondary-side coil 2b, magnet 30a and center portion 32b of magnetic sheet 52 can attract with a good balance and the centers thereof can be precisely aligned. By forming the concave portion or the through-hole to be bigger than magnet 30a, an influence of magnet 30a can be suppressed with a good balance.

As described above, the configuration where the center portion is configured as the hole portion can be applied to magnetic sheet 52 of the primary-side non-contact charging module and the effect is obtained even though the hole portion is included in center portion 32a of magnetic sheet 52 of primary-side non-contact charging module 41. That is, primary-side non-contact charging module 41 that can perform aligning and effective power transmission in both of the case where secondary-side non-contact charging module 42 includes magnet 30b and the case where secondary-side non-contact charging module 42 does not include magnet 30b can be configured.

Thick portions may be formed in the four corners of magnetic sheet 52 and in areas where coils 21a and 21b on flat portions 31a and 31b are not disposed. That is, none are placed on magnetic sheet 52 corresponding to portions that are outer than the outer circumference of coils 21a and 21b on flat portions 31a and 31b in the four corners of magnetic sheet 52. Therefore, by increasing the thickness of magnetic sheet 52 by forming the thick portions in the areas, power transmission efficiency of the non-contact power transmitting apparatus can be improved. The thickness of the thick portions is preferably large. However, the thickness of the thick portions is set to be almost equal to the thickness of the electrical lines to decrease the thickness of the apparatus.

[Description of NFC Antenna (Sheet Antenna)]

Figure 13:
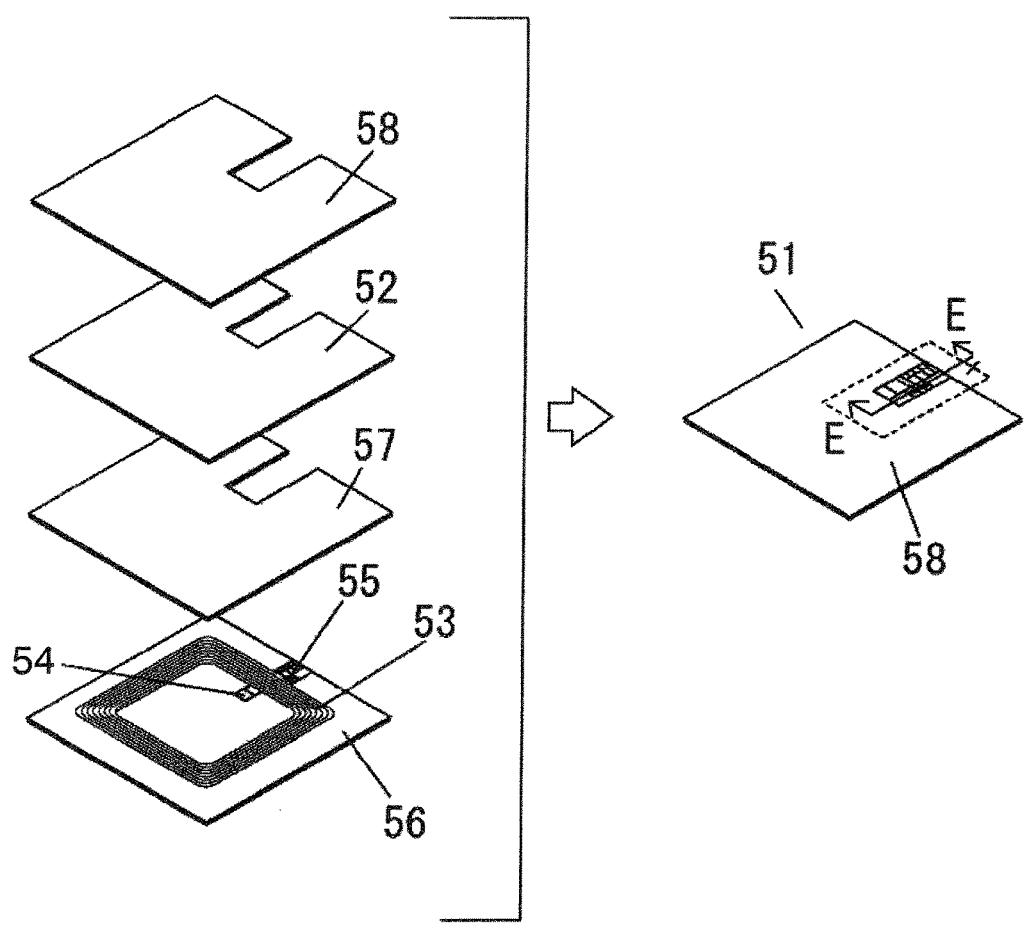
FIG. 13 is a perspective view of the NFC antenna in the embodiment of the present invention.
Figure 14:
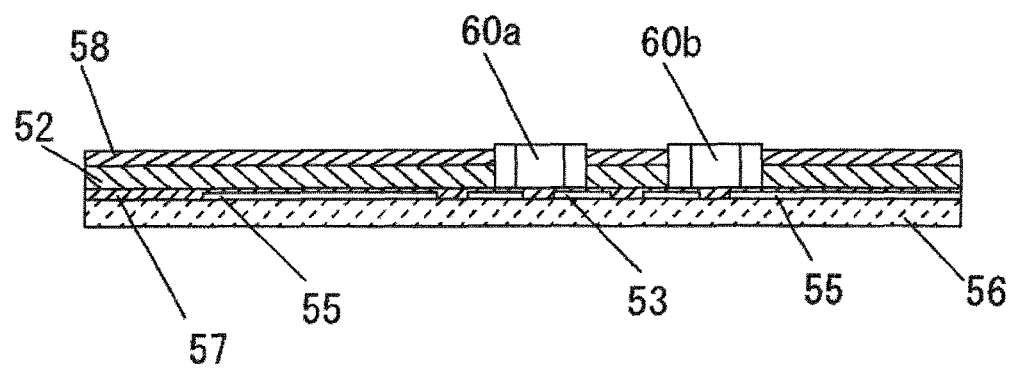
FIG. 14 is a structural sectional view of the NFC antenna in the embodiment of the present invention.

Next, NFC antenna 51 will be described. FIG. 13 is a perspective view of the NFC antenna in the embodiment of the present invention. FIG. 14 is a structural sectional view of the NFC antenna in the embodiment of the present invention. FIG. 14 is a diagram showing a cross section taken along the line E-E of FIG. 13.

NFC antenna 51 includes magnetic sheet 52 containing a ferrite material as a main component, protective members 57 and 58 disposed to hold the magnetic sheet, (plane) coil 53, matching circuit 54, terminal connecting section 55, base material 56, and chip capacitors for aligning 60a and 60b. NFC antenna 51 may be housed in a radio communication medium such as an IC card or an IC tag or may be housed in a radio communication medium processing apparatus such as a reader or a reader writer.

Magnetic sheet 52 has a form of configuring an element of NFC antenna 51. Magnetic sheet 52 is configured by a metal material such as ferrite, permalloy, Sendust, or silicon plywood. As magnetic sheet 52, soft magnetic ferrite is preferable. A sintered body, i.e., a high-density ferrite sintered body can be formed by dry-pressing ferrite powder and sintering the ferrite powder. The density of the soft magnetic ferrite is preferably equal to or higher than 3.5 g/cm$^3$. Further, the size of a magnetic body of the soft magnetic ferrite is preferably equal to or larger than the grain boundary. Magnetic sheet 52 is a sheet-like (or plate-like, film-like, layer-like, etc.) component formed at thickness of about 0.05 mm to 3 mm.

Coil 53 is an antenna pattern and is formed of a spiral conductor (i.e., an electric line is wound around). A spiral structure only has to be a spiral shape including an opening portion in the center. The shape may be either a circular shape, a substantial rectangular shape, or a polygonal shape. By adopting the spiral structure, a sufficient magnetic field is generated to enable communication between the radio communication medium and the radio communication medium processing apparatus by generation of induced power and mutual inductance. Magnetic sheet 52 can be disposed at least in a portion facing coil 53. In a portion corresponding to the hollow portion of coil 53, a hollow portion may be formed in magnetic sheet 52. Therefore, other components may be disposed in the hollow portions of magnetic sheet 52 and coil 53.

Since the surface resistance of magnetic sheet 52 is large, a circuit can be directly formed on the surface or the inside of magnetic sheet 52. Therefore, it is possible to form coil 53, matching circuit 54, and terminal connecting section 55 directly on magnetic sheet 52.

Matching circuit 54 includes chip capacitors 60a and 60b mounted to bridge the spiral conductor of coil 53 formed on base material 56. Consequently, it is possible to form matching circuit 54 on coil 53.

Matching circuit 54 is connected to coil 53 to adjust a resonance frequency of the antenna to a desired frequency and suppress generation of a standing wave due to mismatching. Consequently, NFC antenna 51 that operates stably and has little loss is obtained. Chip capacitors 60a and 60b used as matching elements are mounted to bridge the spiral conductor of the antenna.

Since the surface resistance of magnetic sheet 52 is large, terminal connecting section 55 can be directly formed on the surface of magnetic sheet 52. Terminal connecting section 55 may be formed on both sides of a loop or may be formed to oppose each other at an end of the loop.

Base material 56 can be formed of polyimide, PET, a glass epoxy substrate, or the like. Thin and flexible coil 53 can be formed by forming base material 56 with polyimide, PET, or the like.

As protective members 57 and 58, at least one means of resin, ultraviolet curing resin, visible light curing resin, thermoplastic resin, thermosetting resin, heat resistant resin, synthetic resin, a double-sided tape, an adhesive layer, or a film is used. Protective members 57 and 58 are selected taking into account not only flexibility of bend, deflection, and the like of NFC antenna 51 and components included in NFC antenna 51 but also weather resistance such as heat resistance and humidity resistance. One surface, both surfaces, one side surface, both side surfaces, or entire surfaces of NFC antenna 51 and the components included in NFC antenna 51 may be coated by protective members 57 and 58.

NFC antenna 51 described above is only an example and is not limited to the components, the materials, and the like described above.

[Concerning NFC Antenna (Stick Type)]

Next, stick-type NFC antenna 151 will be described.

Figure 15:
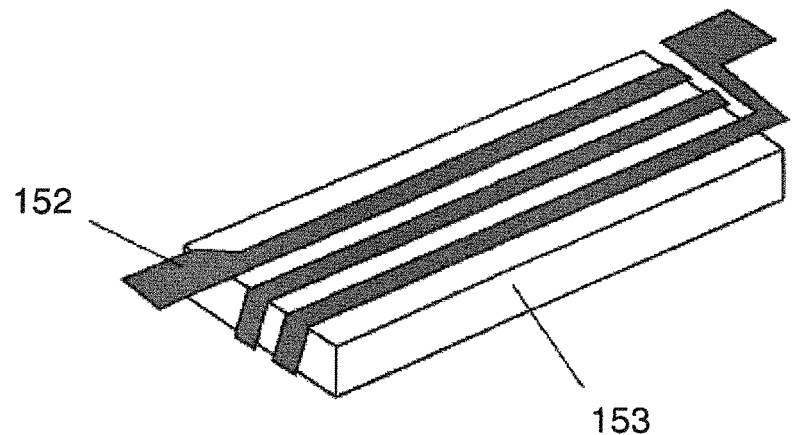
FIG. 15 is a conceptual diagram of a coil section of the stick-type NFC antenna in the embodiment of the present invention.
Figure 16:
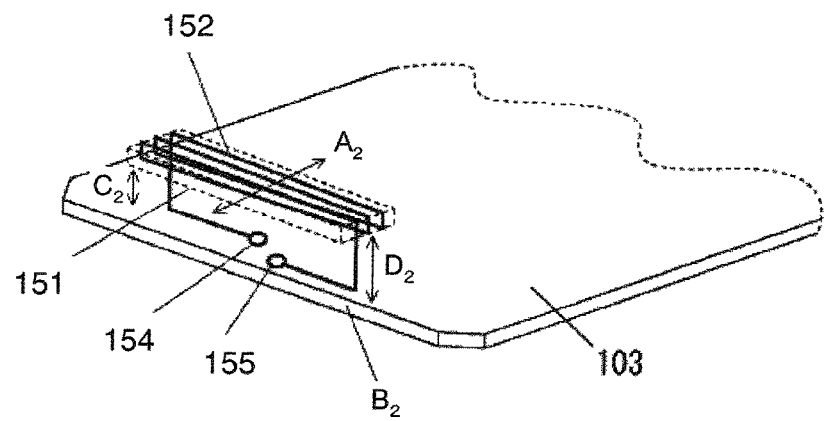
FIG. 16 is a conceptual diagram of the stick-type NFC antenna in the embodiment of the present invention.

FIG. 15 is a conceptual diagram of a coil section of the stick-type NFC antenna in the embodiment of the present invention. FIG. 16 is a conceptual diagram of the stick-type NFC antenna in the embodiment of the present invention.

Stick-type NFC antenna 151 provides a path through which an electric current flows from terminal for antenna input and output 154 (or 155) to the other terminal for antenna input and output 155 (or 154). A surface surrounded by a path of coil section 152 including terminals for antenna input and output 154 and 155 is defined as an opening surface of coil section 152. Coil section 152 is defined to perform transmission and reception of a signal using a magnetic field generated by an electric current of coil section 152 or using an electric current generated by a magnetic field from the external environment.

That is, in the present embodiment, an antenna apparatus is adjusted to be capable of transmitting and receiving a radio wave of, for example, RFID, in particular, in the present embodiment, NFC (13.56 MHz).

In the present embodiment, coil section 152 is inserted in one place together with core 153 (iron core) halfway in a line between terminals for antenna input and output 154 and 155. Core 153 is made of ferrite, metal, or the like.

Coil section 152 is inserted in a position facing terminals for antenna input and output 154 and 155. Consequently, when the antenna apparatus is formed by connecting coil section 152 and terminals for antenna input and output 154 and 155, coil section 152 can be freely formed. However, coil section 152 is not limited to the opposed position.

Further, when a coil axis of coil section 152 (an axis of winding of a coil) is represented as $A_2$, as the arrangement of coil section 152, coil axis $A_2$ is perpendicular to the opening surface of stick-type NFC antenna 151 and perpendicular to the direction (the direction of $C_2$) of an electric current flowing in portions before and after the position where coil section 152 is inserted in the line of NFC antenna 151.

In the present embodiment, coil axis $A_2$ is perpendicular to the $C_2$ direction. However, coil axis $A_2$ may not be parallel to the $C_2$ direction.

In the present embodiment, coil section 152 is disposed to be perpendicular to end face $B_2$ of substrate (metal body) 103 disposed at distance $D_2$. Distance $D_2$ can be any distance (for example, 0 mm to ∞. However, as described below, the antenna apparatus has satisfactory communication performance at any distance. In FIG. 16, distance $D_2$ is 4 mm.

Magnetic fluxes passing through coil section 152 can be increased by using a magnetic body for core 153. The magnetic body is preferable because communication performance is improved when substrate (metal body) 103 is placed close to core 153. However, core 153 is not limited to the magnetic body and may be configured by ceramic, resin, or the like. In the present embodiment, core 153 is a ferrite core. The size of core 153 is 8×20×0.2 mm.

In the present embodiment, the number of turns of the conductor of coil section 152 is about 2.5 turns. The number of conductors wound around the surface of core 153 facing the metal body (on the surface of core 153 facing the metal body, the number of conductors wound on the surface when wound around core 153) is set smaller than the number of conductors wound around the surface on the opposite side of the surface of core 153 facing the metal body.

With such a configuration, it is possible to obtain an efficient antenna apparatus with a small number of times of winding.

In FIG. 16, the longitudinal direction of rectangular parallelepiped core 153 is disposed on the loop of the antenna apparatus. However, the short side direction of core 153 may be disposed. The shapes of coil section 152 and core 153 can be freely selected according to a desired characteristic and a space in which the antenna apparatus is mounted.

However, when the short side direction is disposed, coil section 152 is of course wound and formed in the short side direction of core 153.

Magnetic field intensity increases according to an increase in the number of times of winding. However, when a rate of increase is considered, the magnetic field intensity greatly increases when the number of times of winding increases by a half round from an integer.

However, the number of times of winding is not limited. The number of times of winding may be larger than or smaller than about 2.5 turns shown in FIG. 15.

If the number of times of winding is increased or decreased by about 0.5 turn than an integer multiple, both ends (connecting sections to the antenna apparatus) of coil section 152 are formed on both sides across core 153. Therefore, it is easy to connect coil section 152 to substrate (metal body) 103, which is the substrate.

That is, since coil section 152 is inserted in a form of replacing a linear portion of a normal loop antenna, it is easy to insert coil section 152.

A way of winding coil section 152 may be either right winding or left winding and can be selected as appropriate according to a position where coil section 152 is disposed.

For connection between coil section 152 and terminals for antenna input and output 154 and 155, a commonly-used connection method such as soldering or connection by a connector can be used. Alternatively, one continuous conductor may form coil section 152 to terminals for antenna input and output 154 and 155. As generally known, terminals for antenna input and output 154 and 155 are connected to input and output terminals of the matching circuit and the IC. As a connection method, a commonly-used connection method such as contact by a pin or a spring, soldering, or connection by a connector can be used.

[Description of Arrangement of Non-Contact Charging Modules and Sheet Antenna]

Figure 17:
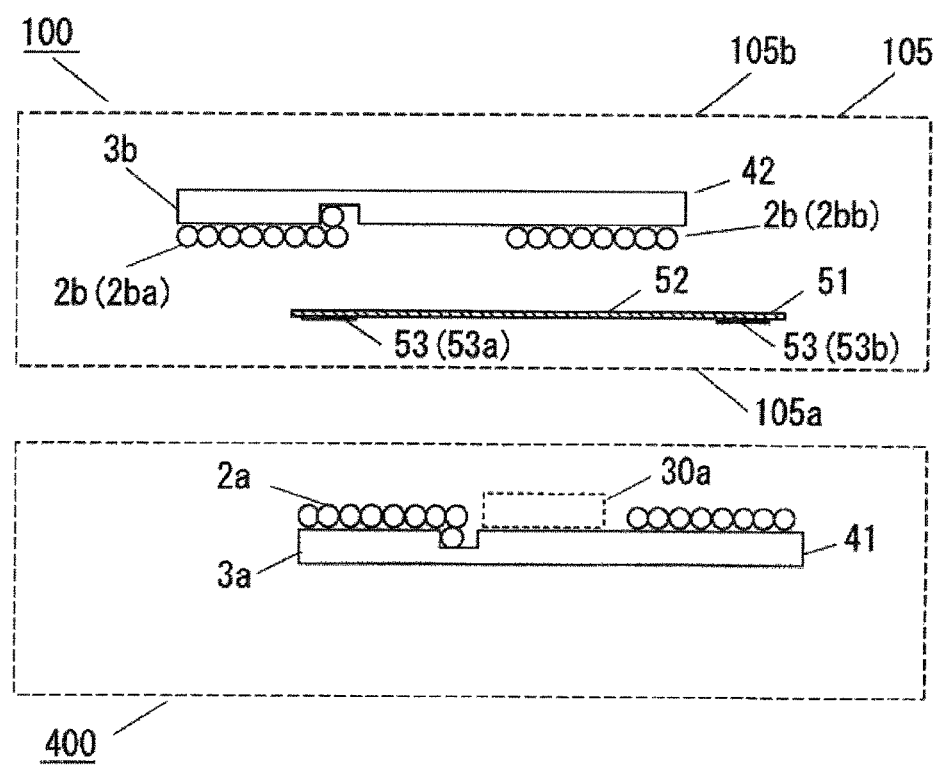
FIG. 17 is a sectional view showing an arrangement example of non-contact charging modules and an NFC antenna in an embodiment of the present invention.

Embodiment 1 will be described in detail below with reference to FIG. 17. FIG. 17 is a sectional view showing an arrangement example of non-contact charging modules and an NFC antenna in Embodiment 1 of the present invention. FIG. 17 is also a diagram conceptually showing a cross section of portable terminal apparatus 100 shown in FIGS. 1A to 1C cut in the thickness direction (the stack direction of lower housing 105a and upper housing 105b). To simplify the description, FIG. 17 does not show liquid crystal panel 101, operation button 102, substrate 103, and battery pack 104 and shows an arrangement relation between secondary-side non-contact charging module 42 and NFC antenna 51. Secondary-side non-contact charging module 42 and NFC antenna 51 are simply shown as only coils and magnetic sheets. In the above description, members including the same components and functions are denoted by the same reference numerals and signs and detailed description of the members is omitted.

First, an overview of portable terminal apparatus 100 and non-contact charger 400 will be described.

Battery pack 104 (see FIGS. 1A to 1D) in portable terminal apparatus 100 is charged via primary-side non-contact charging module 41 and secondary-side non-contact charging module 42. Specifically, an electric current flows to secondary-side coil 2b with a magnetic field generated by feeding an electric current to primary-side coil 2a in non-contact charger 400. Battery pack 104 electrically connected to secondary-side non-contact charging module 42 is charged. Consequently, non-contact charger 400 can charge portable terminal apparatus 100 without being electrically connected to portable terminal apparatus 100 in a non-contact manner.

Portable terminal apparatus 100 includes NFC antenna 51 described above. Like primary-side non-contact charging module 41 and secondary-side non-contact charging module 42, NFC antenna 51 obtains electric power and performs data transmission using electromagnetic induction (magnetic fluxes). For example, the driving power of NFC antenna 51 is obtained from battery pack 104 in some case and obtained from a counterpart of NFC communication in other cases.

According to one embodiment described herein, the communication surface of NFC antenna 51 is the rear surface (that is, the surface on the lower housing 105a side). That is, as the structure of NFC antenna 51, coil 53 is stacked further on the lower housing 105a side than magnetic sheet 52. Therefore, NFC antenna 51 sets, as a communication direction, the direction on the coil 53 side and the direction on the opposite side of magnetic sheet 52. In other words, a non-communication direction of NFC antenna 51 is the direction on the magnetic sheet 52 side and the direction on the opposite side of coil 53. As described above, NFC antenna 51 sets the rear surface side of housing 105 as the communication direction. Communication can be performed by bringing a communication destination of NFC antenna 51 close to the rear surface side.

In the present embodiment, a charging surface of secondary-side non-contact charging module 42 is the rear surface (the surface on the lower housing 105a side). That is, as the structure of secondary-side non-contact charging module 42, secondary-side coil 2b is stacked further on the lower housing 105a side than secondary-side magnetic sheet 3b. Therefore, secondary-side non-contact charging module 42 sets, as a charging direction, the direction on the secondary-side coil 2b side and the direction on the opposite side of secondary-side magnetic sheet 3b. In other words, a non-charging direction of secondary-side non-contact charging module 42 is the direction on the secondary-side magnetic sheet 3b side and the direction on the opposite side of secondary-side coil 2b. As described above, secondary-side non-contact charging module 42 sets the rear surface side of housing 105 as the charging direction. Non-contact charging is performed by bringing primary-side non-contact charging module 41 close to the rear surface side.

Next, the arrangement of secondary-side non-contact charging module 42 and NFC antenna 51 in portable terminal apparatus 100 will described in detail.

As described above, in primary-side non-contact charging module 41 (or secondary-side non-contact charging module 42), the magnet for aligning of primary-side coil 2a and secondary-side coil 2b is present in some case and absent in other cases. As shown in FIG. 17, when primary-side non-contact charging module 41 includes magnet 30a, magnet 30a can perform aligning by attracting and being attracted by mainly secondary-side magnetic sheet 3b of secondary-side non-contact charging module 42. That is, in both the aligning methods, the aligning for non-contact charging is performed such that the hollow portion of primary-side coil 2a and the hollow portion of secondary-side coil 2b face each other.

However, since portable terminal apparatus 100 in the present embodiment includes secondary-side non-contact charging module 42 and NFC antenna 51, there are a plurality of modules including coils that form LC resonance circuits using magnetic sheets (magnetic bodies) and resonance capacitors.

Therefore, as shown in FIG. 17, in the present embodiment, secondary-side non-contact charging module 42 and NFC antenna 51 are disposed to be stacked. Further, secondary-side non-contact charging module 42 is desirably disposed such that at least a part of the hollow portion of secondary-side coil 2b faces the hollow portion of coil 53. In other words, NFC antenna 51 is disposed such that at least a part of the hollow portion of coil 53 faces the hollow portion of secondary-side coil 2b. That is, secondary-side magnetic sheet 3b exposed from the hollow portion of secondary-side coil 2b and magnetic sheet 52 exposed from the hollow portion of coil 53 face each other. That is, a projection in the perpendicular direction of secondary-side magnetic sheet 3b in the hollow portion of secondary-side coil 2b crosses the hollow portion of coil 53. That is, in the communication direction or the charging direction, at least the parts of the hollow portions are on one straight line.

By adopting such an arrangement, a total area of the two magnetic bodies (for example, secondary-side magnetic sheet 3b and magnetic sheet 52 of NFC antenna 51) at the time when portable terminal apparatus 100 is viewed from magnet 30a is reduced. For this reason, even if magnet 30a and magnetic sheet 52 attract each other and primary-side non-contact charging module 41 is aligned with NFC antenna 51 (a module not to be aligned), secondary-side non-contact charging module 42 is located in the vicinity of the primary-side non-contact charging module. That is, since the at least the parts of the hollow portion of coil 53 and the hollow portion of the secondary-side coil overlap, even when portable terminal apparatus 100 includes secondary-side non-contact charging module 42 and NFC antenna 51, it is possible to reduce deviation of the aligning of primary-side non-contact charging module 41 and secondary-side non-contact charging module 42. Therefore, it is possible to improve the accuracy of the aligning. Secondary-side magnetic sheet 3b can easily receive magnetic fluxes from primary-side non-contact charging module 41. Further, the hollow portion of secondary-side non-contact charging module 42 is a portion surrounded by secondary-side coil 2b. That is, the hollow portion is a portion where a magnetic field formed by secondary-side coil 2b is extremely strong. Therefore, even if primary-side non-contact charging module 41 is aligned with NFC antenna 51 (a module not to be aligned), since the hollow portions of NFC antenna 51 and secondary-side non-contact charging module 42 overlap, the hollow portions of primary-side non-contact charging module 41 and secondary-side non-contact charging module 42 also overlap. Therefore, since the hollow portions of primary-side non-contact charging module 41 and secondary-side non-contact charging module 42 overlap, it is possible to maintain power transmission efficiency between primary-side non-contact charging module 41 and secondary-side non-contact charging module 42 at fixed or higher efficiency.

To maintain power transmission efficiency, it is preferable that the overlapping area of the hollow portions of NFC antenna 51 and secondary-side non-contact charging module 42 is equal to or larger than 50% of the area of the hollow portion of secondary-side non-contact charging module 42. Consequently, it is possible to secure sufficient power transmission efficiency between the non-contact charging modules.

At least the portion of secondary-side non-contact charging module 42 overlapping NFC antenna 51 can surely receive magnetic fluxes from primary-side non-contact charging module 41. In particular, if secondary-side coil 2*b* of secondary-side non-contact charging module 42 and coil 53 of NFC antenna 51 overlap, secondary-side non-contact charging module 42 can receive magnetic fluxes. This is because the coils sections of secondary-side non-contact charging module 42 and NFC antenna 51 generate magnetic fluxes.

As described above, by disposing secondary-side non-contact charging module 42 and NFC antenna 51 such that the hollow portion of secondary-side coil 2*b* and the hollow portion of coil 53 overlap, secondary-side non-contact charging module 42 can easily receive magnetic fluxes from primary-side non-contact charging module 41. Therefore, it is possible to suppress deterioration in the transmission efficiency of non-contact charging.

The method of aligning is not limited to the case where magnet 30*a* is used. Other methods of aligning described below are the same.

At least parts of the electrical line of secondary-side coil 2*b* and the electrical line of coil 53 are stacked. Consequently, for example, even if primary-side non-contact charging module 41 is aligned with reference to NFC antenna 51, it is possible to more efficiently transmit electric power to secondary-side non-contact charging module 42.

Further, in the sectional view of FIG. 17, secondary-side coil 2*b* is divided into sectional portion 2*ba* located on one side of housing 105 (the left side in FIG. 17) and sectional portion 2*bb* located on the other side of housing 105 (the right side in FIG. 17). Similarly, coil 53 is divided into sectional portion 53*a* located on one side of housing 105 (the left side in FIG. 17) and sectional portion 53*b* located on the other side of housing 105 (the right side in FIG. 17). Then, sectional portion 2*ba* and sectional portion 53*a* face each other. That is, on the cross section of housing 105, since the sectional portions of secondary-side coil 2*b* and coil 53 both on the left side (one side of housing 105) face each other, the hollow portion of secondary-side coil 2*b* and the hollow portion of coil 53 also face each other. Therefore, it is possible to suppress deterioration in transmission efficiency of non-contact charging. Of course, the sectional portions on the other side of housing 105 may face each other.

As shown in the sectional view of FIG. 17, in the present embodiment, secondary-side non-contact charging module 42 and NFC antenna 51 are configured to be substantially symmetrical, respectively. However, the configuration of secondary-side non-contact charging module 42 and NFC antenna 51 is not limited to this. In other words, the center portion of the magnetic sheet and the center portion of the coil (i.e., the center portion of the hollow portion of the coil) do not have to match. That is, the coil may be disposed only at any one end of the magnetic sheet. Even in such a case, it is possible to suppress an alignment error by opposing the hollow portion of secondary-side coil 2*b* and the hollow portion of coil 53 each other.

Further, in the present embodiment, secondary-side non-contact charging module 42 is disposed on the upper side (the upper housing 105*b* side) of NFC antenna 51. That is, secondary-side non-contact charging module 42 is disposed in a position close to liquid crystal panel 101 and operation button 102 compared with NFC antenna 51. In other words, NFC antenna 51 is disposed in the charging direction of secondary-side non-contact charging module 42 (the primary-side non-contact charging module 41 side). That is, secondary-side non-contact charging module 42 is disposed such that secondary-side coil 2*b* is present between secondary-side magnetic sheet 3*b* and magnetic sheet 52.

Consequently, portable terminal apparatus 100 is configured such that not only secondary-side non-contact charging module 42 and NFC antenna 51 are disposed to overlap but also secondary-side non-contact charging module 42 is not disposed on the communication surface (i.e., communication direction) side of NFC antenna 51. As described above, the communication direction is the coil 53 side of NFC antenna 51. For this reason, secondary-side non-contact charging module 42 is not disposed on the coil 53 side. Therefore, secondary-side non-contact charging module 42 is disposed on the magnetic sheet 52 side rather than on the coil 53 side for NFC antenna 51.

Consequently, since secondary-side coil 2*b*, which is a conductor, is absent in the communication direction of NFC antenna 51, it is possible to provide a satisfactory environment for near field communication. In particular, magnetic sheet 52 is thin compared with magnetic sheet 3*b* of secondary-side non-contact charging module 42 that treats large power. Therefore, even in power transmission between the non-contact charging modules, NFC antenna 51 is not a substantial obstacle.

NFC antenna 51 may be disposed on the upper side (the upper housing 105*b* side) of secondary-side non-contact charging module 42. That is, NFC antenna 51 is disposed in a position close to liquid crystal panel 101 and operation button 102 compared with secondary-side non-contact charging module 42. In other words, secondary-side non-contact charging module 42 is disposed on the communication direction side of NFC antenna 51. That is, NFC antenna 51 is disposed such that coil 53 is present between magnetic sheet 52 and secondary-side magnetic sheet 3*b*.

Consequently, since coil 53, which is a conductor, is absent in the charging direction of secondary-side non-contact charging module 42, it is possible to further improve the transmission efficiency of non-contact charging. A difference in a power transmission (communication) time is important for this. That is, secondary-side non-contact charging module 42 performs power transmission for several hours for the purpose of charging battery pack 104. Meanwhile, communication by NFC antenna 51 is about several seconds. Therefore, it is important that NFC antenna 51 does not hinder the power transmission of secondary-side non-contact charging module 42.

As in the present embodiment, if the charging direction and the near field communication direction of housing 105 do not change, the user does not need to change, according to a situation, the surface of portable terminal apparatus 100 that is brought close. For this reason, it is possible to improve the operability of portable terminal apparatus 100. That is, by placing secondary-side non-contact charging module 42 such that secondary-side coil 2*b* is closer to magnetic sheet 52 than secondary-side magnetic sheet 3*b*, it is possible to improve operability of portable terminal apparatus 100.

Secondary-side magnetic sheet 3*b* of secondary-side non-contact charging module 42 and magnetic sheet 52 of NFC antenna 51 are located on the liquid crystal panel 101 side, which is a display unit. That is, both of the power transmitting direction (the charging direction) of secondary-side non-contact charging module 42 and the communication direction of NFC antenna 51 are directions opposite to the direction of liquid crystal panel 101. Consequently, even during charging and during near field communication, it is possible to use liquid crystal panel 101 without problems. Magnetic fluxes for communication do not pass through liquid crystal panel 101.

Further, as in the present embodiment, since both of the non-contact charging direction and the near field communication direction are on the rear surface side of housing 105 (the lower housing 105a side), in other words, not on the upper surface side of housing 105 (the upper housing 105b side) including liquid crystal panel 101 (see FIGS. 1A to 1D), it is possible to suppress liquid crystal panel 101 (see FIGS. 1A to 1D) from being scratched by performing the non-contact charging or the near field communication.

In the present embodiment, of course, at least parts of secondary-side coil 2b and coil 53, in particular, at least parts of the hollow portion of secondary-side coil 2b and the hollow portion of coil 53 only have to face each other and it does not matter which of secondary-side non-contact charging module 42 and NFC antenna 51 is placed on top of the other. For example, secondary-side non-contact charging module 42 may be disposed on the lower housing 105a side, NFC antenna 51 may be disposed on the upper housing 105b side, and both of the charging direction and the communication direction may be set on the upper housing 105b side. The charging direction may be either the lower housing 105a side or the upper housing 105b side. Similarly, the communication direction may be either the lower housing 105a side or the upper housing 105b side. That is, unlike the present embodiment, the charging direction and the communication direction may be opposed directions.

Portable terminal apparatus 100, which is an example of a communication apparatus, is a portable apparatus such as a cellular phone, a personal computer, or a digital camera. However, portable terminal apparatus 100 does not need to be limited to these apparatuses.

As in the present embodiment, since the charging type of portable terminal apparatus 100 is the non-contact charging, a connection terminal for charging does not have to be provided in portable terminal apparatus 100. Therefore, since electronic members exposed to the outside of housing 105 are decreased, it is possible to improve a waterproofing property of portable terminal apparatus 100.

Secondary-side magnetic sheet 3b of secondary-side non-contact charging module 42 is thinner than magnetic sheet 52 of NFC antenna 51. Therefore, the power transmission between the non-contact charging modules can easily penetrate thin magnetic sheet 52. That is, satisfactory communication (that is, power transmission) efficiency can be obtained not only in the near field communication of the sheet antenna but also in the power transmission between the non-contact charging modules. Secondary-side magnetic sheet 3b is made of a material that shows a good characteristic at a resonance frequency of 100 to 200 kHz at which the power transmission is performed. Magnetic sheet 52 is made of a material that shows a good characteristic at a frequency used for the near field communication of RFID, i.e., a resonance frequency higher than the resonance frequency of the power transmission. In NFC antenna 51, a resonance frequency is 13.56 MHz. That is, as secondary-side magnetic sheet 3b and magnetic sheet 52, ferrite sheets of different materials or compositions are respectively used.

The winding width of secondary-side coil 2b (i.e., the winding width of sectional portion 2ba or sectional portion 2bb) is thicker than the winding width of coil 53 of NFC antenna 51 (i.e., the winding width of sectional portion 53a or 53b). Therefore, since secondary-side coil 2b extends beyond coil 53 irrespective of how the coils are stacked, it is possible to sufficiently perform the power transmission.

Further, if secondary-side non-contact charging module 42 is configured larger than NFC antenna 51, it is possible to further improve communication efficiency of each of secondary-side non-contact charging module 42 and NFC antenna 51. That is, since some portion of secondary-side non-contact charging module 42 always extends beyond NFC antenna 51, it is possible to secure a portion where secondary-side non-contact charging module 42 can receive, not via NFC antenna 51, magnetic fluxes generated from primary-side non-contact charging module 41.

Embodiment 2

Figure 18:
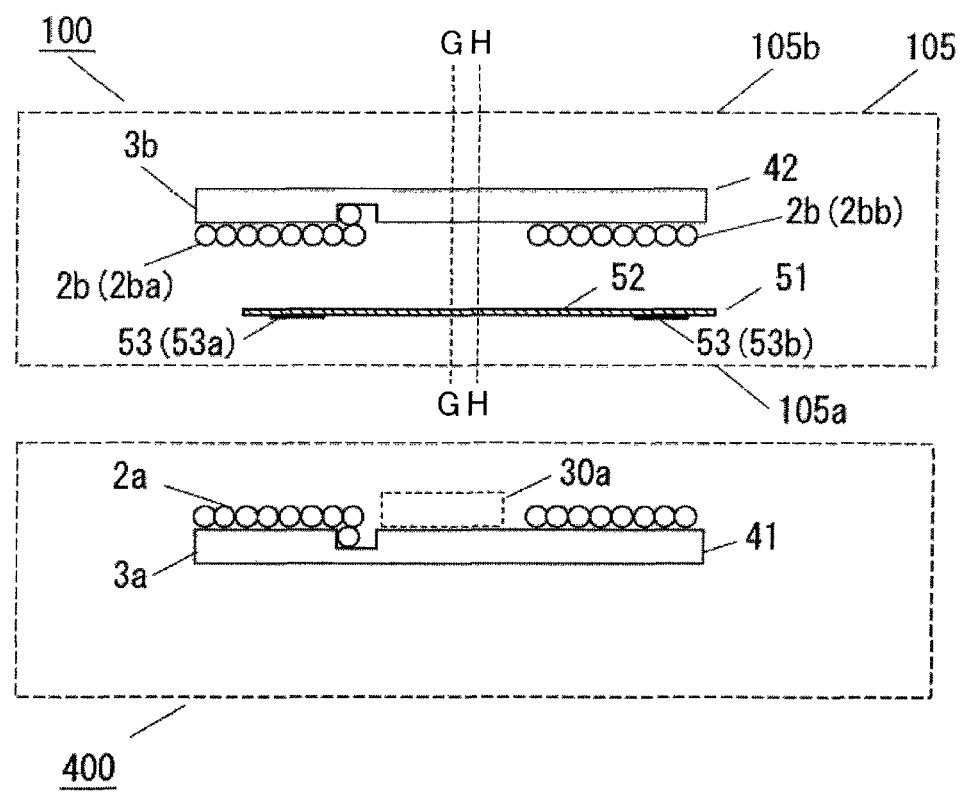
FIG. 18 is a sectional view showing an arrangement example of non-contact charging modules and an NFC antenna in an embodiment of the present invention.

Embodiment 2 will be described below with reference to FIG. 18. FIG. 18 is a sectional view showing an arrangement example of non-contact charging modules and an NFC antenna in an embodiment of the present invention. FIG. 18 is also a diagram conceptually showing a cross section of portable terminal apparatus 100 shown in FIGS. 1A to 1C cut in the thickness direction (the stack direction of lower housing 105a and upper housing 105b). Members including components and functions same as those in the first embodiment are denoted by the same reference numerals and signs and detailed description of the members is omitted.

First, a straight line G-G and a straight line H-H are described. The straight line G-G shown in FIG. 18 is the center axis of the hollow portion of secondary-side coil 2b and is the center of the hollow portion of secondary-side coil 2b in the cross section of housing 105. That is, referring to FIG. 18, the straight line G-G is the center of the innermost portion of sectional portion 2ba and the innermost portion of sectional portion 2bb. The straight line H-H is the center axis of the hollow portion of coil 53 and is the center of the hollow portion of coil 53 in the same cross section. That is, referring to FIG. 18, the straight line H-H is the center of the innermost portion of sectional portion 53a and the innermost portion of sectional portion 53b.

If the hollow portions of the coils are circular, the center axes (the straight line G-G and the straight line H-H) may be the centers of the circles. Alternatively, if the hollow portions of the coils are polygonal, the center axes may be the centers of gravity of the polygons, intersections of diagonal lines, or the like.

Next, characteristic points of the present embodiment will be described.

In general, in aligning for non-contact charging, deterioration in efficiency of power transmission is suppressed by placing the hollow portions of the primary-side and secondary-side coils one on top of the other. That is, the aligning is performed to align the centers of the hollow portions of the primary-side and secondary-side coils each other.

Therefore, in the present embodiment, as shown in FIG. 18, the secondary-side non-contact charging module is disposed such that the hollow portion of secondary-side coil 2b crosses the straight line H-H. For this reason, even if primary-side non-contact charging module 41 is aligned with NFC antenna 51, i.e., the aligning is performed such that the center axis of the hollow portion of primary-side coil 2a and the center axis of the hollow portion of coil 53 (the straight line H-H) match, the hollow portion of primary-side coil 2a and the hollow portion of secondary-side coil 2b are located on the straight line H-H. Therefore, at least a part of the hollow portion of primary-side coil 2a can face the hollow portion of secondary-side coil 2b. As described above, since an alignment error is further suppressed, secondary-side non-contact charging module 42 can further receive magnetic fluxes. That is, it is possible to suppress deterioration in efficiency of power transmission of non-contact charging.

Further, in the present embodiment, NFC antenna 51 is disposed such that the hollow portion of coil 53 is located on the straight line G-G. Not only sectional portion 2ba and sectional portion 53a but also sectional portion 2bb and sectional portion 53b face each other. Consequently, it is possible to increase an area of the opposed portions of the hollow portion of secondary-side coil 2b and the hollow portion of coil 53. That is, it is possible to suppress the alignment error and suppress the deterioration in efficiency of power transmission of non-contact charging.

In the present embodiment, the hollow portion of coil 53 faces the hollow portion of secondary-side coil 2b to include the hollow portion of secondary-side coil 2b. Specifically, a projection of the hollow portion of coil 53 in the perpendicular direction (the straight line H-H direction) of magnetic sheet 52 includes the hollow portion of secondary-side coil 2b. Consequently, magnetic fluxes generated by primary-side non-contact charging module 41 can be allowed to easily pass through the hollow portion of coil 53 rather than the electrical line of coil 53 that causes an eddy current and heat generation. For this reason, it is possible to suppress the deterioration in efficiency of non-contact charging.

Conversely, the hollow portion of secondary-side coil 2b may face the hollow portion of coil 53 to include the hollow portion of coil 53. That is, a projection of the hollow portion of secondary-side coil 2b in the perpendicular direction (the straight line G-G direction) of secondary-side magnetic sheet 3b includes the hollow portion of coil 53. In the arrangement described above, irrespective of the position of magnetic sheet 52 magnet 30a is aligned, the hollow portion of secondary-side coil 2b is present on a straight line direction that connects magnet 30a and the hollow portion of coil 53. Therefore, the hollow portion of secondary-side coil 2b faces magnet 30a (i.e., at least a part of the hollow portion of primary-side coil 2a). Consequently, it is possible to further suppress the deterioration in efficiency of non-contact charging.

NFC antenna 51 may be disposed on the upper side (the upper housing 105b side) of secondary-side non-contact charging module 42. That is, NFC antenna 51 is disposed in a position close to liquid crystal panel 101 and operation button 102 compared with secondary-side non-contact charging module 42. In other words, secondary-side non-contact charging module 42 is disposed on the communication direction side of NFC antenna 51. That is, NFC antenna 51 is disposed such that coil 53 is present between magnetic sheet 52 and the secondary-side magnetic sheet.

Consequently, since coil 53, which is a conductor, is absent in the charging direction of secondary-side non-contact charging module 42, it is possible to further improve the transmission efficiency of non-contact charging.

Embodiment 3

Figure 19:
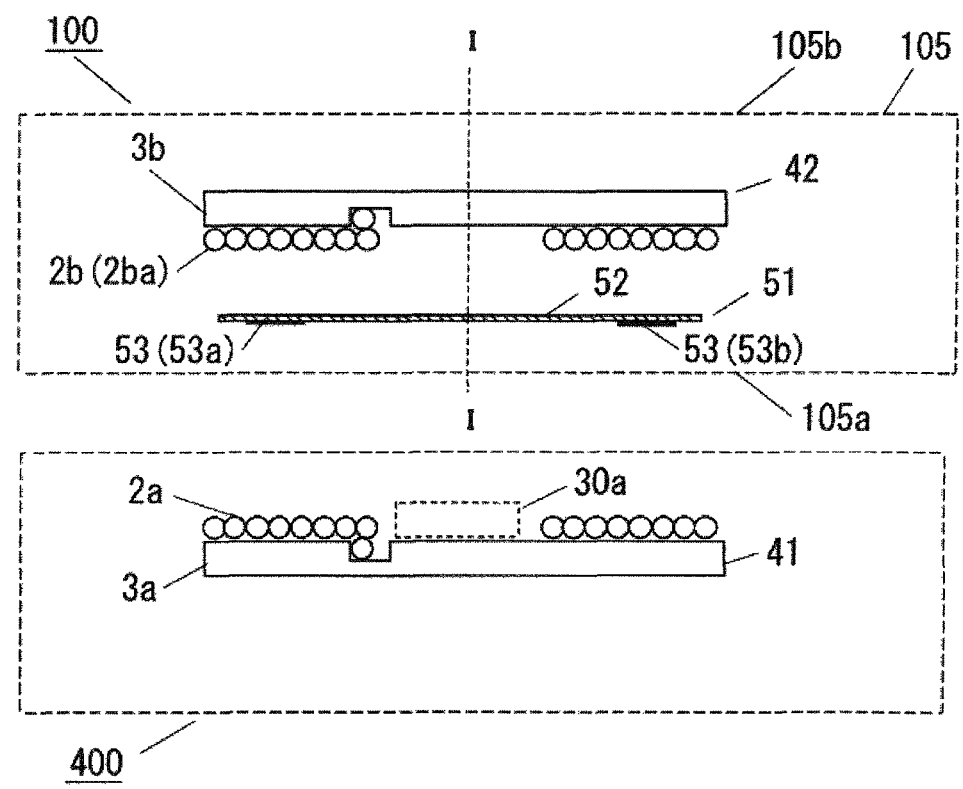
FIG. 19 is a sectional view showing an arrangement example of non-contact charging modules and an NFC antenna in an embodiment of the present invention.

Embodiment 3 will be described below with reference to FIG. 19. FIG. 19 is a sectional view showing an arrangement example of non-contact charging modules and an NFC antenna in an embodiment of the present invention. FIG. 19 is also a diagram conceptually showing a cross section of portable terminal apparatus 100 shown in FIGS. 1A to 1C cut in the thickness direction (the stack direction of lower housing 105a and upper housing 105b). Members including components and functions same as those in Embodiments 1 and 2 are denoted by the same reference numerals and signs and detailed description of the members is omitted.

In the present embodiment, secondary-side non-contact charging module 42 and NFC antenna 51 are disposed to completely overlap. That is, in the case of the present embodiment, since a principal plane of secondary-side non-contact charging module 42 is larger than a principal plane of NFC antenna 51, a projection in the perpendicular direction of the principal plane of secondary-side non-contact charging module 42 includes NFC antenna 51. Conversely, a projection in the perpendicular direction of the principal plane of NFC antenna 51 is included in secondary-side non-contact charging module 42.

Therefore, since an area of the two magnetic bodies (secondary-side magnetic sheet 3b and magnetic sheet 52) viewed from magnet 30a is further reduced, it is possible to further suppress an alignment error to magnet 30a.

In the present embodiment, secondary-side non-contact charging module 42 and NFC antenna 51 are disposed such that a projection in the perpendicular direction of a plane including secondary-side coil 2b includes coil 53. The hollow portion of secondary-side coil 2b and the hollow portion of coil 53 face each other. Further, a straight line I-I is the center axis of secondary-side non-contact charging module 42 and the center axis of NFC antenna 51. That is, NFC antenna 51 is disposed such that the center axis of NFC antenna 51 overlaps the center axis (the straight line I-I) of secondary-side non-contact charging module 42. In the case of the present embodiment, since the hollow portion of coil 53 is larger than the hollow portion of secondary-side coil 2b, secondary-side coil 2b is disposed to be placed on coil 53 such that the hollow portion of secondary-side coil 2b is included in the hollow portion of coil 53. When the hollow portion of secondary-side coil 2b is larger than the hollow portion of coil 53, coil 53 is disposed to be placed on secondary-side coil 2b such that the hollow portion of coil 53 is included in the hollow portion of secondary-side coil 2b.

Therefore, even if magnet 30a is aligned to the center axis of NFC antenna 51, since the hollow portion of primary-side coil 2a faces the hollow portion of secondary-side coil 2b, secondary-side non-contact charging module 42 can be aligned with primary-side non-contact charging module 41.

By disposing secondary-side non-contact charging module 42 and NFC antenna 51 as described above, it is possible to improve accuracy of aligning by magnet 30a. Therefore, it is possible to suppress deterioration in efficiency of non-contact charging.

The shapes of the hollow portions of primary-side coil 2a, secondary-side coil 2b, and coil 53 are not specifically limited and may be any shape such as an annular shape (a circular shape), an elliptical shape, a rectangular shape, or a polygonal shape.

In Embodiments 1 to 3, as a method of aligning primary-side non-contact charging module 41 and secondary-side non-contact charging module 42, a method of aligning the modules using the magnet is described. However, even if other methods are used, it is preferable to dispose secondary-side non-contact charging module 42 and NFC antenna 51 with the hollow portions thereof placed one on top of the other.

For example, the same applies in the case of a method in which non-contact charger 400 (or primary-side non-contact charging module 41) detects the position of secondary-side coil 2b of secondary-side non-contact charging module 42 to automatically move primary-side coil 2a to the position of secondary-side coil 2b.

Even if non-contact charger 400 aligns primary-side coil 2a with the position of coil 53 (a coil not to be aligned), secondary-side non-contact charging module 42 is disposed to face NFC antenna 51 including coil 53. Therefore, even if primary-side coil 2a and coil 53 are aligned, it is possible to suppress an alignment error of primary-side coil 2a and secondary-side coil 2b.

The same applies in the case of a method in which, since non-contact charger 400 includes a large number of coils, portable terminal apparatus 100 can be charged anywhere on charging surface 402 of non-contact charger 400. In this method, non-contact charger 400 causes all the large number of coils to generate magnetic fluxes in some case and does not cause all the coils to generate magnetic fluxes in other cases. When non-contact charger 400 does not cause all the large number of coils to generate magnetic fluxes, non-contact charger 400 detects secondary-side coil 2b of secondary-side non-contact charging module 42 to select (one or a plurality of) coil matching the position of secondary-side coil 2b out of the large number of coils. Non-contact charger 400 feeds an electric current to the selected coil (hereinafter referred to as primary-side coil 2a) to transmit electric power to the secondary side.

Even if non-contact charger 400 selects a coil (primary-side coil 2a) matching the position of coil 53 (a coil not to be aligned), secondary-side non-contact charging module 42 is disposed to face NFC antenna 51 including coil 53. Therefore, even if primary-side coil 2a and coil 53 are aligned, it is possible to suppress an alignment error of primary-side coil 2a and secondary-side coil 2b.

As described above, in various aligning methods, it is possible to suppress an alignment error and send a large number of magnetic fluxes to secondary-side coil 2b by opposing at least parts of the hollow portion of secondary-side coil 2b and the hollow portion of coil 53 each other. Therefore, it is possible to suppress deterioration in efficiency of non-contact charging.

Embodiments 1 to 3 can be combined as appropriate.

Embodiment 4

In Embodiment 4, as shown in FIG. 17 described in Embodiment 1, in portable terminal apparatus 100, at least a part of secondary-side non-contact charging module 42 (secondary-side magnetic sheet 3b) is disposed to overlap NFC antenna 51 (magnetic sheet 52). That is, at least a part of a projection in the perpendicular direction of the principal plane of secondary-side non-contact charging module 42 (secondary-side magnetic sheet 3b) overlaps NFC antenna 51 (magnetic sheet 52). In other words, at least parts of secondary-side non-contact charging module 42 (secondary-side magnetic sheet 3b) and NFC antenna 51 (magnetic sheet 52) face each other. In the case of the present embodiment, secondary-side magnetic sheet 3b is formed to cover the principal plane of secondary-side non-contact charging module 42. For this reason, when NFC antenna 51 faces secondary-side magnetic sheet 3b, NFC antenna 51 substantially faces secondary-side non-contact charging module 42. The same applies to magnetic sheet 52. When secondary-side non-contact charging module 42 faces magnetic sheet 52, secondary-side non-contact charging module 42 substantially faces NFC antenna 51. Members including components and functions same as those in Embodiments 1 to 3 are denoted by the same reference numerals and signs and detailed description of the members is omitted.

According to the arrangement described above, an area of the two magnetic bodies (secondary-side magnetic sheet 3b and magnetic sheet 52 of NFC antenna 51) at the time when portable terminal apparatus 100 is viewed from magnet 30a is reduced. For this reason, it is possible to reduce an alignment error by magnet 30a. That is, in other words, even if magnet 30a and magnetic sheet 52 (a magnetic body not to be aligned) attract each other (i.e., primary-side coil 2a and coil 53 are aligned), secondary-side non-contact charging module 42 is disposed to face NFC antenna 51 including magnetic sheet 52. For this reason, it is possible to suppress an alignment error of primary-side coil 2a and secondary-side coil 2b. In secondary-side non-contact charging module 42, at least a portion overlapping NFC antenna 51 can surely receive magnetic fluxes of primary-side non-contact charging module 41. In particular, if secondary-side coil 2b of secondary-side non-contact charging module 42 and coil 53 of NFC antenna 51 overlap, secondary-side non-contact charging module 42 can receive magnetic fluxes. Therefore, compared with the case where secondary-side non-contact charging module 42 and NFC antenna 51 are disposed without being placed one on top of the other, secondary-side non-contact charging module 42 can easily receive magnetic fluxes generated by primary-side non-contact charging module 41. For this reason, it is possible to suppress deterioration in efficiency of non-contact charging.

Further, in the present embodiment, secondary-side non-contact charging module 42 is disposed on the upper side (the upper housing 105b side) of NFC antenna 51. That is, secondary-side non-contact charging module 42 is disposed in a position close to liquid crystal panel 101 and operation button 102 compared with NFC antenna 51. In other words, NFC antenna 51 is disposed in the charging direction of secondary-side non-contact charging module 42 (the primary-side non-contact charging module 41 side).

Consequently, NFC antenna 51 can perform more satisfactory communication. A reason for this will be described below. The charging direction is the direction on the primary-side non-contact charging module 41 side for secondary-side non-contact charging module 42 and is the direction on the secondary-side non-contact charging module 42 side for primary-side non-contact charging module 41. That is, the charging direction for secondary-side non-contact charging module 42 is the direction on the secondary-side coil 2b side and the direction on the opposite side of secondary-side magnetic sheet 3b. In other words, a non-charging direction for secondary-side non-contact charging module 42 is the direction of secondary-side magnetic sheet 3b and the direction on the opposite side of secondary-side coil 2b.

As described above, NFC antenna 51 sets the rear surface side (the lower housing 105a side) of housing 105 as the communication direction. That is, in NFC antenna 51, magnetic sheet 52 is present on the upper surface side (the upper housing 105b side) of housing 105 viewed from coil 53.

Secondary-side non-contact charging module 42 is larger than NFC antenna 51. Secondary-side non-contact charging module 42 needs a large electric current in order to perform charging. Secondary-side coil 2b for feeding the electric current and secondary-side magnetic sheet 3b for suppressing a leak of magnetic fluxes generated by the electric current are also large compared with primary-side coil 2a and primary-side magnetic sheet 3a. For this reason, the influence of secondary-side non-contact charging module 42 on NFC antenna 51 is large compared with the influence of NFC antenna 51 on secondary-side non-contact charging module 42.

Therefore, portable terminal apparatus 100 in the present embodiment is configured such that not only secondary-side non-contact charging module 42 and NFC antenna 51 are disposed to overlap but also secondary-side non-contact charging module 42 is not disposed on the communication surface (i.e., in the communication direction) of NFC antenna 51. As described above, the communication direction is the coil 53 side of NFC antenna 51. For this reason, secondary-side non-contact charging module 42 is not disposed on the coil 53 side. Therefore, secondary-side non-contact charging module 42 is disposed on the magnetic sheet 52 side rather than on the coil 53 side for NFC antenna 51.

Consequently, it is possible to suppress deterioration in efficiency of non-contact charging and decrease a factor for inhibiting communication of NFC antenna 51. Therefore, it is possible to configure portable terminal apparatus 100 that can perform non-contact charging and near field communication.

As described above, portable terminal apparatus 100 in the present embodiment can perform non-contact charging by secondary-side non-contact charging module 42 and near field communication by NFC antenna 51. That is, by reducing mutual interference of secondary-side non-contact charging module 42 and NFC antenna 51, it is possible to allow secondary-side non-contact charging module 42 and NFC antenna 51 to coexist in one portable terminal apparatus 100.

As in the present embodiment, if the charging direction and the near field communication direction of housing 105 do not change, the user does not need to change, according to a situation, the surface of portable terminal apparatus 100 that is brought close to NFC antenna 51. For this reason, it is possible to improve the operability of portable terminal apparatus 100. That is, by placing secondary-side non-contact charging module 42 such that secondary-side coil 2b is closer to magnetic sheet 52 than secondary-side magnetic sheet 3b, it is possible to improve the operability of portable terminal apparatus 100.

Further, as in the present embodiment, since both of the non-contact charging direction and the near field communication direction are on the rear surface side (the lower housing 105a side) of housing 105, in other words, not on the upper surface side (the upper housing 105b side) of housing 105 including liquid crystal panel 101 (see FIGS. 1A to 1D), it is possible to suppress liquid crystal panel 101 (see FIGS. 1A to 1D) from being scratched by performing the non-contact charging or the near field communication.

As shown in the sectional view of FIG. 17, in the present embodiment, secondary-side non-contact charging module 42 and NFC antenna 51 are configured to be substantially symmetrical to each other. However, the configuration of secondary-side non-contact charging module 42 and NFC antenna 51 is not limited to this. In other words, the center portion of the magnetic sheet and the center portion of the coil (i.e., the center portion of the hollow portion of the coil) do not have to match. That is, the coil may be disposed only at any one end of the magnetic sheet.

However, when secondary-side non-contact charging module 42 or NFC antenna 51 is configured as described above, depending on a way of placing secondary-side non-contact charging module 42 and NFC antenna 51 one on top of the other, secondary-side non-contact charging module 42 and NFC antenna 51 are sometimes disposed such that a portion at an end of secondary-side magnetic sheet 3b where secondary-side coil 2b is not disposed and a portion at an end of magnetic sheet 52 where coil 53 is not disposed to overlap each other.

Therefore, secondary-side non-contact charging module 42 and NFC antenna 51 are preferably disposed such that secondary-side coil 2b (including the hollow portion) and coil 53 (including the hollow portion) face each other. By adopting such arrangement, it is possible to place the two coils close to each other irrespective of the configurations and a way of overlapping of secondary-side non-contact charging module 42 and NFC antenna 51. That is, even if magnet 30a and magnetic sheet 52 attract each other, secondary-side magnetic sheet 3b close to coil 53 can easily receive magnetic fluxes from primary-side non-contact charging module 41. Therefore, it is possible to suppress deterioration in efficiency of non-contact charging.

Of course, the relation between secondary-side non-contact charging module 42 and NFC antenna 51 may be opposite. In this case, secondary-side non-contact charging module 42 is disposed on the lower housing 105a side, NFC antenna 51 is disposed on the upper housing 105b side, and both of the charging direction and the communication direction are on the upper housing 105b side.

Portable terminal apparatus 100, which is an example of a communication apparatus, is a portable apparatus such as a cellular phone, a personal computer, or a digital camera. However, portable terminal apparatus 100 does not need to be limited to these apparatuses.

As in the present embodiment, since the charging type of portable terminal apparatus 100 is the non-contact charging, a connection terminal for charging does not have to be provided in portable terminal apparatus 100. Therefore, since electronic members exposed to the outside of housing 105 are decreased, it is possible to improve a waterproofing property of portable terminal apparatus 100.

Secondary-side magnetic sheet 3b of secondary-side non-contact charging module 42 is thinner than magnetic sheet 52 of NFC antenna 51. Therefore, the power transmission between the non-contact charging modules can easily penetrate thin magnetic sheet 52. That is, satisfactory communication (power transmission) efficiency can be obtained not only in the near field communication of the sheet antenna but also in the power transmission between the non-contact charging modules. Secondary-side magnetic sheet 3b is made of a material that shows a good characteristic at a resonance frequency of 100 to 200 kHz at which the power transmission is performed. Magnetic sheet 52 is made of a material that shows a good characteristic at a frequency used for the near field communication of RFID, i.e., a resonance frequency higher than the resonance frequency of the power transmission. In NFC antenna 51, a resonance frequency is 13.56 MHz. That is, as secondary-side magnetic sheet 3b and magnetic sheet 52, ferrite sheets of different materials or compositions are respectively used.

The winding width of secondary-side coil 2b is thicker than the winding width of coil 53 of NFC antenna 51. Therefore, since secondary-side coil 2b extends beyond coil 53 irrespective of how the coils are stacked, it is possible to sufficiently perform the power transmission.

Magnetic sheet 3b of the secondary-side non-contact charging module is disposed on the liquid crystal panel 101 side, which is a display unit, and secondary-side coil 2b faces NFC antenna 51. That is, both of the power transmitting direction of secondary-side non-contact charging module 42 and the communication direction of NFC antenna 51 are directions opposite to the direction of liquid crystal panel 101. Consequently, even during charging or during near field communication, it is possible to use liquid crystal panel 101 without problems. Magnetic fluxes for communication do not pass through liquid crystal panel 101.

The hollow portion of secondary-side coil 2b and the hollow portion of coil 53 are stacked, i.e., at least parts of the hollow portions are on one straight line. Since at least the parts of both the hollow portions are stacked, accuracy of aligning is improved. The same applies not only to the case where a magnet is used for aligning but also to other aligning methods. Accuracy of aligning is improved when substantial positions of secondary-side non-contact charging module 42 and NFC antenna 51 are nearly matched by stacking the hollow portions.

At least parts of the electrical line of secondary-side coil 2b and the electrical line of coil 53 are stacked. Consequently, even if primary-side non-contact charging module 41 is aligned with reference to NFC antenna 51, it is possible to efficiently transmit electric power to secondary-side non-contact charging module 42.

Further, when secondary-side non-contact charging module 42 is configured larger than NFC antenna 51, it is possible to improve the efficiency of communication of each of secondary-side non-contact charging module 42 and NFC antenna 51. That is, since some portion of secondary-side non-contact charging module 42 always extends beyond NFC antenna 51, it is possible to secure a portion where non-contact charging module 42 can receive, not via NFC antenna 51, magnetic fluxes generated from primary-side non-contact charging module 41.

Embodiment 5

Embodiment 5 will be described below with reference to FIG. 19. FIG. 19 is also a diagram conceptually showing a cross section of portable terminal apparatus 100 shown in FIG. 1 cut in the thickness direction (the stack direction of lower housing 105a and upper housing 105b). Members including components and functions same as those in Embodiments 1 to 4 are denoted by the same reference numerals and signs and detailed description of the members is omitted.

The present embodiment is different from Embodiment 4 in a positional relation between secondary-side non-contact charging module 42 and NFC antenna 51.

Secondary-side non-contact charging module 42 and NFC antenna 51 are disposed to completely overlap. That is, in the case of the present embodiment, since a principal plane of secondary-side non-contact charging module 42 is larger than a principal plane of NFC antenna 51, a projection in the perpendicular direction of the principal plane of secondary-side non-contact charging module 42 includes NFC antenna 51. Conversely, a projection in the perpendicular direction of the principal plane of NFC antenna 51 is included in secondary-side non-contact charging module 42.

Therefore, since an area of the two magnetic bodies (secondary-side magnetic sheet 3b and magnetic sheet 52) viewed from magnet 30a is further reduced, it is possible to further suppress an alignment error to magnet 30a.

In the present embodiment, secondary-side non-contact charging module 42 and NFC antenna 51 are disposed such that a projection in the perpendicular direction of a plane including secondary-side coil 2b includes coil 53. The hollow portion of secondary-side coil 2b and the hollow portion of coil 53 face each other. Further, a straight line I-I is the center axis of secondary-side non-contact charging module 42 and the center axis of NFC antenna 51. That is, NFC antenna 51 is disposed such that the center axis of NFC antenna 51 overlaps the center axis (the straight line I-I) of secondary-side non-contact charging module 42. In the case of the present embodiment, since the hollow portion of coil 53 is larger than the hollow portion of secondary-side coil 2b, secondary-side coil 2b is disposed to be placed on coil 53 such that the hollow portion of secondary-side coil 2b is included in the hollow portion of coil 53.

Therefore, even if magnet 30a is aligned to the center axis of NFC antenna 51, since the hollow portion of primary-side coil 2a faces the hollow portion of secondary-side coil 2b, secondary-side non-contact charging module 42 can be aligned with primary-side non-contact charging module 41.

By disposing secondary-side non-contact charging module 42 and NFC antenna 51 as described above, it is possible to improve accuracy of aligning by magnet 30a. Therefore, it is possible to suppress deterioration in efficiency of non-contact charging.

In the present embodiment, a projection in the perpendicular direction of the hollow portion of secondary-side coil 2b is included in the hollow portion of coil 53. Consequently, magnetic fluxes generated by primary-side non-contact charging module 41 can be allowed to easily pass through the hollow portion of coil 53 rather than the electrical line of coil 53 that causes an eddy current and heat generation. That is, it is possible to suppress deterioration in efficiency of non-contact charging.

Conversely, the projection in the perpendicular direction of the hollow portion of coil 53 may be disposed to be included in the hollow portion of secondary-side coil 2b. In the arrangement described above, even if magnet 30a is aligned with magnetic sheet 52, the hollow portion of secondary-side coil 2b is present on a straight line direction that connects magnet 30a and the hollow portion of coil 53. Therefore, the hollow portion of secondary-side coil 2b faces magnet 30a (i.e., at least a part of the hollow portion of primary-side coil 2a). Consequently, it is possible to further suppress the deterioration in efficiency of non-contact charging.

The shapes of the hollow portions of primary-side coil 2a, secondary-side coil 2b, and coil 53 are not specifically limited and may be any shape such as an annular shape (a circular shape), an elliptical shape, a rectangular shape, or a polygonal shape.

In Embodiments 1 to 5, as a method of aligning primary-side non-contact charging module 41 and secondary-side non-contact charging module 42, a method of aligning the modules using the magnet is described. However, even if other methods are used, it is preferable to dispose secondary-side non-contact charging module 42 and NFC antenna 51 to be placed one on top of the other.

For example, the same applies in the case of a method in which non-contact charger 400 (or primary-side non-contact charging module 41) detects the position of secondary-side coil 2b of secondary-side non-contact charging module 42 to automatically move primary-side coil 2a to the position of secondary-side coil 2b.

Even if non-contact charger 400 aligns primary-side coil 2a with the position of coil 53 (a coil not to be aligned), secondary-side non-contact charging module 42 is disposed to face NFC antenna 51 including coil 53. Therefore, even if primary-side coil 2a and coil 53 are aligned, it is possible to suppress an alignment error of primary-side coil 2a and secondary-side coil 2b.

The same applies in the case of a method in which, since non-contact charger 400 includes a large number of coils, portable terminal apparatus 100 can be charged anywhere on charging surface 402 of non-contact charger 400. In this method, non-contact charger 400 causes all the large number of coils to generate magnetic fluxes in some case and does not cause all the coils to generate magnetic fluxes in other cases. When non-contact charger 400 does not cause all the large number of coils to generate magnetic fluxes, non-contact charger 400 detects secondary-side coil 2b of secondary-side non-contact charging module 42 to select (one or a plurality of) coils matching the position of secondary-side coil 2b out of the large number of coils. Non-contact charger 400 feeds an electric current to the selected coil (hereinafter referred to as primary-side coil 2a) to transmit electric power to the secondary side.

Even if non-contact charger 400 selects a coil (primary-side coil 2a) matching the position of coil 53 (a coil not to be aligned), secondary-side non-contact charging module 42 is disposed to face NFC antenna 51 including coil 53. Therefore, even if primary-side coil 2a and coil 53 are aligned, it is possible to suppress an alignment error of primary-side coil 2a and secondary-side coil 2b.

As described above, in various aligning methods, it is possible to suppress an alignment error of primary-side coil 2a and secondary-side coil 2b. That is, it is possible to send a large number of magnetic fluxes to secondary-side coil 2b. Therefore, it is possible to suppress deterioration in efficiency of non-contact charging.

Embodiments 1 to 5 can be combined as appropriate.

Embodiment 6

Figure 20:
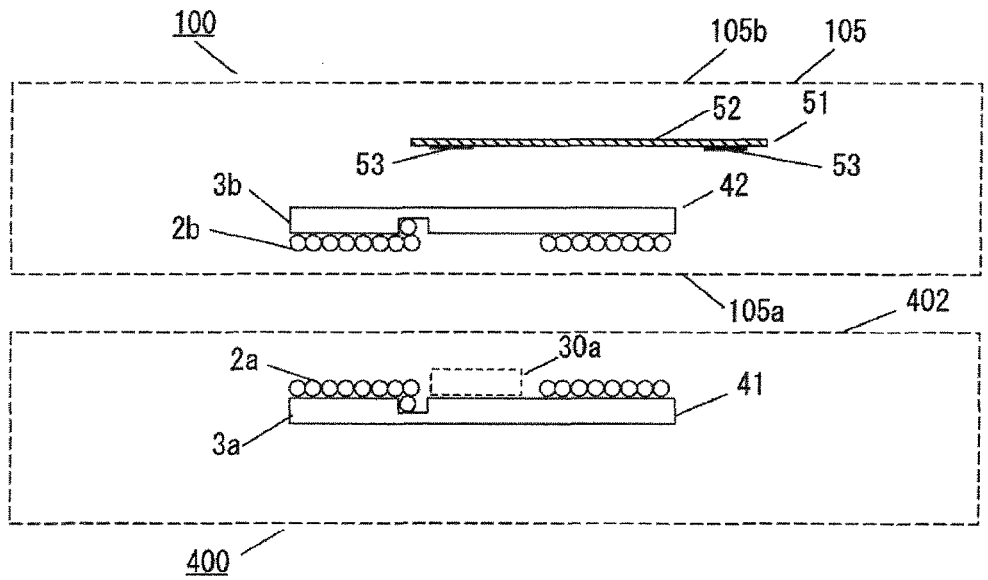
FIG. 20 is a sectional view showing an arrangement example of non-contact charging modules and an NFC antenna in an embodiment of the present invention.

Embodiment 6 will be described in detail below with reference to FIG. 20. FIG. 20 is a sectional view showing an arrangement example of non-contact charging modules and an NFC antenna in an embodiment of the present invention. FIG. 20 is also a diagram conceptually showing a cross section of portable terminal apparatus 100 shown in FIG. 1 cut in the thickness direction (the stack direction of lower housing 105a and upper housing 105b). To simplify the description, FIG. 20 does not show liquid crystal panel 101, operation button 102, substrate 103, and battery pack 104 and shows an arrangement relation between secondary-side non-contact charging module 42 and NFC antenna 51. Secondary-side non-contact charging module 42 and NFC antenna 51 are simply shown as only coils and magnetic sheets. In the above description, members including components and functions same as those in Embodiments 1 to 5 are denoted by the same reference numerals and signs and detailed description of the members is omitted.

First, an overview of portable terminal apparatus 100 and non-contact charger 400 will be described.

Battery pack 104 (see FIGS. 1A to 1D) in portable terminal apparatus 100 is charged via primary-side non-contact charging module 41 and secondary-side non-contact charging module 42. Specifically, an electric current flows to secondary-side coil 2b with a magnetic field generated by feeding an electric current to primary-side coil 2a in non-contact charger 400. Battery pack 104 electrically connected to secondary-side non-contact charging module 42 is charged. Consequently, non-contact charger 400 can charge portable terminal apparatus 100 without being electrically connected to portable terminal apparatus 100 (in a non-contact manner).

Portable terminal apparatus 100 includes NFC antenna 51 described above. Like primary-side non-contact charging module 41 and secondary-side non-contact charging module 42, NFC antenna 51 supplies electric power and performs data transmission using electromagnetic induction (magnetic fluxes).

In the present embodiment, a communication surface of NFC antenna 51 is the lower housing 105a side. That is, as the structure of NFC antenna 51, coil 53 is stacked further on the lower housing 105a side than magnetic sheet 52. Therefore, a communication direction for NFC antenna 51 is a direction on the coil 53 side and a direction on the opposite side of magnetic sheet 52. In other words, a non-communication direction of NFC antenna 51 is a direction on the magnetic sheet 52 side and a direction on the opposite side of coil 53. As described above, NFC antenna 51 sets the rear surface side of housing 105 as the communication direction. Communication can be performed by bringing a communication destination of NFC antenna 51 close to the rear surface side.

Next, the arrangement of secondary-side non-contact charging module 42 and NFC antenna 51 in portable terminal apparatus 100 will described in detail.

As described above, in primary-side non-contact charging module 41 (or secondary-side non-contact charging module 42), the magnet for aligning of primary-side coil 2a and secondary-side coil 2b is present in some case and absent in other cases. As shown in FIG. 20, when primary-side non-contact charging module 41 includes magnet 30a, magnet 30a can perform aligning by attracting and being attracted by mainly secondary-side magnetic sheet 3b of secondary-side non-contact charging module 42.

However, since portable terminal apparatus 100 in the present embodiment includes secondary-side non-contact charging module 42 and NFC antenna 51, there are a plurality of modules including coils that form LC resonance circuits using magnetic sheets (magnetic bodies) and resonance capacitors.

Therefore, in the present embodiment, as shown in FIG. 20, in portable terminal apparatus 100, at least a part of secondary-side non-contact charging module 42 (secondary-side magnetic sheet 3b) is disposed to overlap NFC antenna 51 (magnetic sheet 52). That is, at least a part of a projection in the perpendicular direction of a principal plain of secondary-side non-contact charging module 42 (secondary-side magnetic sheet 3b) overlaps NFC antenna 51 (magnetic sheet 52). In other words, at least parts of secondary-side non-contact charging module 42 (secondary-side magnetic sheet 3b) and NFC antenna 51 (magnetic sheet 52) face each other. In the case of the present embodiment, secondary-side magnetic sheet 3b is formed to cover the principal plane of secondary-side non-contact charging module 42. For this reason, when NFC antenna 51 faces secondary-side magnetic sheet 3b, NFC antenna 51 substantially faces secondary-side non-contact charging module 42. The same applies to magnetic sheet 52. When secondary-side non-contact charging module 42 faces magnetic sheet 52, secondary-side non-contact charging module 42 substantially faces NFC antenna 51.

According to the arrangement described above, an area of the two magnetic bodies (secondary-side magnetic sheet 3b and magnetic sheet 52 of NFC antenna 51) at the time when portable terminal apparatus 100 is viewed from magnet 30a is reduced. For this reason, it is possible to reduce an alignment error by magnet 30a. That is, in other words, even if magnet 30a and magnetic sheet 52 (a magnetic body not to be aligned) attract each other (i.e., primary-side coil 2a and coil 53 are aligned), secondary-side non-contact charging module 42 is disposed to face NFC antenna 51 including magnetic sheet 52. For this reason, it is possible to suppress an alignment error of primary-side coil 2a and secondary-side coil 2b. Therefore, compared with the case where secondary-side non-contact charging module 42 and NFC antenna 51 are disposed without being placed one on top of the other, since secondary-side non-contact charging module 42 can easily receive magnetic fluxes generated by primary-side non-contact charging module 41, it is possible to suppress deterioration in efficiency of non-contact charging.

Further, in the present embodiment, NFC antenna 51 is disposed on the upper side (the upper housing 105b side) of the secondary-side non-contact charging module. That is, NFC antenna 51 is disposed in a position close to liquid crystal panel 101 and operation button 102 compared with secondary-side non-contact charging module 42. In other words, secondary-side non-contact charging module 42 is disposed on the communication direction side of NFC antenna 51.

Consequently, it is possible to suppress deterioration in efficiency of non-contact charging. A reason for this will be described in detail below.

In the present embodiment, secondary-side non-contact charging module 42 sets the lower housing 105a side as a charging direction. For secondary-side non-contact charging module 42, the charging direction is a direction in which primary-side non-contact charging module 41, to which electric power is transmitted, is present. That is, for the secondary-side non-contact charging module, the charging direction is the direction on the secondary-side coil 2b side and the opposite direction on the secondary-side magnetic sheet 3b side. In other words, for the secondary-side non-contact charging module, a non-charging direction is the direction on the secondary-side magnetic sheet 3b side and the opposite direction on the secondary-side coil 2b side.

The influence of secondary-side non-contact charging module 42 on NFC antenna 51 is large compared with the influence of NFC antenna 51 on secondary-side non-contact charging module 42. That is, when NFC antenna 51 is disposed in the non-charging direction of secondary-side non-contact charging module 42, magnetic fluxes generated by the near field communication penetrate secondary-side non-contact charging module 42 for a very short time. Meanwhile, when secondary-side non-contact charging module 42 is disposed in the non-communication direction of NFC antenna 51, magnetic fluxes generated by the non-contact charging penetrate NFC antenna 51 for a long time. Even when times required for the near field communication and the non-contact charging do not fit in the times described above, if the time required for the non-contact charging is longer than the time required for the near field communication, the levels of the influences between secondary-side non-contact charging module 42 and NFC antenna 51 are different.

Further, secondary-side non-contact charging module 42 needs a large electric current in order to perform charging. Magnetic fluxes during the non-contact charging generated by feeding the electric current are large compared with magnetic fluxes during the near field communication. That is, the influence of the magnetic fluxes generated by the non-contact charging on NFC antenna 51 is larger than the influence of the magnetic fluxes generated by the near field communication on secondary-side non-contact charging module 42.

To cope with such problems, as shown in FIG. 20, in the present embodiment, NFC antenna 51 is disposed on the secondary-side magnetic sheet 3b side (in the non-charging direction) of secondary-side non-contact charging module 42. That is, NFC antenna 51 is not disposed on the secondary-side coil 2b side (in the charging direction) of secondary-side non-contact charging module 42. Consequently, it is possible to suppress long-time and strong magnetic fluxes from penetrating NFC antenna 51. Therefore, since it is possible to suppress an electric current unrelated to a communication operation from flowing to NFC antenna 51, it is possible to suppress occurrence of malfunction in portable terminal apparatus 100 that controls NFC antenna 51.

As described above, portable terminal apparatus 100 in the present embodiment can suppress an adverse effect on the near field communication by NFC antenna 51 while suppressing deterioration in efficiency of the non-contact charging by secondary-side non-contact charging module 42. That is, by reducing mutual interference of secondary-side non-contact charging module 42 and NFC antenna 51, it is possible to allow secondary-side non-contact charging module 42 and NFC antenna 51 to coexist in one portable terminal apparatus 100.

As in the present embodiment, if the non-contact charging direction and the near field communication direction of housing 105 do not change, the user does not need to change, according to a situation, the surface of portable terminal apparatus 100 that is brought close to NFC antenna 51. For this reason, it is possible to improve the operability of portable terminal apparatus 100. That is, by disposing NFC antenna 51 such that coil 53 is closer to secondary-side magnetic sheet 3b than magnetic sheet 52, it is possible to improve operability of portable terminal apparatus 100.

Further, as in the present embodiment, since both of the charging direction and the near field communication direction are on the rear surface side (the lower housing 105a side) of housing 105, in other words, not on the upper surface side (the upper housing 105b side) of housing 105 including liquid crystal panel 101 (see FIGS. 1A to 1D), it is possible to suppress liquid crystal panel 101 (see FIGS. 1A to 1D) from being scratched by performing the non-contact charging or the near field communication.

As shown in the sectional view of FIG. 20, in the present embodiment, secondary-side non-contact charging module 42 and NFC antenna 51 are configured to be substantially symmetrical to each other. However, the configuration of secondary-side non-contact charging module 42 and NFC antenna 51 is not limited to this. In other words, the center portion of the magnetic sheet and the center portion of the coil (i.e., the center portion of the hollow portion of the coil) do not have to match. That is, the coil may be disposed only at any one end of the magnetic sheet.

However, when secondary-side non-contact charging module 42 or NFC antenna 51 is configured as described above, depending on a way of placing secondary-side non-contact charging module 42 and NFC antenna 51 one on top of the other, secondary-side non-contact charging module 42 and NFC antenna 51 are sometimes disposed such that a portion at an end of secondary-side magnetic sheet 3b where secondary-side coil 2b is not disposed and a portion at an end of magnetic sheet 52 where coil 53 is not disposed overlap each other.

Therefore, secondary-side non-contact charging module 42 and NFC antenna 51 are preferably disposed such that secondary-side coil 2b (including the hollow portion) and coil 53 (including the hollow portion) face each other. By adopting such arrangement, it is possible to place the two coils close to each other irrespective of the configurations and a way of overlapping of secondary-side non-contact charging module 42 and NFC antenna 51. That is, even if magnet 30a and magnetic sheet 52 attract each other, secondary-side magnetic sheet 3b close to coil 53 can easily receive magnetic fluxes from primary-side non-contact charging module 41. Therefore, it is possible to suppress deterioration in efficiency of non-contact charging.

Of course, the relation between secondary-side non-contact charging module 42 and NFC antenna 51 may be opposite. In this case, secondary-side non-contact charging module 42 is disposed on the lower housing 105a side, NFC antenna 51 is disposed on the upper housing 105b side, and both of the charging direction and the communication direction are on the upper housing 105b side.

Portable terminal apparatus, which is an example of a communication apparatus, is a portable apparatus such as a cellular phone, a personal computer, or a digital camera. However, portable terminal apparatus does not need to be limited to these apparatuses.

As in the present embodiment, since the charging type of portable terminal apparatus 100 is the non-contact charging, a connection terminal for charging does not have to be provided in portable terminal apparatus 100. Therefore, since electronic members exposed to the outside of housing 105 are decreased, it is possible to improve a waterproofing property of portable terminal apparatus 100.

Secondary-side magnetic sheet 3b of secondary-side non-contact charging module 42 is thinner than magnetic sheet 52 of NFC antenna 51. As described above, for the power transmission between the non-contact charging modules, charging is performed for about several minutes to several hours. Meanwhile, the near field communication of NFC antenna 51 ends in time equal to or shorter than one second to several seconds. Because of such a difference between the communication times, during the non-contact charging, leak magnetic fluxes of secondary-side non-contact charging module 42 have to be prevented from adversely affecting NFC antenna 51. Therefore, by adopting such a configuration, it is possible to suppress an adverse effect on NFC antenna 51. Secondary-side magnetic sheet 3b is made of a material that shows a good characteristic at a resonance frequency of 100 to 200 kHz at which the power transmission is performed. Magnetic sheet 52 is made of a material that shows a good characteristic at a frequency used for the near field communication of RFID, i.e., a resonance frequency higher than the resonance frequency of the power transmission. In the NFC, a resonance frequency is 13.56 MHz. That is, as secondary-side magnetic sheet 3b and magnetic sheet 52, ferrite sheets of different materials or compositions are respectively used.

The winding width of secondary-side coil 2b is thicker than the winding width of coil 53 of NFC antenna 51.

Secondary-side magnetic sheet 3b of secondary-side non-contact charging module 42 and magnetic sheet 52 of NFC antenna 51 are disposed on the liquid crystal panel 101 side, which is a display unit, and secondary-side coil 2b faces NFC antenna 51. That is, both of the power transmitting direction of secondary-side non-contact charging module 42 and the communication direction of NFC antenna 51 are directions opposite to the direction of liquid crystal panel 101. Consequently, even during charging or during near field communication, it is possible to use liquid crystal panel 101 without problems. Magnetic fluxes for communication do not pass through liquid crystal panel 101.

The hollow portion of secondary-side coil 2b and the hollow portion of coil 53 are stacked, i.e., at least parts of the hollow portions are on one straight line. Since at least the parts of both the hollow portions are stacked, accuracy of aligning is improved. The same applies not only to the case where a magnet is used for aligning but also to other aligning methods. Since substantial positions of secondary-side non-contact charging module 42 and NFC antenna 51 are nearly matched by stacking the hollow portions, accuracy of aligning is improved.

At least parts of the electrical line of secondary-side coil 2b and the electrical line of coil 53 are stacked. Consequently, even if primary-side non-contact charging module 41 is aligned with reference to NFC antenna 51, it is possible to efficiently transmit electric power to secondary-side non-contact charging module 42.

Further, when NFC antenna 51 is configured larger than secondary-side non-contact charging module 42, it is possible to improve the efficiency of communication of each of NFC antenna 51 and secondary-side non-contact charging module 42. That is, since some portion of NFC antenna 51 always extends beyond secondary-side non-contact charging module 42, it is possible to secure a portion where NFC antenna 51 can receive electric power not via secondary-side non-contact charging module 42.

When NFC antenna 51 is configured to be smaller than the hollow portion of secondary-side coil 2b of secondary-side non-contact charging module 42 and fit in the hollow portion, it is possible to further improve the efficiency of communication of each of NFC antenna 51 and secondary-side non-contact charging module 42. That is, since NFC antenna 51 is always not stacked on secondary-side coil 2b of secondary-side non-contact charging module 42, NFC antenna 51 can perform communication not via secondary-side coil 2b.

Embodiment 7

Figure 21:
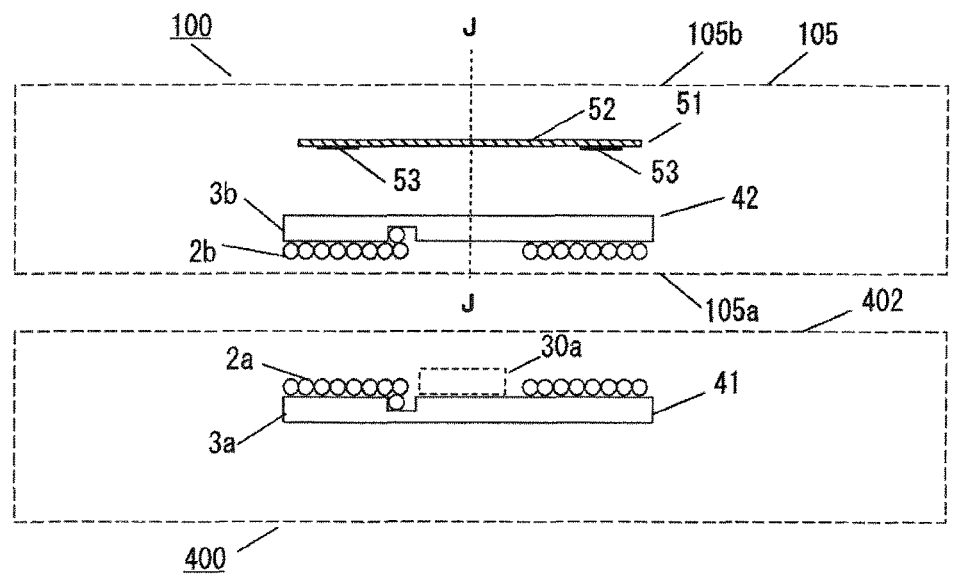
FIG. 21 is a sectional view showing an arrangement example of non-contact charging modules and an NFC antenna in an embodiment of the present invention.

Embodiment 7 will be described below with reference to FIG. 21. FIG. 21 is a sectional view showing an arrangement example of non-contact charging module and an NFC antenna in an embodiment of the present invention. FIG. 21 is also a diagram conceptually showing a cross section of portable terminal apparatus 100 shown in FIG. 1 cut in the thickness direction (the stack direction of lower housing 105a and upper housing 105b). Members including components and functions same as those in Embodiment 1 are denoted by the same reference numerals and signs and detailed description of the members is omitted.

The present embodiment is different from Embodiment 6 in a positional relation between secondary-side non-contact charging module 42 and NFC antenna 51.

Secondary-side non-contact charging module 42 and NFC antenna 51 are disposed to completely overlap. That is, in the case of the present embodiment, since a principal plane of secondary-side non-contact charging module 42 is larger than a principal plane of NFC antenna 51, a projection in the perpendicular direction of the principal plane of secondary-side non-contact charging module 42 includes NFC antenna 51. Conversely, a projection in the perpendicular direction of the principal plane of NFC antenna 51 is included in secondary-side non-contact charging module 42.

Therefore, since an area of the two magnetic bodies (secondary-side magnetic sheet 3b and magnetic sheet 52) viewed from magnet 30a is further reduced, it is possible to further suppress an alignment error to magnet 30a.

In the present embodiment, secondary-side non-contact charging module 42 and NFC antenna 51 are disposed such that a projection in the perpendicular direction of a plane including secondary-side coil 2b includes coil 53. The hollow portion of secondary-side coil 2b and the hollow portion of coil 53 face each other. Further, a straight line J-J is the center axis of secondary-side non-contact charging module 42 and the center axis of NFC antenna 51. That is, NFC antenna 51 is disposed such that the center axis of NFC antenna 51 overlaps the center axis (the straight line J-J) of secondary-side non-contact charging module 42. In the case of the present embodiment, since the hollow portion of coil 53 is larger than the hollow portion of secondary-side coil 2b, secondary-side coil 2b is disposed to be placed on coil 53 such that the hollow portion of secondary-side coil 2b is included in the hollow portion of coil 53.

Therefore, even if magnet 30a is aligned to the center axis of NFC antenna 51, since the hollow portion of primary-side coil 2a faces the hollow portion of secondary-side coil 2b, secondary-side non-contact charging module 42 can be aligned with primary-side non-contact charging module 41.

By disposing secondary-side non-contact charging module 42 and NFC antenna 51 as described above, it is possible to improve accuracy of aligning by magnet 30a. Therefore, it is possible to suppress deterioration in efficiency of non-contact charging.

In the present embodiment, a projection in the perpendicular direction of the hollow portion of secondary-side coil 2b is included in the hollow portion of coil 53. Consequently, magnetic fluxes generated by primary-side non-contact charging module 41 can be allowed to easily pass through the hollow portion of coil 53 rather than the electrical line of coil 53 that causes an eddy current and heat generation. That is, it is possible to suppress deterioration in efficiency of non-contact charging.

Conversely, the projection in the perpendicular direction of the hollow portion of coil 53 may be disposed to be included in the hollow portion of secondary-side coil 2b. In the arrangement described above, even if magnet 30a is aligned with magnetic sheet 52, the hollow portion of secondary-side coil 2b is present on a straight line direction that connects magnet 30a and the hollow portion of coil 53. Therefore, the hollow portion of secondary-side coil 2b faces magnet 30a (i.e., at least a part of the hollow portion of primary-side coil 2a). Consequently, it is possible to further suppress the deterioration in efficiency of non-contact charging.

The shapes of the hollow portions of primary-side coil 2a, secondary-side coil 2b, and coil 53 are not specifically limited and may be any shape such as an annular shape (a circular shape), an elliptical shape, a rectangular shape, or a polygonal shape.

In Embodiments 1 to 7, as a method of aligning primary-side non-contact charging module 41 and secondary-side non-contact charging module 42, a method of aligning the modules using the magnet is described. However, even if other methods are used, it is preferable to dispose secondary-side non-contact charging module 42 and NFC antenna 51 to be placed one on top of the other.

For example, the same applies in the case of a method in which non-contact charger 400 (or primary-side non-contact charging module 41) detects the position of secondary-side coil 2b of secondary-side non-contact charging module 42 to automatically move primary-side coil 2a to the position of secondary-side coil 2b.

Even if non-contact charger 400 aligns primary-side coil 2a with the position of coil 53 (a coil not to be aligned), secondary-side non-contact charging module 42 is disposed to face NFC antenna 51 including coil 53. Therefore, even if primary-side coil 2a and coil 53 are aligned, it is possible to suppress an alignment error of primary-side coil 2a and secondary-side coil 2b.

The same applies in the case of a method in which, since non-contact charger 400 includes a large number of coils, portable terminal apparatus 100 can be charged anywhere on charging surface 402 of non-contact charger 400. In this method, non-contact charger 400 causes all the large number of coils to generate magnetic fluxes in some case and does not cause all the coils to generate magnetic fluxes in other cases. When non-contact charger 400 does not cause all the large number of coils to generate magnetic fluxes, non-contact charger 400 detects secondary-side coil 2b of secondary-side non-contact charging module 42 to select (one or a plurality of) coils matching the position of secondary-side coil 2b out of the large number of coils. Non-contact charger 400 feeds an electric current to the selected coil (hereinafter referred to as primary-side coil 2a) to transmit electric power to the secondary side.

Even if non-contact charger 400 selects a coil (primary-side coil 2a) matching the position of coil 53 (a coil not to be aligned), secondary-side non-contact charging module 42 is disposed to face NFC antenna 51 including coil 53. Therefore, even if primary-side coil 2a and coil 53 are aligned, it is possible to suppress an alignment error of primary-side coil 2a and secondary-side coil 2b.

As described above, in various aligning methods, it is possible to suppress an alignment error of primary-side coil 2a and secondary-side coil 2b. That is, it is possible to send a large number of magnetic fluxes to secondary-side coil 2b. Therefore, it is possible to suppress deterioration in efficiency of non-contact charging.

Embodiments 1 to 7 can be combined as appropriate.

Embodiment 8

Figure 22:
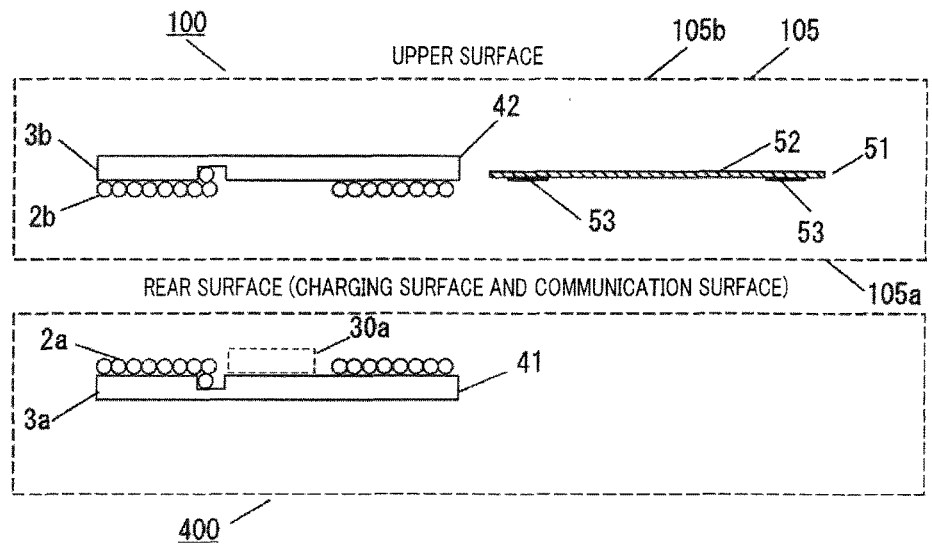
FIG. 22 is a sectional view showing an arrangement example of the non-contact charging modules and the NFC antenna in the embodiment of the present invention.

Embodiment 8 will be described in detail below with reference to FIG. 22. FIG. 22 is a sectional view showing an arrangement example of non-contact charging modules and an NFC antenna in an embodiment of the present invention. FIG. 22 is also a diagram conceptually showing a cross section of portable terminal apparatus 100 shown in FIG. 1 cut in the thickness direction (the stack direction of lower housing 105a and upper housing 105b). To simplify the description, FIG. 22 does not show liquid crystal panel 101, operation button 102, substrate 103, and battery pack 104 and shows an arrangement relation between secondary-side non-contact charging module 42 and NFC antenna 51. Secondary-side non-contact charging module 42 and NFC antenna 51 are simply shown as only coils and magnetic sheets. In the above description, members including the components and functions are denoted by the same reference numerals and signs and detailed description of the members is omitted.

First, an overview of portable terminal apparatus 100 and non-contact charger 400 will be described.

Battery pack 104 (see FIGS. 1A to 1D) in portable terminal apparatus 100 is charged via primary-side non-contact charging module 41 and secondary-side non-contact charging module 42. Specifically, an electric current flows to secondary-side coil 2b with a magnetic field generated by feeding an electric current to primary-side coil 2a in non-contact charger 400. Battery pack 104 (see FIGS. 1A to 1D) electrically connected to secondary-side non-contact charging module 42 is charged. Consequently, non-contact charger 400 can charge portable terminal apparatus 100 without being electrically connected to portable terminal apparatus 100 (in a non-contact manner).

Portable terminal apparatus 100 includes NFC antenna 51 described above. Like primary-side non-contact charging module 41 and secondary-side non-contact charging module 42, NFC antenna 51 supplies electric power and performs data transmission using electromagnetic induction (magnetic fluxes).

Next, the arrangement of secondary-side non-contact charging module 42 and NFC antenna 51 in portable terminal apparatus 100 will be described.

In the present embodiment, secondary-side non-contact charging module 42 is not disposed in a communication direction of NFC antenna 51. NFC antenna 51 is not disposed in a charging direction of secondary-side non-contact charging module 42. That is, NFC antenna 51 and secondary-side non-contact charging module 42 are not stacked. Both of coil 53 of NFC antenna 51 and secondary-side coil 2b of secondary-side non-contact charging module 42 face a surface (the rear surface) of lower housing 105b, although being sometimes disposed across some other components.

For NFC antenna 51, the communication direction is a direction in which a communication destination, with which NFC antenna 51 performs near field communication, is present. Since at least coil 53 and magnetic sheet 52 are stacked in NFC antenna 51, the communication direction for the NFC antenna is the direction on the coil 53 side viewed from magnetic sheet 52 and in the direction on the opposite side of magnetic sheet 52. In other words, a non-communication direction (the opposite direction of the communication direction) of NFC antenna 51 is the direction on the magnetic sheet 52 side viewed from coil 53 and the direction on the opposite side of coil 53.

The surface of upper housing 105b on which liquid crystal panel 101 (or operation button 102) is provided is set as the upper surface of portable terminal apparatus 100 and the surface (of lower housing 105b) facing the upper surface is set as the rear surface of portable terminal apparatus 100. Then, a communication surface of portable terminal apparatus 100 in the present embodiment is the rear surface. The communication surface is a surface brought close (or directed) to the communication destination when portable terminal apparatus 100 causes NFC antenna 51 to perform near field communication. That is, in the case of the present embodiment, the near field communication is performed by bringing the rear surface of portable terminal apparatus 100 close to the communication destination. The communication surface is also a surface located in the communication direction of NFC antenna 51 in housing 105. That is, coil 53 is located between magnetic sheet 52 and the communication surface. The upper surface and the rear surface are not limited to planes and may be rounded shapes.

For secondary-side non-contact charging module 42, the charging direction is a direction in which primary-side non-contact charging module 41, to which electric power is transmitted, is present. That is, for the secondary-side non-contact charging module, the charging direction is the direction on the secondary-side coil 2b side and the opposite direction on the secondary-side magnetic sheet 3b side. In other words, for the secondary-side non-contact charging module, a non-charging direction (the opposite direction of the charging direction) is the direction on the secondary-side magnetic sheet 3b side and the opposite direction on the secondary-side coil 2b side.

Therefore, in the case of the present embodiment, non-contact charging is performed by bringing the rear surface of portable terminal apparatus 100 close to (or directing the rear surface to) non-contact charger 400. That is, a charging surface of portable terminal apparatus 100 in the present embodiment is the rear surface. The charging surface is a surface located in the charging direction of secondary-side non-contact charging module 42 in housing 105. That is, secondary-side coil 2b is located between secondary-side magnetic sheet 3b and the charging surface.

Next, an effect attained by disposing secondary-side non-contact charging module 42 and NFC antenna 51 as described above will be described.

As described above, secondary-side non-contact charging module 42 is not disposed in the communication direction of NFC antenna 51. That is, on the coil 53 side of NFC antenna 51, secondary-side non-contact charging module 42 and NFC antenna 51 do not face each other (unopposed to each other). Therefore, secondary-side non-contact charging module 42 does not face coil 53. In other words, secondary-side non-contact charging module 42 is not disposed between NFC antenna 51 and the communication surface (or the communication destination). That is, secondary-side non-contact charging module 42 is disposed not to overlap a projection in the communication direction of NFC antenna 51.

Therefore, portable terminal apparatus 100 is configured such that magnetic fluxes generated in the near field communication less easily passes through secondary-side non-contact charging module 42. Consequently, the magnetic fluxes during the near field communication less easily penetrate secondary-side coil 2b. It is possible to decrease magnetic fluxes that become an eddy current or generate heat in secondary-side coil 2b and are lost. That is, NFC antenna 51 can easily receive the magnetic fluxes. It is possible to decrease factors for hindering the near field communication.

As described above, NFC antenna 51 is not disposed in the charging direction of secondary-side non-contact charging module 42. That is, on the secondary-side coil 2b side of secondary-side non-contact charging module 42, secondary-side non-contact charging module 42 and NFC antenna 51 do not face each other (unopposed to each other). Therefore, NFC antenna 51 does not face secondary-side coil 2b. In other words, NFC antenna 51 is not disposed between secondary-side non-contact charging module 42 and the charging surface (or primary-side non-contact charging module 41). That is, NFC antenna 51 is disposed not to overlap a projection in the charging direction of secondary-side non-contact charging module 42.

Therefore, portable terminal apparatus 100 is configured such that magnetic fluxes generated at the time of the non-contact charging less easily pass through NFC antenna 51. Consequently, the magnetic fluxes during the near field communication less easily penetrate coil 53. It is possible to suppress the magnetic fluxes from becoming an eddy current or generating heat in coil 53 to be lost. That is, secondary-side non-contact charging module 42 can easily receive the magnetic fluxes. It is possible to suppress deterioration in efficiency of non-contact charging.

In summary, since according to the configuration shown in FIG. 22, secondary-side non-contact charging module 42 and NFC antenna 51 are disposed not to interfere with (that is, hinder) the operations each other. Therefore, it is possible to allow secondary-side non-contact charging module 42 and NFC antenna 51 to coexist in one portable terminal apparatus 100.

In the near field communication, what receives magnetic fluxes is coil 53 and a main factor of a loss of the magnetic fluxes is secondary-side coil 2b. For this reason, secondary-side non-contact charging module 42 only has to be disposed such that at least secondary-side coil 2b does not overlap (cross) a projection in the communication direction of coil 53. NFC antenna 51 and secondary-side non-contact charging module 42 are preferably disposed not to overlap because it is possible to dispose NFC antenna 51 and secondary-side non-contact charging module 42 apart from each other and suppress operations of NFC antenna 51 and secondary-side non-contact charging module 42 from interfering with each other.

What receives magnetic fluxes is secondary-side coil 2*b* and a main factor of a loss of the magnetic fluxes is coil 53. For this reason, NFC antenna 51 only has to be disposed such that at least coil 53 does not overlap a projection in the charging direction of secondary-side coil 2*b*. NFC antenna 51 and secondary-side non-contact charging module 42 are preferably disposed not to overlap (cross) because it is possible to dispose NFC antenna 51 and secondary-side non-contact charging module 42 apart from each other and suppress operations of NFC antenna 51 and secondary-side non-contact charging module 42 from interfering with each other.

Further, in the present embodiment, since secondary-side non-contact charging module 42 and NFC antenna 51 are disposed not to overlap (to face each other), for NFC antenna 51, it is possible to further decrease factors for hindering the near field communication. A reason for this will be described below.

Since portable terminal apparatus 100 in the present embodiment includes secondary-side non-contact charging module 42 and NFC antenna 51, there are a plurality of modules including coils that form LC resonance circuits using magnetic sheets (magnetic bodies) and resonance capacitors.

As described above, primary-side non-contact charging module 41 includes magnet 30*a* in some case and does not include magnet 30*a* in other cases. As shown in FIG. 22, when primary-side non-contact charging module 41 includes magnet 30*a*, magnet 30*a* facilitates magnetization and saturation of a magnetic sheet close thereto and decreases the permeability of the magnetic sheet. Consequently, leak magnetic fluxes increase and an L value of the magnetic sheet decreases. Therefore, magnet 30*a* is likely to change the resonance frequency of an LC resonance circuit (that is, a coil) and adversely affects the near field communication or the non-contact charging.

Therefore, it is desirable to dispose NFC antenna 51 apart from secondary-side non-contact charging module 42. Consequently, even if primary-side non-contact charging module 41 is aligned with secondary-side non-contact charging module 42 using magnet 30*a*, it is possible to reduce the influence of magnet 30*a* on NFC antenna 51.

However, in general, since a portable electronic apparatus such as portable terminal apparatus 100 tends to be reduced in size and thickness, the thickness (the height) of housing 105 is small. That is, even if NFC antenna 51 is disposed to be stacked in the non-charging direction of the secondary-side non-contact charging module 42, NFC antenna 51 and secondary-side non-contact charging module 42 are placed close to each other. For this reason, it is difficult to dispose NFC antenna 51 apart from magnet 30*a* in the thickness direction.

Therefore, in the present embodiment, since NFC antenna 51 is disposed not to overlap secondary-side non-contact charging module 42, NFC antenna 51 is disposed apart from magnet 30*a* for aligning with secondary-side non-contact charging module 42. Consequently, it is possible to suppress magnet 30*a* from adversely affecting NFC antenna 51.

As in the present embodiment, if the charging direction (the charging surface) and the communication direction (the communication surface) of housing 105 do not change, the user does not need to change, according to a situation, the surface of portable terminal apparatus 100 that is brought close to NFC antenna 51. For this reason, it is possible to improve the operability of portable terminal apparatus 100. That is, when the surface (in the present embodiment, the rear surface) of housing 105 located on the coil 53 side of the NFC antenna and the surface (in the present embodiment, the rear surface) of housing 105 located on secondary-side coil 2*b* side of secondary-side non-contact charging module 42 are the same, it is possible to improve the operability of portable terminal apparatus 100.

Further, as in the present embodiment, since both of the charging surface and the communication surface of portable terminal apparatus 100 are on the rear surface side (the lower housing 105*a* side) of housing 105, in other words, not on the upper surface side (the upper housing 105*b* side) of housing 105 including liquid crystal panel 101 (see FIGS. 1A to 1D), it is possible to suppress liquid crystal panel 101 (see FIGS. 1A to 1D) from being scratched by performing the non-contact charging or the near field communication.

The portable terminal apparatus, which is an example of a communication apparatus, is a portable apparatus such as a cellular phone, a personal computer, or a digital camera. However, portable terminal apparatus does not need to be limited to these apparatuses. The upper surface may be the charging surface and the communication surface.

As in the present embodiment, since the charging type of portable terminal apparatus 100 is the non-contact charging, a connection terminal for charging does not have to be provided in portable terminal apparatus 100. Therefore, since electronic members exposed to the outside of housing 105 are decreased, it is possible to improve a waterproofing property of portable terminal apparatus 100.

With the present invention, even when magnet 30*a* is not used for aligning, a significant effect can be obtained. That is, when secondary-side non-contact charging module 42 and NFC antenna 51 are stacked, adverse effects described below occur.

For example, when secondary-side non-contact charging module 42 is disposed on the communication direction side of NFC antenna 51, since magnetic fluxes generated when NFC antenna 51 performs communication penetrate secondary-side non-contact charging module 42, the magnetic fluxes change to an eddy current or generate heat. The eddy current flows to secondary-side coil 2*b* of secondary-side non-contact charging module 42 in a direction for weakening the magnetic fluxes generated by NFC antenna 51. This is because secondary-side coil 2*b* of secondary-side non-contact charging module 42 is extremely large compared with coil 53 of NFC antenna 51 in terms of an area and in terms of volume. Since secondary-side coil 2*b* is a coil used for charging, the difference between the sizes of the coils feeds a lot of electric current for a long time and treats large electric power. Meanwhile, since coil 53 is a coil for small current communication for a short time, coil 53 may be a thin electrical line such as a wiring pattern. Therefore, there is this difference between the sizes of the coils. For this reason, the magnetic fluxes used for communication by NFC antenna 51 are lost by secondary-side non-contact charging module 42 and the near field communication of NFC antenna 51 is hindered.

If NFC antenna 51 is disposed in the charging direction (i.e., secondary-side coil 2*b* side) of secondary-side non-contact charging module 42, since the magnetic fluxes generated during the non-contact charging of secondary-side non-contact charging module 42 penetrate NFC antenna 51, the magnetic fluxes change to an eddy current and generate heat in NFC antenna 51. That is, NFC antenna 51 receives the magnetic fluxes for performing power transmission between the non-contact charging modules. For this reason, the magnetic fluxes for secondary-side non-contact charging module 42 to perform the non-contact charging are lost by NFC antenna 51 and the efficiency of the non-contact charging is deteriorated.

Further, time during which the near field communication by NFC antenna 51 is performed is distinctly short compared with time during which the non-contact charging is performed. In general, time required for the near field communication is several seconds or less than several minutes. However, time required for the non-contact charging is several hours.

Therefore, the influence of secondary-side non-contact charging module 42 on NFC antenna 51 is large compared with the influence of NFC antenna 51 on secondary-side non-contact charging module 42. That is, when NFC antenna 51 is disposed in the non-charging direction of secondary-side non-contact charging module 42, magnetic fluxes generated by the near field communication penetrate secondary-side non-contact charging module 42 for a very short time. Meanwhile, when secondary-side non-contact charging module 42 is disposed in the non-communication direction of NFC antenna 51, magnetic fluxes generated by the non-contact charging penetrate NFC antenna 51 for a long time. Even when times required for the near field communication and the non-contact charging do not fit in the times described above, if the time required for the non-contact charging is longer than the time required for the near field communication, the levels of the influences between secondary-side non-contact charging module 42 and NFC antenna 51 are different.

As described above, when secondary-side non-contact charging module 42 and NFC antenna 51 are stacked, magnetic fluxes for communication (power transmission) of one of secondary-side non-contact charging module 42 and NFC antenna 51 are received by the other. Further, deterioration in communication (power transmission) efficiency due to an eddy current also occurs.

However, by disposing secondary-side non-contact charging module 42 and NFC antenna 51 not to be stacked as in the present invention, it is possible to solve the problems described above and allow secondary-side non-contact charging module 42 and NFC antenna 51 to coexist in small housing 105. Certainly, housing efficiency is higher when secondary-side non-contact charging module 42 and NFC antenna 51 having planar shapes (having large plane portions and small thicknesses) are stacked in small housing 105. However, since both of secondary-side non-contact charging module 42 and NFC antenna 51 use magnetic fluxes in communicating (transmitting power), secondary-side non-contact charging module 42 and NFC antenna 51 are preferably not stacked.

Embodiment 9

Figure 23:
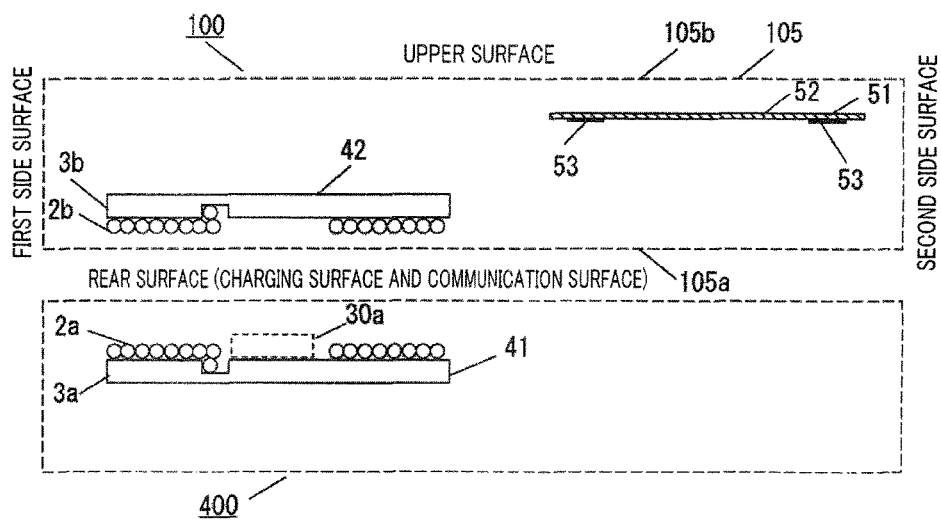
FIG. 23 is a sectional view showing an arrangement example of non-contact charging modules and an NFC antenna in an embodiment of the present invention.
Figure 24:
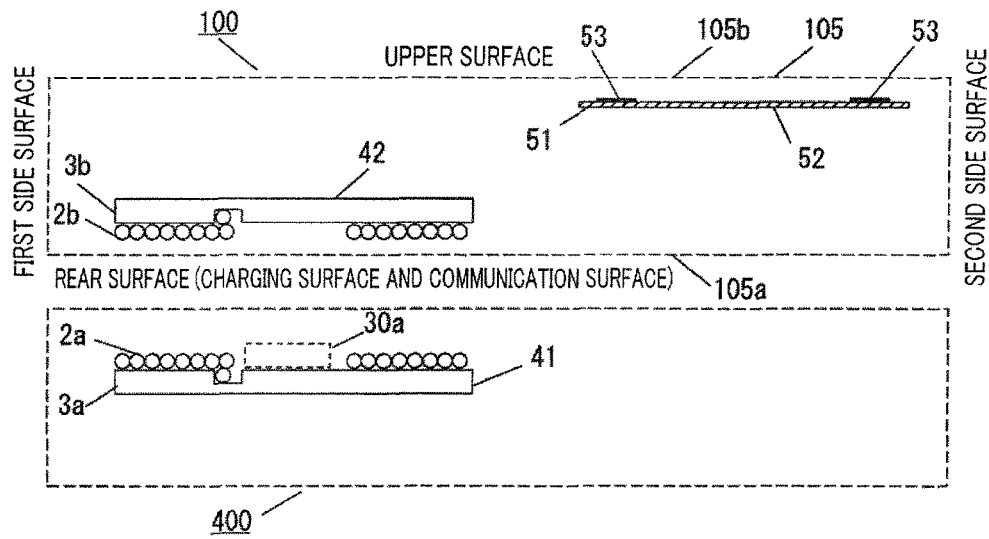
FIG. 24 is a sectional view showing an arrangement example of the non-contact charging modules and the NFC antenna in the embodiment of the present invention.

Embodiment 9 will be described below with reference to FIG. 23. FIG. 23 is a sectional view showing an arrangement example of non-contact charging modules and an NFC antenna in an embodiment of the present invention. FIG. 24 is a sectional view showing an arrangement example of the non-contact charging modules and the NFC antenna in the embodiment of the present invention. FIG. 23 is also a diagram conceptually showing a cross section of portable terminal apparatus 100 shown in FIG. 1 cut in the thickness direction (the stack direction of lower housing 105a and upper housing 105b). Members including components and functions same as those in Embodiments 1 to 8 are denoted by the same reference numerals and signs and detailed description of the members is omitted.

Differences from Embodiment 1 of the present embodiment will be described below.

NFC antenna 51 is disposed further on the upper surface side (i.e., the opposite direction of the charging direction) than a plane including secondary-side non-contact charging module 42. In other words, the plane including secondary-side non-contact charging module 42 is located between NFC antenna 51 and the charging surface (the rear surface). Further, NFC antenna 51 is placed closer to the upper surface than the rear surface. That is, NFC antenna 51 is placed closer to the surface (in the present embodiment, the upper surface) facing the charging surface than the charging surface (in the present embodiment, the rear surface). Consequently, it is possible to dispose NFC antenna 51 apart from magnet 30a in the thickness direction as well.

A side surface to which NFC antennal 51 is placed close and a side surface to which secondary-side non-contact charging module 42 is placed close are different. That is, as shown in FIG. 23, NFC antenna 51 is disposed close to a side surface (a second side surface) facing a side surface (a first side surface) to which secondary-side non-contact charging module 42 is placed close. In other words, NFC antenna 51 is disposed closer to the second side surface than the first side surface. Secondary-side non-contact charging module 42 is disposed closer to the first side surface than the second side surface. Consequently, it is possible to dispose NFC antenna 51 farther apart from magnet 30a in the perpendicular direction of the thickness direction (in the plane direction). The first side surface and the second side surface are not limited to planes and may be rounded shapes.

Secondary-side non-contact charging module 42 is disposed closer to the rear surface than the upper surface. That is, since secondary-side non-contact charging module 42 is placed close to primary-side non-contact charging module 41 during non-contact charging, it is possible to receive a large number of magnetic fluxes and suppress deterioration in efficiency of non-contact charging.

In the case of the present embodiment, the two plane coils (secondary-side coil 2b and coil 53) are disposed to be substantially parallel to each other. Therefore, since the directions of magnetic fields of the two plane coils are the same, one coil can easily combine magnetic fluxes of the other coil. For this reason, even if the two plane coils are disposed not to overlap, the two plane coils are preferably disposed apart from each other.

Therefore, since portable terminal apparatus 100 in the present embodiment is configured as shown in FIG. 23, secondary-side non-contact charging module 42 and NFC antenna 51 are disposed apart from each other. Consequently, it is possible to suppress secondary-side non-contact charging module 42 and NFC antenna 51 from interfering with each other.

In FIG. 24, NFC antenna 51 in FIG. 23 faces the opposite direction. In this way, secondary-side non-contact charging module 42 and NFC antenna 51 do not have to be stacked. Secondary-side coil 2b and coil 53 may face each other on different surfaces. In this case, secondary-side coil 2b of secondary-side non-contact charging module 42 faces the rear surface and coil 53 of NFC antenna 51 faces the upper surface (the communication surface). The upper surface and the lower surface face each other. A display section may be provided on the upper surface. In this way, it is possible to vary the directions in which magnetic fluxes of secondary-side non-contact charging module 42 and NFC antenna 51 are generated. For this reason, it is possible to further suppress adverse effects of secondary-side non-contact charging module 42 and NFC antenna 51. That is, during communication of one of secondary-side non-contact charging module 42 and NFC antenna 51, the other can less easily capture magnetic fluxes for the communication.

By directing the communication direction and the charging direction to the same surface as shown in FIGS. 22 and 23, it is possible to direct the charging direction of secondary-side non-contact charging module 42 and the communication direction of NFC antenna 51 to the same surface and improve convenience of communication apparatus 100. Further, by providing the display section avoiding the charging direction or the communication direction, it is possible to easily operate the communication apparatus even during charging or during communication.

Embodiment 10

Embodiment 10 will be described below with reference to FIGS. 25 to 27. Members including components and functions same as those in Embodiments 1 to 9 are denoted by the same reference numerals and signs and detailed description of the members is omitted.

When secondary-side non-contact charging module 42 and NFC antenna 51 are disposed not to overlap (not to be stacked), an end of secondary-side coil 2b close to coil 53 tends to combine magnetic fluxes around the NFC antenna. An end of coil 53 close to secondary-side coil 2b tends to combine magnetic fluxes around secondary-side non-contact charging module 42. For this reason, the end of one coil is preferably disposed or formed to reduce a portion close to the end of the other coil. Therefore, in the present embodiment, preferred shapes and arrangement of secondary-side coil 2b and coil 53 will be described.

First, a first example will be described with reference to FIG. 25. FIG. 25 is a diagram showing a first example of a coil shape in an embodiment of the present invention. FIG. 25 is also a top view of portable terminal apparatus 100.

Figure 25:
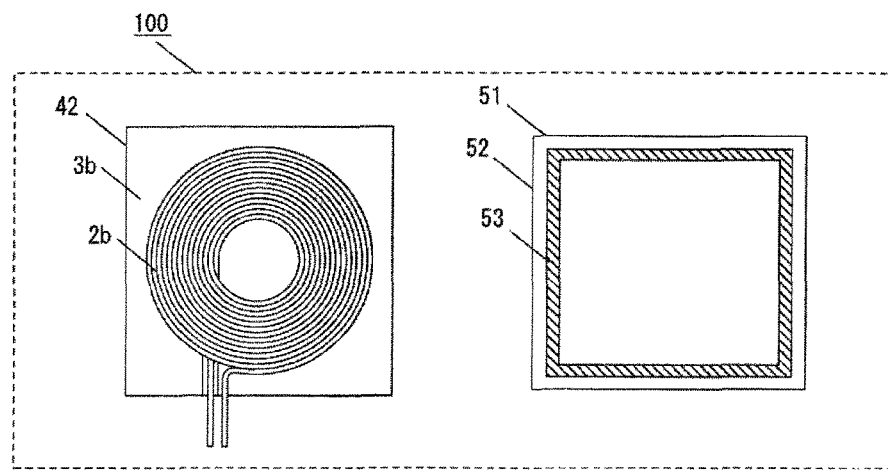
FIG. 25 is a diagram showing a first example of a coil shape in an embodiment of the present invention.

As shown in FIG. 25, since secondary-side coil 2b has a circular shape, a portion close to coil 53 is reduced. Consequently, it is possible to suppress combination of magnetic fluxes.

Coil 53 may have a circular shape. The coils of non-contact charging module 42 and NFC antenna 51 preferably have circular shapes. However, by forming at least the coil of one of the modules in a circular shape, it is possible to reduce the portion close to the other coil. Even if one coil does not have a circular shape, the other coil side of the one coil merely has to be formed in a curved shape.

Next, FIG. 26 will be described. FIG. 26 is a diagram showing a second example of the coil shape in the embodiment of the present invention. FIG. 26 is also a top view of portable terminal apparatus 100.

Figure 26:
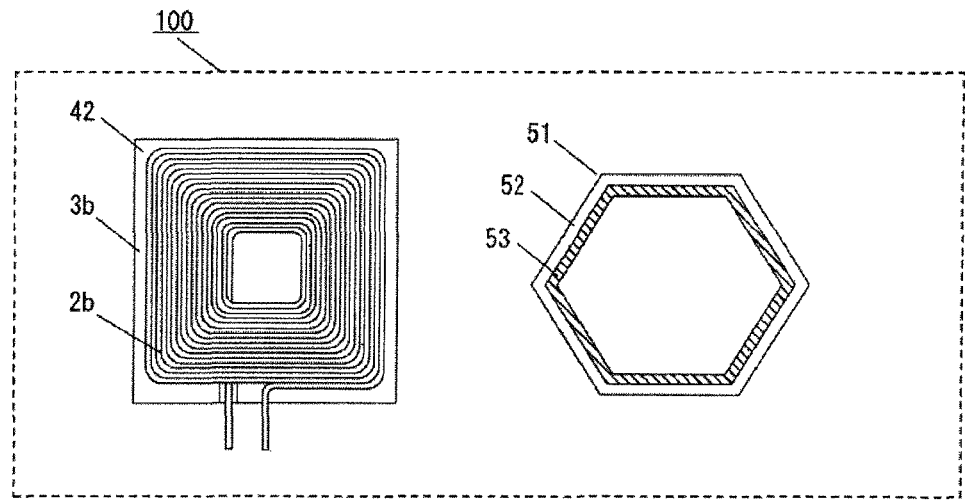
FIG. 26 is a diagram showing a second example of the coil shape in the embodiment of the present invention.

As shown in FIG. 26, secondary-side coil 2b and coil 53 have polygonal shapes. Coil 53 is disposed such that a corner is close to secondary-side coil 2b. That is, sides close (adjacent) to each other of secondary-side coil 2b and coil 53 formed in the polygonal shapes are not parallel. Consequently, since a portion of coil 53 close to secondary-side coil 2b is reduced, it is possible to suppress combination of magnetic fluxes.

A corner of secondary-side coil 2b may be disposed close to coil 53. The coils of non-contact charging module 42 and NFC antenna 51 are preferably disposed such that the corners are close to each other. However, at least the corner of the coil of one module merely has to be disposed close to the coil of the other module.

Next, FIG. 27 will be described. FIG. 27 is a diagram showing a third example of the coil shape in the embodiment of the present invention. FIG. 27 is also a top view of portable terminal apparatus 100.

Figure 27:
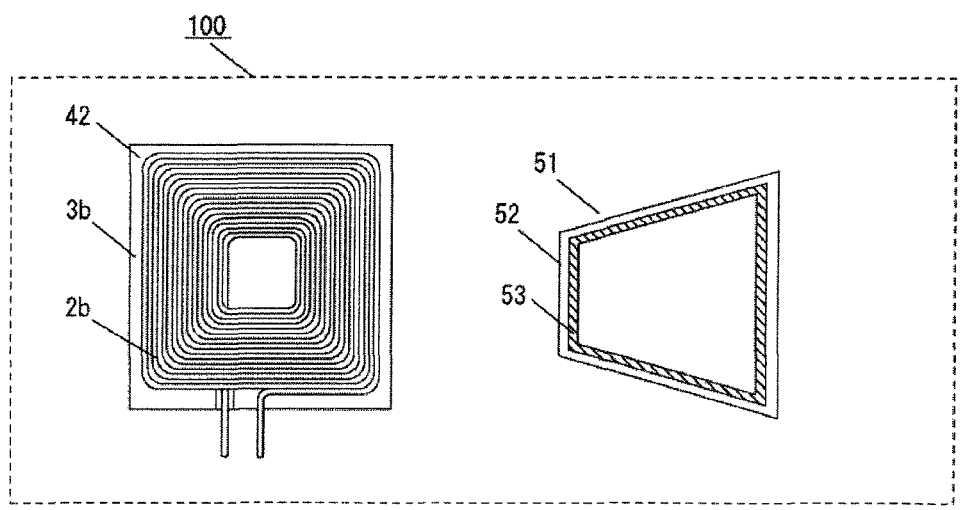
FIG. 27 is a diagram showing a third example of the coil shape in the embodiment of the present invention.

As shown in FIG. 27, secondary-side coil 2b and coil 53 have polygonal shapes. Coil 53 is not formed such that all the sides have the same length and is disposed such that a shortest side is close to secondary-side coil 2b. Consequently, since a portion of coil 53 close to secondary-side coil 2b is reduced, it is possible to suppress combination of magnetic fluxes.

Secondary-side coil 2b may be formed by sides having different lengths and disposed such that a shortest side is close to coil 53. Naturally, the coils are preferably disposed such that the shortest sides are close to each other. However, the coils merely have to be disposed such that at least the shortest side of the coil of at least one module is placed close to the coil of the other module.

The side of one coil placed close to the other coil is preferably the shortest side. However, the side of the one coil placed close to the other merely has to be not a longest side. For example, when the one coil has a first side and a second side shorter than the first side, the one coil only has to be disposed such that the second side is placed closer to the other coil than the first side.

As described above, by reducing the portion of the end of the one coil close to the end of the other coil, it is possible to suppress combination of magnetic fluxes. Therefore, it is possible to suppress secondary-side non-contact charging module 42 and NFC antenna 51 from interfering with each other.

The shapes of the hollow portions of primary-side coil 2a, secondary-side coil 2b, and coil 53 are not specifically limited and may be any shape such as an annular shape (a circular shape), an elliptical shape, a rectangular shape, or a polygonal shape.

The coil shapes of the first to third examples can be combined as appropriate. Embodiments 1 to 10 can be combined as appropriate.

Embodiment 11

Figure 28:
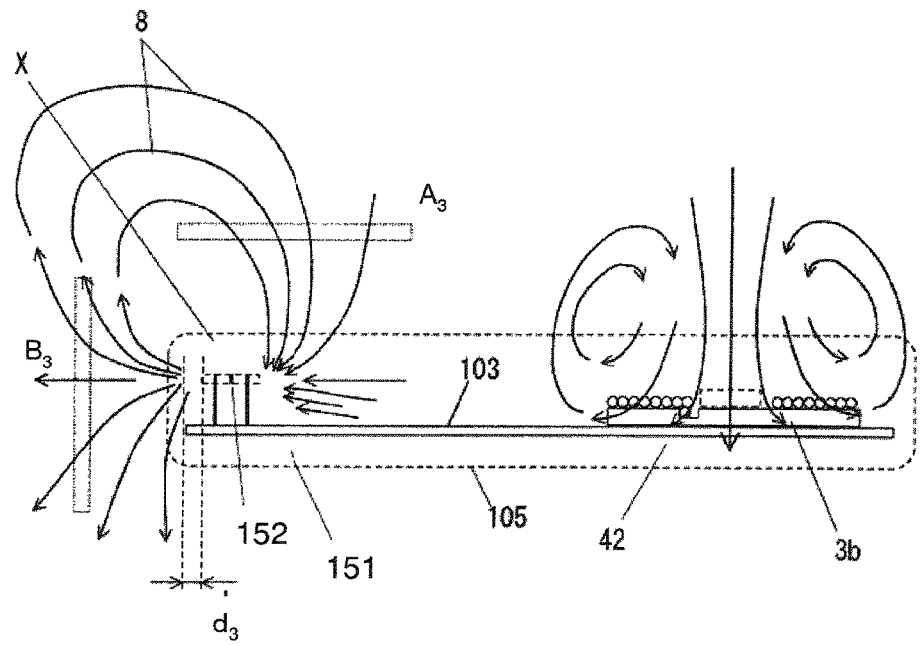
FIG. 28 is a conceptual diagram showing lines of magnetic force generated from the NFC antenna and the secondary-side non-contact charging module shown in FIG. 15.
Figure 29:
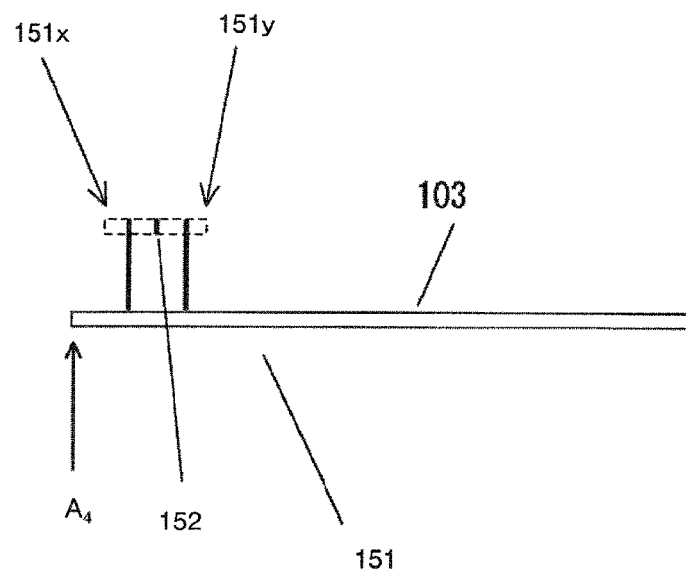
FIG. 29 is a diagram showing a positional relation between an NFC antenna and a metal plate in an embodiment of the present invention.

Embodiment 11 will be described below concerning a magnetic field generated by an NFC antenna (a stick type) with reference to FIG. 28. FIG. 28 is a conceptual diagram showing lines of magnetic force generated from the NFC antenna and the secondary-side non-contact charging module shown in FIG. 15. FIG. 29 is a diagram showing a positional relation between an NFC antenna and a metal plate in an embodiment of the present invention. FIG. 28 is also a diagram conceptually showing a cross section of portable terminal apparatus 100 shown in FIGS. 1A to 1D cut in the thickness direction (the stack direction of lower housing 105a and upper housing 105b). Members including components and functions same as those in Embodiments 1 to 10 are denoted by the same reference numerals and signs and detailed description of the members is omitted.

As shown in FIG. 28, NFC antenna 151 in the present embodiment includes coil section 152 and a metal body (e.g., in the present embodiment, substrate 103 is the metal body) disposed close to coil section 152. An opening portion of coil section 152 is perpendicular to substrate 103. Coil section 152 is disposed at an end of substrate 103.

NFC antenna 151 projects further than outermost end $A_4$ of substrate 103 in some case and NFC antenna 151 is located further on the inner side than outermost end $A_4$ of substrate 103 in other cases. Preferably, as described below, distance $d_3$ between outer side end 151x of NFC antenna 151 and outermost end $A_4$ of substrate 103 is about −8 mm to +8 mm. In the present embodiment, $d_3$ is about −2 mm. A minus value of $d_3$ indicates that outer side end 151x of NFC antenna 151 is located further on the inner side than outermost end $A_4$ of substrate 103 and, in this case, further on the inner side by 2 cm. Conversely, a plus value of $d_3$ indicates that outer side end 151x of NFC antenna 151 projects further to the outer side than outermost end $A_4$ of substrate 103. Therefore, when distance $d_3$ is in a range of about −8 mm to +8 mm, since the width of NFC antenna 151 (width between outer side end 151x and inner side end 151y) is 8 mm as described above, the range includes a range from a place where inner side end 151y of NFC antenna 151 is disposed in the position of outermost end $A_4$ of substrate 103 to a place where outer side end 151x of NFC antenna 151 is disposed on the inner side by 8 mm (substantially the same as the width of NFC antenna 151 (the width between outer side end 151x and inner side end 151y)) from outermost end $A_4$ of substrate 103.

As shown in FIG. 28, when NEC antenna 151 is used, since the communication directions of secondary-side non-contact charging module 42 and NFC antenna 151 can be varied, the problems described above less easily occurs. As a result, secondary-side non-contact charging module 42 and NFC antenna 151 can perform satisfactory communication (that is, power transmission) with each other.

First, it will be described how NFC antenna 151 of the present invention performs near field communication.

An electric current flows to NFC antenna 151 according to signals input to antenna input and output terminals 154 and 155. Since an opening portion of NFC antenna 151 is perpendicular to substrate 103, in a region $B_3$, lines of magnetic force generated from NFC antenna 151 are generated in one direction away from NFC antenna 151. That is, the axis of the opening portion extends toward the region $B_3$. As a result, the lines of magnetic force in one direction act on, for example, a non-contact IC card located in the region $B_3$. An electric current is generated in the non-contact IC card. A portable terminal or the like mounted with an antenna apparatus in the present embodiment and the non-contact IC card can perform communication.

In a region A3, lines of magnetic force extend in one direction of a direction away from NFC antenna 151 and a direction toward NFC antenna 151. Since magnetic field 8 generated from NFC antenna 151 attenuates near substrate 103, axis X of magnetic field 8 is not perpendicular to substrate 103 and tilted to the outer side of substrate 103. Axis X of magnetic field 8 is a straight line connecting boundaries of the lines of magnetic force in the direction away from NFC antenna 151 and the lines of magnetic force in the direction toward NFC antenna 151. Therefore, when, for example, the non-contact IC card is located near axis X of magnetic field 8, both the lines of magnetic force in the direction away from the antenna and the direction toward the antenna act on, for example, the non-contact IC card. As a result, since the lines of magnetic force cancel each other, the non-contact IC card cannot communicate with the portable terminal or the like mounted with the antenna apparatus in the present embodiment. However, when the lines of magnetic force are generated as shown in FIG. 28, axis X of magnetic fluxes tilts. For this reason, near field communication can be performed in the same direction (region $A_3$) as NFC sheet antenna 151. Moreover, the axis of the opening portion of NFC antenna 151 can be set in a direction different from the direction of the axis of the opening portion of secondary-side non-contact charging module 42. Further, likewise, in the direction of the region $B_3$, NFC antenna 151 can perform communication.

Next, it will be described why axis X of magnetic field 8 tilts with respect to substrate 103. That is, an eddy current induced on the substrate 103 surface generates a magnetic field in the direction perpendicular to the substrate 103 surface. Therefore, a magnetic field generated from NFC antenna 151 and the magnetic field generated from the eddy current induced on the substrate 103 surface are combined. As a result, magnetic field 8 generated from NFC antenna 151 changes to the perpendicular direction near substrate 103. Axis X of magnetic field 8 tilts to a side away from substrate 103.

Since NFC antenna 151 is disposed at the end of substrate 103, it is possible to attenuate a magnetic field on the substrate 103 side (the right side in FIG. 3) of NFC antenna 151 and relatively intensify a magnetic field on a side (the left side in FIG. 3) of NFC antenna 151 away from substrate 103. As a result, it is possible to tilt axis X of magnetic field 8 with respect to substrate 103. In the configuration in the present embodiment, angle α of axis X of magnetic field 8 tilts at about 40 to 85 degrees with respect to substrate 103. That is, unless NFC antenna 151 is disposed at the end of substrate 103, the magnetic field in the direction perpendicular to the substrate 103 surface by the eddy current on the substrate 103 surface decreases. Axis X of magnetic field 8 remains substantially perpendicular to substrate 103. In that case, even if communication can be performed in region $B_3$, communication cannot be performed in region $A_3$.

As shown in FIG. 16, distance $D_2$ between NFC antenna 151 and substrate 103 is preferably 0 mm to 8 mm. In FIG. 16, distance $d_3$ between the end of NFC antenna 151 and the end of substrate 103 is −2 mm. $D_2$ is preferably about 0 mm to 12 mm. In particular, when $D_2$ is 0 mm to 4 mm, axis X of magnetic field 8 can be tilted at angle α as large as 55 degrees to 80 degrees. Even if $D_2$ is 8 mm to 12 mm, axis X can be tilted at about 85 degrees. This is because, when NFC antenna 151 and substrate 103 are too apart from each other, the influence of substrate 103 decreases and the force of substrate 103 tilting axis X of magnetic field 8 decreases. The communication distance is affected by the size of substrate 103 as well. As substrate 103 is larger and a side on which an antenna is mounted is longer, the communication distance is longer.

Axis X is tilted at largest angle α of 70 degrees when $d_3$=+2 mm. However, even if distance $d_3$ is set large at about $d_3$=+8 mm, axis X can be tilted at angle α of 85 degrees. When the position of the end of NFC antenna 151 is excessively on the inner side than the outermost end of substrate 103, magnetic field 8 on the region $B_3$ side is also attenuated, magnetic field 8 of entire NFC antenna 151 is weakened, and, moreover, the magnetic field is attenuated. Therefore, axis X of magnetic field 8 becomes nearly perpendicular to substrate 103. Therefore, when $d_3$=0 mm, angle α is 78 degrees and, when $d_3$=−8 mm, angle α is 85 degrees.

From above, by locating NFC antenna 151 at the end of substrate 103 ($d_3$ is about −8 mm to +8 mm), it is possible to maximize utilization of the electric current flowing to substrate 103. The effect of the present invention can be obtained if angle α is about 85 degrees. Preferably, angle α is equal to or smaller than 80 degrees.

Since NFC antenna 151 is disposed at the end of substrate 103, it is possible to attenuate a magnetic field of NFC antenna 151 on the inner side of substrate 103 and relatively intensify a magnetic field of NFC antenna 151 on the outer side of substrate 103. As a result, since it is possible to tilt axis X of magnetic field 8 with respect to substrate 103, irrespective of whether, for example, the non-contact IC card is located in region $A_3$ or region $B_3$, it is possible to perform satisfactory communication.

Substrate 103 is, for example, a substrate in a portable terminal. However, substrate 103 may be another metal body; for example, a battery or a liquid crystal display panel.

A conductor included in coil section 152 may be configured by a coated copper wire or the like. However, the conductor may be an electrode pattern formed on substrate 103. Coil section 152 and core 153 may also be configured to be mounted to substrate 103.

Since an end face of NFC antenna 151 parallel to the opening portion of coil section 152 and the end of substrate 103 are aligned on one straight line ($d_3=0$), it is possible to obtain an antenna apparatus that can be easily manufactured.

Since the end face of NFC antenna 151 parallel to the opening portion of coil section 152 projects from the end of substrate 103 ($d_3$ is plus), magnetic field 8 right beside (on the region $B_3$ side) of substrate 103 is intensified.

Since NFC antenna 151 and substrate 103 are disposed in contact with each other, it is possible to further reduce angle α of axis X of magnetic field 8.

Coil section 152 is disposed to be located at the end of substrate 103. Consequently, it is possible to maximize utilization of an electric current flowing to substrate 103. Since a winding direction of a coil of coil section 152 is parallel to the end of substrate 103, coil section 152 can efficiently pick up an electric current, most of which flows to the end of substrate 103.

NFC antenna 151, coil section 152, core 153, and antenna input and output terminals 154 and 155 are formed on the inner side of housing 105. A line of NFC antenna 151 and antenna input and output terminals 154 and 155 are formed of a sheet metal or a metal foil tape or formed by printing or the like and are attached to a predetermined place of housing 105 by sticking with an adhesive tape, fixing with screws, or the like. Connection of the line of NFC antenna 151 and coil section 152 is performed by contact connection such as a connector or compression bonding, soldering, welding, or the like. As connection of antenna input and output terminals 154 and 155 and an IC, contact by pins, connector connection, soldering of an electric line, and the like are conceivable.

In FIG. 16, the line of NFC antenna 151 and antenna input and output terminals 154 and 155 are provided on substrate 103. The lines of NFC antenna 151 and antenna input and output terminals 154 and 155 are connected by pins to coil section 152 provided in housing 105 to form NFC antenna 151.

Components such as an IC for RF-ID, a matching circuit, an antenna for other frequencies, a camera unit, a speaker, and an RF module are disposed in a space formed between housing 105 and the substrate. It is possible to perform satisfactory communication irrespective of whether these components and the antenna apparatus, coil sections 152, and core 153 are in contact with or apart from each other. In the present embodiment, the components are disposed in a flat portion of housing 105. However, the components can be disposed along a curved surface of housing 105 as well.

As described above, when NFC antenna 151 of the present invention is used, even portable terminal apparatus 100 including secondary-side non-contact charging module 42 can perform communication while suppressing an adverse effect from primary-side non-contact charging modules 41 and secondary-side non-contact charging module 42. Further, it is possible to suppress NFC antenna 151 from deteriorating efficiency of power transmission between primary-side non-contact charging module 41 and secondary-side non-contact charging module 42.

Next, a positional relation between secondary-side non-contact charging module 42 and NFC antenna 151 will be described.

First, the present invention includes secondary-side non-contact charging module 42 (a reception-side non-contact charging module) including secondary-side coil 2b composed of a wound electrical line, and magnetic sheet 3b facing secondary-side coil 2b, and NFC antenna 151 located on the surface of substrate 103 and including coil section 152 having a pair of opening portions. The pair of opening portions are an opening portion (that is, the other opening portion) at outer side end 151x of NFC antenna 151 and an opening portion (one opening portion) at inner side end 151y of NFC antenna 151. The opening portions of NFC antenna 151 are substantially perpendicular to the surface of substrate 103. When the opening portions are substantially perpendicular to the surface of substrate 103, this means that an angle between the opening portions and substrate 103 is 75 to 100 degrees. The pair of opening portions are disposed such that the one opening portion faces the center side of substrate 103 and the other opening portion faces the outer side of substrate 103. That is, NFC antenna 151 is disposed further on the outer side than the center of substrate 103. The area of substrate 103 on the one opening portion side is larger than the area of substrate 103 on the other opening portion side. As a result, it is possible to tilt the axis of magnetic fluxes with respect to substrate 103. The area of substrate 103 on the other opening portion side may be zero. The surface of the opening portion of the secondary-side coil 2b of secondary-side non-contact charging module 42 and the surface of the opening portion of coil section 152 of NFC antenna 151 are substantially perpendicular to each other. Consequently, it is possible to vary the direction of magnetic fluxes during power transmission of secondary-side non-contact charging module 42 and the direction of magnetic fluxes during communication of NFC antenna 151. Consequently, it is possible to suppress NFC antenna 151 and secondary-side non-contact charging module 42 from adversely affecting each other. Further, similar to the sheet antenna in the past, it is also possible to form the power transmission surface of secondary-side non-contact charging module 42 and the communication surface of NFC antenna 151 as the same surface (the upper side of FIG. 28 is the communication surface). Further, compared with the case where an NFC antenna is configured by a sheet antenna, since secondary-side non-contact charging module 42 and NFC antenna 151 can be physically placed apart from each other, it is possible to reduce the mutual influence of secondary-side non-contact charging module 42 and NFC antenna 151. Further, since NFC antenna 151 can perform communication in two directions, communication of NFC antenna 151 can be easily performed even when portable terminal apparatus (communication apparatus) 100 is placed on non-contact charger 400 mounted with primary-side non-contact charging module 41.

Figure 30A:
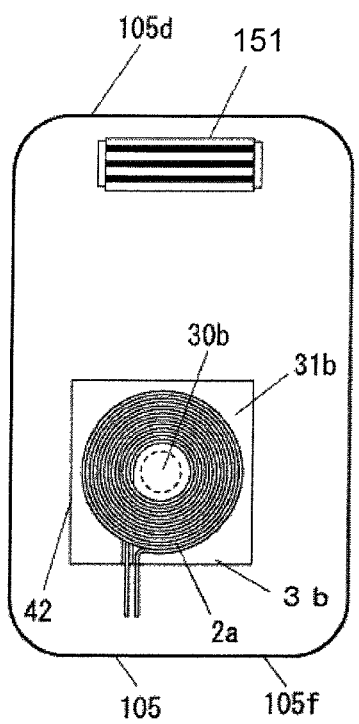
FIGS. 30A and 30B are diagrams showing arrangement in a housing of the secondary-side non-contact charging module and the NFC antenna in the embodiment of the present invention.
Figure 30B:
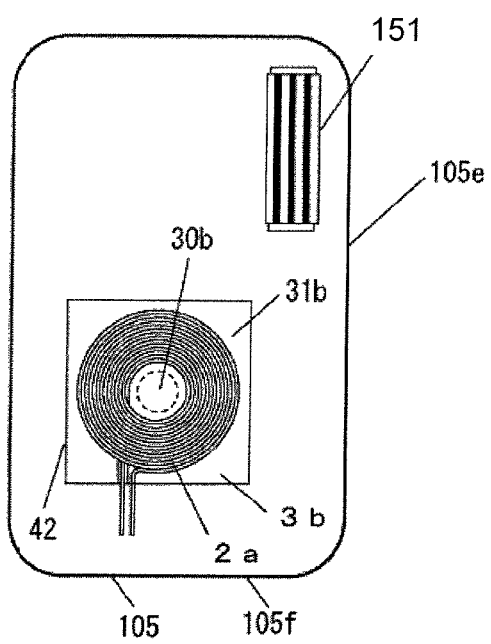

FIGS. 30A and 30B are diagrams showing arrangement in a housing of the secondary-side non-contact charging module and the NFC antenna in the embodiment of the present invention.

In the pair of opening portions of NFC antenna 151, the one opening portion facing the center side of substrate 103 faces reception-side non-contact charging module 42. That is, the one opening portion is disposed as shown in FIG. 30A. Consequently, since communication of NFC antenna 151 can be performed in a direction opposite to the direction in which secondary-side non-contact charging module 42 is located, it is possible to further reduce the mutual influence of NFC antenna 151 and secondary-side non-contact charging module 42.

Further, the present invention that includes housing 105 including a substantially rectangular bottom surface is provided in which secondary-side non-contact charging module 42 and NFC antenna 151 are housed. Since the bottom surface has the substantially rectangular shape, corners of the bottom surface may be rounded or the bottom surface may have a little unevenness. The other opening portion facing the outer side of substrate 103 faces housing end side 105d among the four sides of the substantially rectangular bottom surface. Secondary-side non-contact charging module 42 is located further on the housing end side 105f side than the center of the substantially rectangular bottom surface. By adopting such arrangement, it is possible to dispose NFC antenna 151 and secondary-side non-contact charging module 42 most apart from each other. As a result, it is possible to reduce the mutual influence of NFC antenna 151 and secondary-side non-contact charging module 42.

Alternatively, as shown in FIG. 30B, the other opening portion facing the outer side of substrate 103 faces housing end side 105e among the four sides of the substantially rectangular bottom surface. Secondary-side non-contact charging module 42 is located further on the housing end side 105f side than the center of the substantially rectangular bottom surface. Housing end side 105e and housing end side 105f are in a perpendicular relation. By adopting such arrangement, since magnetic fluxes generated by NFC antenna 151 during communication do not reach the secondary-side non-contact charging module 42 side, it is possible to further reduce the mutual influence of NFC antenna 151 and secondary-side non-contact charging module 42. That is, secondary-side non-contact charging module 42 is absent on an extended line in the communication direction of NFC antenna 151. NFC antenna 151 is absent on an extended line of power transmission of secondary-side non-contact charging module 42. Therefore, further, it is possible to vary the communication direction of NFC antenna 151 and the power transmission direction of secondary-side non-contact charging module 42.

Further, as shown in FIG. 28, the present invention includes substrate 103 (in the present embodiment, a metal body) for controlling portable terminal apparatus 100. Secondary-side non-contact charging module 42 and NFC antenna 151 are disposed on the same surface side of substrate 103 in housing 105. In FIG. 28, both of secondary-side non-contact charging module 42 and NFC antenna 151 are disposed on the upper side of substrate 103. Secondary-side non-contact charging module 42 and NFC antenna 151 may be disposed on the opposite side. However, by disposing secondary-side non-contact charging module 42 and NFC antenna 151 on the same side, it is possible to reduce the seize while minimizing adverse effects of secondary-side non-contact charging module 42 and NFC antenna 151. Further, the power transmission surface of secondary-side non-contact charging module 42 and the communication surface of NFC antenna 151 can be integrated on, for example, the upper side in FIG. 28. By disposing secondary-side non-contact charging module 42 and NFC antenna 151 on the respective surfaces of substrate 103, since substrate 103 is located between NFC antenna 151 and secondary-side non-contact charging module 42, it is possible to suppress adverse effects of secondary-side non-contact charging module 42 and NFC antenna 151.

When primary-side non-contact charging module 41 and secondary-side non-contact charging module 42 are aligned, it is possible to reduce deterioration in accuracy of the aligning due to NFC antenna 151. In the present invention, NFC antenna 151 is mounted as a method of near field communication. Therefore, it is possible to maintain aligning accuracy between the non-contact charging modules. That is, when viewed from primary-side non-contact charging module 41, it is easy to distinguish secondary-side non-contact charging module 42 and NFC antenna 151. One reason for this is that the opening surfaces of secondary-side non-contact charging module 42 and NFC antenna 151 are directed to the different directions.

Further, core 153 is not exposed in a large area in NFC antenna 151. Therefore, it is possible to reduce a decrease in permeability due to the magnet. Therefore, it is possible to reduce the possibility of fluctuation in the L value than in NFC sheet antenna 51.

Embodiment 12

Figure 31:
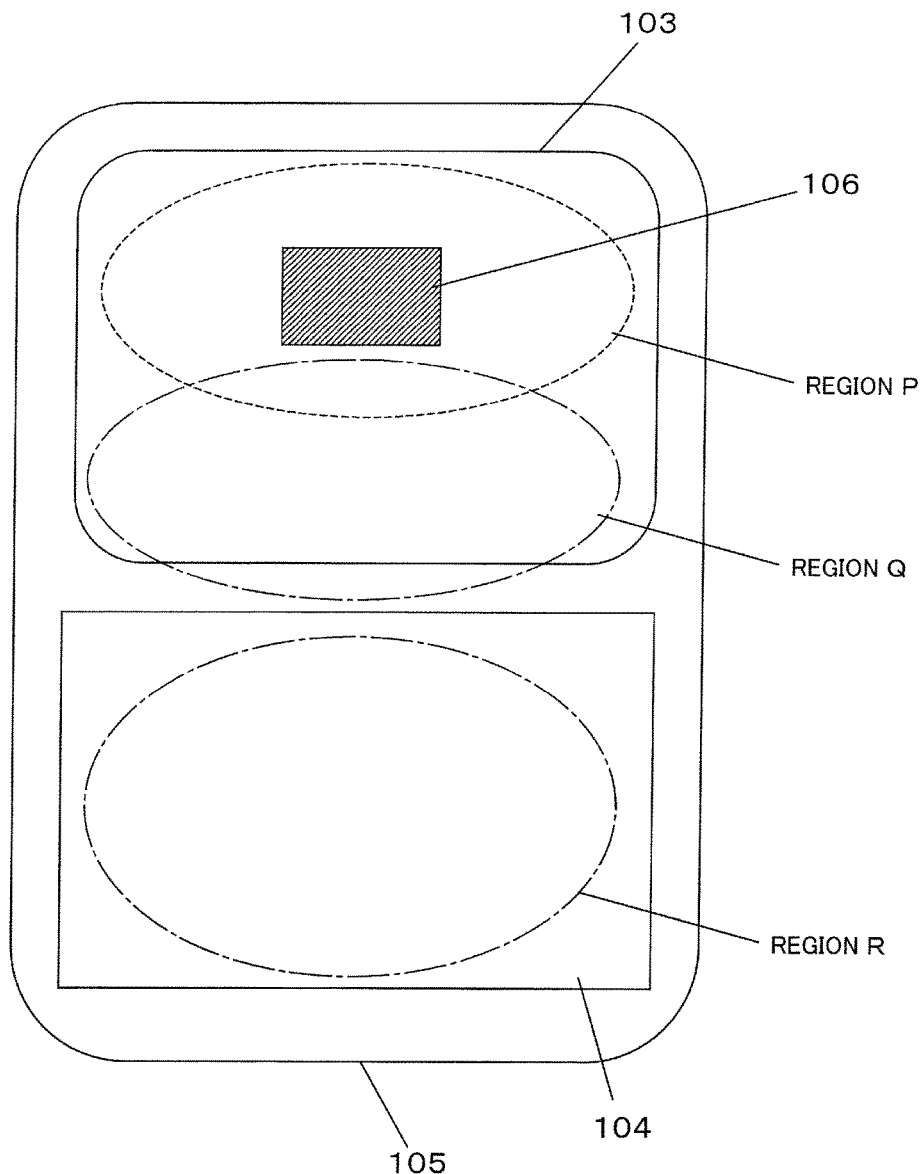
FIG. 31 is a diagram showing the arrangement of a secondary-side non-contact charging module and an NFC antenna in the embodiment.

In the present embodiment, it will be described how secondary-side non-contact charging module 42 and NFC antenna 51 (the sheet antenna) or NFC antenna 151 (the stick type) described in Embodiments 1 to 11 are disposed in a portable terminal. FIG. 31 is a diagram showing the arrangement of a secondary-side non-contact charging module and an NFC antenna in the present embodiment.

First, a portable terminal including NFC antenna 51 (the sheet antenna) will be described. In housing 105, secondary-side non-contact charging module 42 and NFC antenna 51 are mainly disposed in region P, region Q, or region R in FIG. 31. In region P, secondary-side coil 2b or/and coil 53 are wound around camera module 106. In region Q, secondary-side coil 2b or/and coil 53 are disposed between camera module 106 and battery pack 104. In region R, secondary-side coil 2b or/and coil 53 are stacked in battery pack 104. The arrangement is not limited to the above alone. However, these components will be described below. In FIG. 31, substrate 103 and battery pack 104 are not stacked. However, substrate 103 may be extended to the battery pack 104 side and stacked on battery pack 104.

By disposing secondary-side non-contact charging module 42 or/and NFC antenna 51 in region P, since the hollow portion of secondary-side coil 2b of secondary-side non-contact charging module 42 is not formed as a dead space, it is possible to reduce the size of entire portable terminal apparatus 100. Since the size of the external shape of secondary-side non-contact charging module 42 or/and NFC antenna 51 is not limited by a camera, it is possible to increase the sizes of the opening portions.

By disposing secondary-side non-contact charging module 42 or/and NFC antenna 51 in region Q, it is possible to reduce the size of entire portable terminal apparatus 100 while maintaining the efficiency of secondary-side non-contact charging module 42 or/and NFC antenna 51. That is, camera module 106 is a metal body viewed from secondary-side non-contact charging module 42 and NFC antenna 51. That is, an eddy current is sometimes caused in a direction in which power transmission (communication) of secondary-side non-contact charging module 42 and NFC antenna 51 is hindered. In general, battery pack 104 is thicker than substrate 103. Therefore, it is possible to suppress the entire thickness by stacking substrate 103 and secondary-side non-contact charging module 42 or/and NFC antenna 51.

By disposing secondary-side non-contact charging module 42 in region R, it is possible to simplify and facilitate connection of secondary-side non-contact charging module 42 and battery pack 104. By disposing NFC antenna 51 in region R, it is possible to effectively utilize the space in housing 105. That is, since NFC antenna 51 is extremely thin compared with secondary-side non-contact charging module 42, an increase in thickness is not difficult even if NFC antenna 51 is stacked on battery pack 104. Therefore, it is possible to dispose NFC antenna 51 in a small gap between housing 105 and battery pack 104. In general, an occupancy ratio of battery pack 104 in housing 105 is fairly large, it is possible to configure secondary-side non-contact charging module 42 or/and NFC antenna 51 large.

Secondary-side non-contact charging module 42 and NFC antenna 51 are disposed in region R, region Q, or region P as appropriate. Secondary-side non-contact charging module 42 and NFC antenna 51 may be stacked or may not be stacked each other. Therefore, at least nine patterns of arrangement are conceivable from at least three patterns of arrangement places of secondary-side non-contact charging module 42 and at least three patterns of arrangement places of NFC antenna 51. The respective arrangement patterns are as explained in Embodiments 1 to 10. That is, secondary-side non-contact charging module 42 and NFC antenna 51 may be stacked in any one of region R, region Q, and region P, or, when not stacked, each of secondary-side non-contact charging module 42 and NFC antenna 51 is disposed in one place of any one of region R, region Q, and region P. However, when not stacked, from a relation that NFC antenna 51 is thin compared with secondary-side non-contact charging module 42 and battery pack 104 is thick compared with substrate 103, it is desirable to dispose secondary-side non-contact charging module 42 on the substrate 103 side and dispose NFC antenna 51 on the battery pack 104 side. When secondary-side non-contact charging module 42 and NFC antenna 51 are stacked, secondary-side non-contact charging module 42 and NFC antenna 51 can be reduced in thickness when secondary-side non-contact charging module 42 and NFC antenna 51 are disposed on the substrate 103 side. For example, it is also possible that only NFC antenna 51 is wound around camera module 106 and secondary-side non-contact charging module 42 is not wound around camera module 106.

Figure 32A:
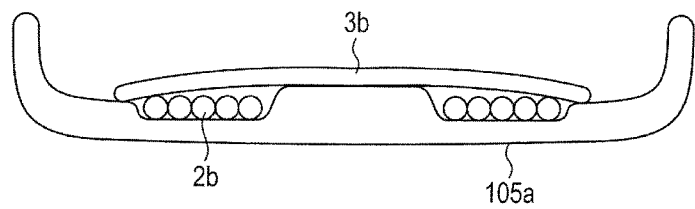
FIGS. 32A to 32C are diagrams showing a lower housing and the secondary-side non-contact charging module in the embodiment.
Figure 32B:
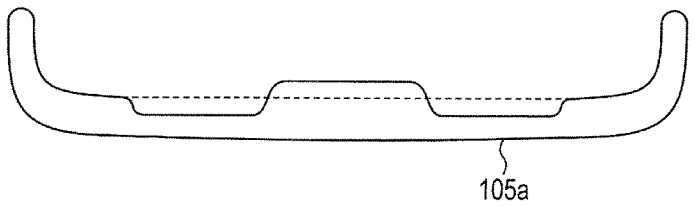
Figure 32C:
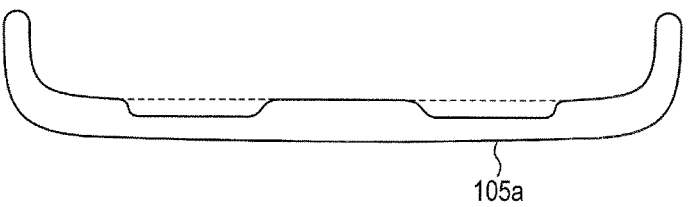
Figure 33A:
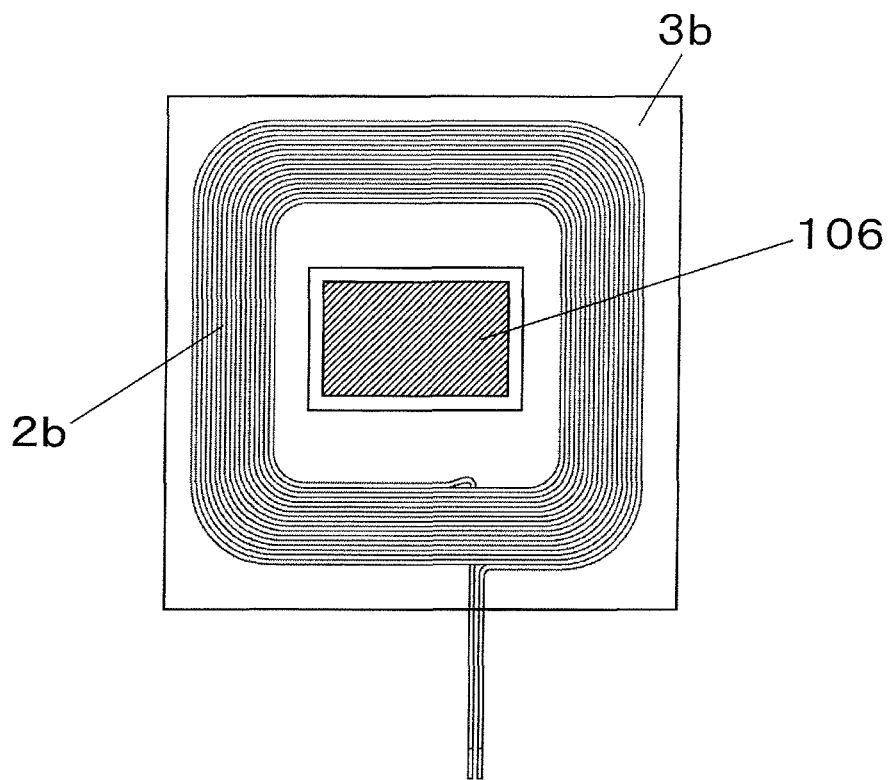
FIGS. 33A and 33B are diagrams showing the lower housing, a camera module, and the secondary-side non-contact charging module in the embodiment.
Figure 33B:
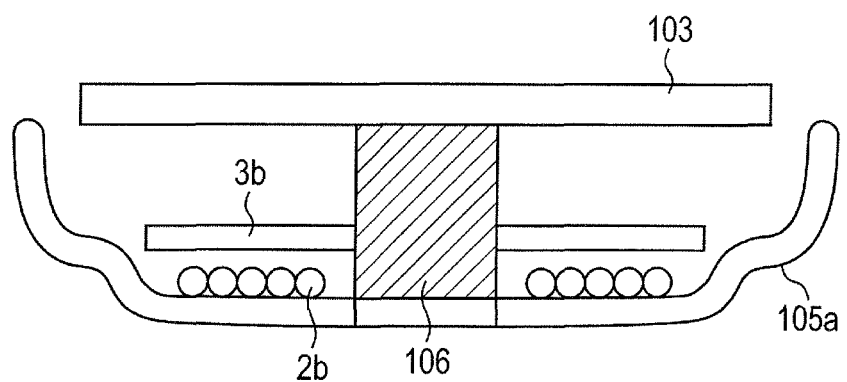

Next, joining of secondary-side coil 2b of secondary-side non-contact charging module 42 and lower housing 105a in directly opposing and fixing secondary-side coil 2b and lower housing 105a will be described. FIGS. 32A to 32C are diagrams showing the lower housing and the secondary-side non-contact charging module in the present embodiment. FIGS. 33A and 33B are diagrams showing the lower housing, the camera module, and the secondary-side non-contact charging module in the present embodiment.

In FIG. 32A, in secondary-side non-contact charging module 42, secondary-side coil 2b directly faces lower housing 105a and the peripheral ends of secondary-side magnetic sheet 3b is fixed to lower housing 105a to cover secondary-side coil 2b. In lower housing 105a, a portion facing a winding portion of secondary-side coil 2b is formed thin and a portion facing the hollow portion of secondary-side coil 2b is formed thick. As shown in FIG. 32B, a convex portion of the portion facing the hollow portion of secondary-side coil 2b may be formed to be thicker than the other portions of lower housing 105a. As shown in FIG. 32C, the convex portion of the portion facing the hollow portion of secondary-side coil 2b may be formed to have the same thickness as the other portions of lower housing 105a. By adopting such a configuration, the convex portion of the portion facing the hollow portion of secondary-side coil 2b and secondary-side magnetic sheet 3b are in contact and more firmly fixed to each other. By forming the convex portion, it is possible to improve the strength of lower housing 105a partially reduced in thickness. By forming the portion facing the winding portion of secondary-side coil 2b thin in lower housing 105a, it is possible to place secondary-side coil 2b of secondary-side non-contact charging module 42 and primary-side non-contact charging module 41 closer to each other and improve efficiency of non-contact charging.

When secondary-side non-contact charging module 42 is wound around camera module 106 as shown in FIG. 33A, it is desirable to house at least a part of secondary-side coil 2b in a convex portion formed around camera module 106 as shown in FIG. 33B. The periphery of camera module 106 is sometimes formed in a shape projected to the outer side to enable a user to recognize the position of camera module 106 with a finger. Therefore, if at least a part of secondary-side coil 2b is housed in the convex portion formed around camera module 106, it is possible to effectively utilized unused space, leading to a reduction in the size of entire portable terminal apparatus 100. Since camera module 106 and battery pack 104 respectively have large thickness, camera module 106 and battery pack 104 are not stacked on each other. Therefore, secondary-side non-contact charging module 42 is not stacked on battery pack 104, leading to a reduction in the thickness of entire portable terminal apparatus 100.

When secondary-side non-contact charging module 42 is fixed to lower housing 105a and separated from substrate 103, connection of substrate 103 and secondary-side coil 2b is performed by, for example, a pin or a spring. That is, a conductive pin, spring, or the like is erected from the substrate 103 side toward the lower housing 105a side and the pin or the spring is set in contact with or connected to a terminal of secondary-side coil 2b, whereby substrate 103 and secondary-side coil 2b are electrically connected.

Further, when secondary-side non-contact charging module 42 and NFC antenna 51 are not stacked, a part of lower housing 105a facing secondary-side coil 2b is formed thinner than another part of lower housing 105a facing coil 53. Since secondary-side non-contact charging module 42 performs power transmission of a large electric current, it is important to place secondary-side non-contact charging module 42 as close as possible to primary-side non-contact charging module 41. Meanwhile, NFC antenna 51 performs low power communication at a distance longer than the distance of non-contact charging. Therefore, unlike secondary-side non-contact charging module 42, it is unnecessary to place NFC antenna 51 close to the lower housing 105a side. As a result, by forming the part of lower housing 105a facing secondary-side coil 2b thinner than other part of lower housing 105a facing coil 53, it is possible to place secondary-side non-contact charging module 42 close to primary-side non-contact charging module 41 while securing the strength of lower housing 105a.

It is desirable to dispose, for example, a heat diffusion sheet containing graphite as a material between substrate 103 and secondary-side non-contact charging module 42. Consequently, it is possible to prevent heat generated by secondary-side non-contact charging module 42 from being transferred to only a portion of substrate 103 close to secondary-side non-contact charging module 42. As a result, it is possible to prevent the heat from being transferred to only a part of the components.

Antennas other than an antenna for NFC communication mounted within portable terminal apparatus 100 are desirably not stacked on secondary-side non-contact charging module 42. This is because the other antennas are highly likely to be driven during non-contact charging compared with the antenna for NFC communication. Since the NFC communication uses electromagnetic induction, a communication counterpart and the communication surface of portable terminal apparatus 100 need to face each other at a relatively short distance. Meanwhile, since the other antennas adopt other systems, the other antennas can easily perform communication even during charging. As a result, it is likely that communication is started during charging. However, non-contact charger 400 mounted with primary-side non-contact charging module 41 is highly likely to include metal of large size. The metal in non-contact charger 400 is highly likely to adversely affect the other antennas in portable terminal apparatus 100. Therefore, in portable terminal apparatus 100, secondary-side non-contact charging module 42 is desirable not to be stacked on the components other than NFC antenna 51. In portable terminal apparatus 100, since secondary-side non-contact charging module 42 is basically disposed on non-contact charger 400 to face primary-side non-contact charging module 41, secondary-side non-contact charging module 42 is placed closest to non-contact charger 400. Therefore, since the other antennas are not stacked on secondary-side non-contact charging module 42, it is possible to place the other antennas apart from the metal components in non-contact charger 400. As a result, it is possible to suppress the influence of the metal components.

Embodiment 12 can be combined with Embodiments 1 to 11 as appropriate.

All the disclosed contents of the specifications, the drawings, and the abstracts included in Japanese Patent Application No. 2011-188413 filed on Aug. 31, 2011, Japanese Patent Application No. 2011-155334 filed on Jul. 14, 2011, Japanese Patent Application No. 2011-154555 filed on Jul. 13, 2011, Japanese Patent Application No. 2011-154554 filed on Jul. 13, 2011, Japanese Patent Application No. 2011-154550 filed on Jul. 13, 2011, Japanese Patent Application No. 2011-131948 filed on Jun. 14, 2011, and Japanese Patent Application No. 2011-131950 filed on Jun. 14, 2011 are incorporated in this application.

INDUSTRIAL APPLICABILITY

According to the present invention, the communication apparatus is useful for a communication apparatus including non-contact charging modules and a sheet antenna, in particular, various electronic apparatuses such as a cellular phone, a portable audio apparatus, a personal computer, a digital camera, and a video camera, which are portable apparatuses, a motorcycle, an automobile, and the like.

REFERENCE SIGNS LIST

2a Primary-side coil
2b Secondary-side coil
2ba, 2bb Sectional portions
3a Primary-side magnetic sheet
3b Secondary-side magnetic sheet
21a Coil (primary side)
21b Coil (secondary side)
22a, 23a Terminals (primary side)
22b, 23b Terminals (secondary side)
30a Magnet (primary side)
30b Magnet (secondary side)
31a Flat portion (primary side)
31b Flat portion (secondary side)
32a Center portion (primary side)
32b Center portion (secondary side)
33a Liner concave portion (primary side)
33b Linear concave portion (secondary side)
34a Slit (primary side)
34b Slit (secondary side)
41 Primary-side non-contact charging module (transmission-side non-contact charging module)
42 Secondary-side non-contact charging module (reception-side non-contact charging module)
51 NFC antenna
52 Magnetic sheet
53 Coil
53a, 53b Sectional portion
54 Matching circuit
55 Terminal connecting section
56 Base material
57, 58 Protective members
60a, 60b Chip capacitors
71 Power input section
72 Rectifying circuit
82 Power output section
100 Portable terminal apparatus
101 Liquid crystal panel
102 Operation button
103 Substrate
104 Battery pack
105 Housing
211 Inner side portion (primary side)
212 Inner side portion (secondary side)
300 Commercial power supply
301 Outlet
400 Non-contact charger
401 Plug
402 Charging surface
501 Desk

The invention claimed is:

1. An electronic device having a communication capability, the electronic device comprising:
   a housing having a generally rectangular shape in a plan view of the housing;
   a non-contact charging module included in the housing and including: (i) a wireless charging coil having a substantially planar shape and formed of a wound electrical wire, and (ii) a magnetic sheet that overlaps with the wireless charging coil in the plan view of the housing;
   a display arranged closer to the magnetic sheet than to the wireless charging coil of the non-contact charging module;
   a battery included in the housing and configured to receive power from the wireless charging coil of the non-contact charging module;
   a camera included in the housing; and
   a Near Field Communication (NFC) antenna included in the housing and including an NFC coil formed of a wound electrical wire,
   wherein the generally rectangular shape of the housing includes short edges extending in X direction and long edges extending in Y direction and includes first and second regions divided by a longitudinal line extending in the Y direction, and the wireless charging coil is arranged in the first region and the NFC coil is arranged in the second region.

2. The electronic device according to claim 1, wherein the generally rectangular shape includes third and fourth regions divided by a lateral line extending in the X direction, and the wireless charging coil is arranged in the third region and the NFC coil is arranged in the fourth region.

3. The electronic device according to claim 1, wherein the NFC antenna has an elongated form that extends in the Y direction.

4. The electronic device according to claim 1, wherein the NFC antenna has an elongated form that extends in the X direction.

5. The electronic device according to claim 1, further comprising a second magnetic sheet for the NFC coil.

6. The electronic device according to claim 1, wherein the wireless charging coil is formed in an oval shape or a circular shape.

7. The electronic device according to claim 1, wherein the wireless charging coil is formed to define a hollow portion surrounded by the wound electrical wire.

8. The electronic device according to claim 7, wherein the hollow portion has an oval shape or a circular shape.

9. The electronic device according to claim 7, wherein the largest span of the hollow portion is greater than 15.5 mm.

10. The electronic device according to claim 9, wherein the hollow portion has a circular shape and a diameter of the circular-shape hollow portion is greater than 15.5 mm.

11. The electronic device of claim 1, wherein the magnetic sheet is made of a ferrite material.

12. An electronic device having a communication capability, the electronic device comprising:
a housing having a generally rectangular shape in a plan view of the housing;
a non-contact charging module included in the housing and including: (i) a wireless charging coil having a substantially planar shape and formed of a wound electrical wire, and (ii) a magnetic sheet that overlaps with the wireless charging coil in the plan view of the housing;
a display arranged closer to the magnetic sheet than to the wireless charging coil of the non-contact charging module;
a battery included in the housing and configured to receive power from the wireless charging coil of the non-contact charging module;
a camera included in the housing; and
a Near Field Communication (NFC) antenna included in the housing and including an NFC coil formed of a wound electrical wire,
wherein the generally rectangular shape of the housing includes short edges extending in X direction and long edges extending in Y direction and includes first and second regions divided by a longitudinal line extending in the Y direction, and the wireless charging coil is arranged in the first region and the NFC coil is arranged in the second region, and
wherein a first axis of the wireless charging coil is different from a second axis of the NFC coil.

13. The electronic device according to claim 12, wherein the generally rectangular shape includes third and fourth regions divided by a lateral line extending in the X direction, and the wireless charging coil is arranged in the third region and the NFC coil is arranged in the fourth region.

14. The electronic device according to claim 12, wherein the first axis is orthogonal to the second axis.

15. The electronic device according to claim 14, wherein the generally rectangular shape of the housing includes short edges extending in X direction and long edges extending in Y direction, Z direction extending orthogonal to both the X and Y directions,
wherein the first axis of the wireless charging coil extends in the Z direction and the second axis of the NFC coil extends in the X direction.

16. The electronic device according to claim 14, wherein the generally rectangular shape of the housing includes short edges extending in X direction and long edges extending in Y direction, Z direction extending orthogonal to both the X and Y directions,
wherein the first axis of the wireless charging coil extends in the Z direction and the second axis of the NFC coil extends in the Y direction.

17. The electronic device according to claim 12, wherein the NFC antenna has an elongated form that extends in the Y direction.

\* \* \* \* \*